(12) United States Patent
Manolova et al.

(10) Patent No.: US 12,533,348 B2
(45) Date of Patent: Jan. 27, 2026

(54) FERROPORTIN-INHIBITORS FOR THE USE IN THE TREATMENT OF TRANSFUSION-DEPENDENT BETA-THALASSEMIA (TDT)

(71) Applicant: Vifor (International) AG, St. Gallen (CH)

(72) Inventors: Vania Manolova, St. Gallen (CH);
Naja Nyffenegger, St. Gallen (CH);
Patrick Altermatt, St. Gallen (CH);
Franz Dürrenberger, Dornach (CH)

(73) Assignee: Vifor (International) AG, St. Gallen (CH)

( * ) Notice: Subject to any disclaimer, the term of this patent is extended or adjusted under 35 U.S.C. 154(b) by 908 days.

(21) Appl. No.: 17/627,907

(22) PCT Filed: Jul. 17, 2020

(86) PCT No.: PCT/EP2020/070391
§ 371 (c)(1),
(2) Date: Jan. 18, 2022

(87) PCT Pub. No.: WO2021/013771
PCT Pub. Date: Jan. 28, 2021

(65) Prior Publication Data
US 2022/0273634 A1 Sep. 1, 2022

(30) Foreign Application Priority Data

Jul. 19, 2019 (EP) ..................................... 19187248
May 12, 2020 (EP) ..................................... 20175230

(51) Int. Cl.
| | | |
|---|---|---|
| A61K 31/4439 | (2006.01) | |
| A61K 31/4196 | (2006.01) | |
| A61K 35/18 | (2015.01) | |
| A61P 7/06 | (2006.01) | |

(52) U.S. Cl.
CPC ...... *A61K 31/4439* (2013.01); *A61K 31/4196* (2013.01); *A61K 35/18* (2013.01); *A61P 7/06* (2018.01)

(58) Field of Classification Search
CPC ...... A61P 7/06; A61K 31/4184; A61K 31/427
See application file for complete search history.

(56) References Cited

U.S. PATENT DOCUMENTS

| | | | |
|---|---|---|---|
| 8,993,606 B2 | 3/2015 | Rienhoff | |
| 10,364,239 B2 | 7/2019 | Dürrenberger et al. | |
| 10,738,041 B2* | 8/2020 | Dürrenberger | ....... C07D 403/14 |
| 11,129,820 B2* | 9/2021 | Morris | ................. C07D 413/14 |
| 11,286,243 B2 | 3/2022 | Li et al. | |
| 2018/0125928 A1 | 5/2018 | Attie et al. | |
| 2018/0319783 A1* | 11/2018 | Dürrenberger | ..... A61K 31/4184 |

FOREIGN PATENT DOCUMENTS

| | | | |
|---|---|---|---|
| EP | 1 294 379 B1 | 4/2009 | |
| WO | WO-2015/077655 A1 | 5/2015 | |
| WO | WO-2017068090 A1 * | 4/2017 | ......... A61K 31/4184 |

OTHER PUBLICATIONS

Rivella (Blood vol. 133 pp. 51-61 published Jan. 3, 2019) (Year: 2019).*
Piga (American Journal of Hematology vol. 84 pp. 29-33 published 2008). (Year: 2008).*
Olivieri (Blood Reviews vol. 26S pp. S28-S30 published 2012) (Year: 2012).*
Patel et al. "Non Transferrin Bound Iron: Nature, Manifestations and Analytical Approaches for Estimation" ournal of Clinical Investigation Biochem., vol. 27, No. 4, pp. 322-332, 2012.
Brissot et al. Review "Non-transferrin bound iron: A key role in iron overload and iron toxicity" Biochimica et Biophysica Acta, vol. 1820, pp. 403-410, 2012.
Rivella, et al. "Iron metabolism under conditions of ineffective erythropoiesis in beta-thalassemia." Blood, vol. 133, No. 1, pp. 51-58, 2019.
Taher, et al. "Thalassaemia", Lancet, vol. 391(10116), pp. 155-167, 2018.
Mettananda, et al. "alpha-Globin as a molecular target in the treatment of beta-thalassemia", Blood. vol. 125, No. 24 pp. 3694-3701, 2015.
Rivella, et al. "beta-thalassemias: paradigmatic diseases for scientific discoveries and development of innovative therapies." Haematologica, vol. 100, No. 4, pp. 418-430, 2015.
Rivella, et al. "The role of ineffective erythropoiesis in non-transfusion-dependent thalassemia." Blood Reviews, vol. 26, Suppl 1, pp. 12-15, 2012.
Kattamis, et al. "The effects of erythropoetic activity and iron burden on hepcidin expression in patients with thalassemia major." Haematologica, ; vol. 91, No. 6, pp. 809-812, 2006.
Anderson, et al. "The IRP1-HIF-2alpha axis coordinates iron and oxygen sensing with erythropoiesis and iron absorption." Cell Metabolism, vol. 17, No. 2, pp. 282-290, 2013.
Schwartz, et al. "Hepatic hepcidin/intestinal HIF-2alpha axis maintains iron absorption during iron deficiency and overload." Journal of Clinical Investigation, vol. 129, No. 1, 336-348, 2019.
Kautz, et al. "Identification of erythroferrone as an erythroid regulator of iron metabolism." Nature Genetics, 2014.
Casu, et al. "Minihepcidin peptides as disease modifiers in mice affected by β-thalassemia and polycythemia vera." Blood, vol. 128, No. 2, pp. 265-276, 2016.
Schmidt, et al. "An RNAi therapeutic targeting Tmprss6 decreases iron overload in Hfe(−/−) mice and ameliorates anemia and iron overload in murine beta-thalassemia intermedia." Blood, vol. 121, No. 7, 1200-1208, 2013.

(Continued)

*Primary Examiner* — George W Kosturko
(74) *Attorney, Agent, or Firm* — Foley & Lardner LLP

(57) ABSTRACT

The invention relates to the use of ferroportin inhibitor compounds of the general formula (I) for treating transfusion-dependent β-thalassemia.

18 Claims, 13 Drawing Sheets

(56) References Cited

OTHER PUBLICATIONS

Guo et al. "Reducing TMPRSS6 ameliorates hemochromatosis and beta-thalassemia in mice," Journal of Clinical Investigation, vol. 123, No. 4, pp. 1531-1541, 2013.
Fucharoen et al. "The Hemoglobin E Thalassemias," Cold Spring Harbor Perspectives in Medicine., vol. 2, No. 8, 2012.
Sripichai et al. "A scoring system for the classification of β-thalassemia/ Hb E disease severity," American Journal Hematology, vol. 83, pp. 482-484, 2008.
Viprakasit et al. "Clinical Classification, Screening and Diagnosis for Thalassemia" Hematology Oncology. Clinics of North America., vol. 32, pp. 193-211, 2018.
Musallam, et al. "Cross-talk between available guidelines for the management of patients with beta-thalassemia major," Acta Haematologica, vol. 130, No. 2, pp. 64-73, 2013.
Musallam et al. "Iron overload in β-thalassemia intermedia: an emerging concern." Current Opinion in Hematology. vol. 20, No. 3, pp. 187-192, 2013.
Cappellini, et al. "Guidelines for the Management of Transfusion Dependent Thalassaemia (TDT)" (3rd edition), pp. 210-223, 2014.
Taher et al. "Guidelines for the Management of Non Transfusion Dependent Thalassaemia (NTDT)", Thalassaemia International Federation [online], 2013. Retrieved from the Internet: https://europepmc.org/article/MED/24672826/NBK190457#free-full-text.
Vichinsky "Non-transfusion-dependent thalassemia and thalassemia intermedia: epidemiology, complications, and management." Current Medical Research and Opinion. vol. 32, No. 1, pp. 191-204, 2016.
Galanello et al. "Beta-thalassemia." Orphanet Journal of Rare Diseases, vol. 5, No. 11, pp. 2-15, 2010.
Baek et al. "Ferroportin inhibition attenuates plasma iron, oxidant stress, and renal injury following red blood cell transfusion in guinea pigs"; Transfusion, vol. 60, No. 3, pp. 513-523, 2020.
Pasricha et al. "Transfusion suppresses erythropoiesis and increases hepcidin in adult patients with beta-thalassemia major: a longitudinal study." Blood, vol. 122, No. 1, pp. 124-133, 2013.
Baek et al. "Iron accelerates hemoglobin oxidation increasing mortality in vascular diseased guinea pigs following transfusion of stored blood." JCI Insight, vol. 2, No. 9, pp. 1-14, 2017.
Piga et al. "High nontransferrin bound iron levels and heart disease in thalassemia major." American Journal of Hematology, vol. 84, No. 1, pp. 29-33, 2009.

De Swart et al. "Second international round robin for the quantification of serum non-transferrin-bound iron and abile plasma iron in patients with iron-overload disorders." Haematologica, vol. 101, No. 1, pp. 38-45, 2016.
Cappellini et al. "The Believe Trial: Results of a Phase 3, Randomized, Double-Blind, Placebo-Controlled Study of Luspatercept in Adult Beta-Thalassemia Patients Who Require Regular Red Blood Cell (RBC) Transfusions". Blood, 2018.
Casu et al. "Short-term administration of JAK2 inhibitors reduces splenomegaly in mouse models of β-thalassemia Intermedia and major", Haematologica, 2017.
Sorensen, et al. "The role of membrane skeletal-associated alpha-globin in the pathophysiology of beta-thalassemia." Blood, vol. 75 No. 6, pp. 1333-1336, 1990.
Alter et al. British Journal of Haematology, vol. 44, pp. 527-534, 1980.
Gosriwatana et al. "Quantification of non-transferrin-bound iron in the presence of unsaturated transferrin." Analytical Biochemistry vol. 273, No. 2, pp. 212-220, 1999.
Singh, et al. "A direct method for quantification of non-transferrin-bound iron." Analytical Biochemistry, vol. 186, No. 2, pp. 320-323, 1990.
Garbowski et al. "Clinical and methodological factors affecting non-transferrin-bound iron values using a novel fluorescent bead assay." Translational Research, pp. 1-17, 2016.
Esposito et al. "Labile plasma iron in iron overload: redox activity and susceptibility to chelation." Blood, vol. 102, No. 7, pp. 2670-2677, 2003.
Manolova et al. "Oral ferroportin inhibitor ameliorates ineffective erythropoiesis in a model of β-thalassemia," Journal of Clinical Investigation, 2019.
Schmidt et al. "Combination therapy with a Tmprss6 RNAi-therapeutic and the oral iron chelator deferiprone additively diminishes secondary iron overload in a mouse model of b-thalassemia intermedia." American Journal of Hematology, vol. 90, No. 4, pp. 310-313, 2015.
Gardenghi et al. "Ineffective erythropoiesis in beta-thalassemia is characterized by increased iron absorption mediated by down-regulation of hepcidin and up-regulation of ferroportin." Blood, vol. 109, No. 11, pp. 5027-5035, 2007.
International Search Report for PCT/EP2020/070391, Oct. 9, 2020, 11pages.

\* cited by examiner

FERROPORTIN-INHIBITORS FOR THE USE IN THE TREATMENT OF TRANSFUSION-DEPENDENT BETA-THALASSEMIA (TDT)

CROSS-REFERENCE TO RELATED APPLICATIONS

This application claims priority to PCT Patent Application No. PCT/EP2020/070391 filed 17 Jul. 2020, which is hereby incorporated by reference in its entirety.

INTRODUCTION

The invention relates to the use of compounds of the general formula (I), which act as ferroportin inhibitors, for treating transfusion-dependent β-thalassemia (TDT) and the symptoms and pathological conditions associated therewith.

BACKGROUND AND PRIOR ART

Iron is an essential trace element for almost all organisms and is relevant in particular with respect to growth and the formation of blood. The balance of the iron metabolism is in this case primarily regulated on the level of iron recovery from haemoglobin of ageing erythrocytes, from iron stores in the liver and the duodenal absorption of dietary iron. The released iron is taken up via the intestine, in particular via specific transport systems (DMT-1, ferroportin), transferred into the blood circulation and thereby conveyed to the appropriate tissues and organs (transferrin, transferrin receptors). In the human body, the element iron is of great importance, inter alia for oxygen transport, oxygen uptake, cell functions such as mitochondrial electron transport, cognitive functions, etc. and ultimately for the entire energy metabolism. Mammalian organisms are unable to actively discharge iron. The iron metabolism is substantially controlled by hepcidin via the cellular release of iron from macrophages, hepatocytes and enterocytes. Hepcidin acts on the absorption of iron via the intestine and via the placenta and on the release of iron from the reticuloendothelial system. The formation of hepcidin is regulated in direct correlation to the organisms iron level, i.e. if the organism is supplied with sufficient iron and oxygen, more hepcidin is formed, if iron and oxygen levels are low, or in case of increased erythropoiesis less hepcidin is formed. In the small intestinal mucosal cells and in the macrophages hepcidin binds with the transport protein ferroportin, which conventionally transports iron from the interior of the cell into the blood. The transport protein ferroportin is a transmembrane protein consisting of 571 amino acids which is expressed in the liver, spleen, kidneys, heart, intestine and placenta. In particular, ferroportin is localized in the basolateral membrane of intestinal epithelial cells. Ferroportin localized in this way thus acts to export the dietary iron into the blood. If hepcidin binds to ferroportin, ferroportin is transported into the interior of the cell, where its breakdown takes place so that the release of iron from the cells is then almost completely blocked. If the ferroportin is inactivated or inhibited, by hepcidin, so that it is unable to export the iron which is stored in the mucosal cells, the absorption of iron in the intestine is blocked. A decrease of hepcidin results in an increase of active ferroportin, thus allowing an enhanced release of stored iron and an enhanced dietary iron absorption, thus increasing the serum iron level. In pathological cases an increased iron level leads to iron overload.

For example, excessive iron uptake in organs, such as liver and heart, leads to accumulation of iron. Further, iron accumulation in brain has been observed in patients suffering from neurodegenerative diseases such as for example Alzheimer's disease and Parkinson's disease. The major portion of circulating iron is associated with transferrin, a classical iron transporting molecule, which prevents the existence of free iron. Iron fractions not bound to transferrin (or to the other traditional iron binding molecules like haem, apoferritin, hemosiderin etc.) are collectively referred to as non-transferrin bound iron (NTBI). In a further aspect of iron overload states and diseases many problems and pathological conditions arise from excess levels of free iron in plasma and serum, i.e. NTBI.

A particular detrimental aspect of such excess of free iron is the undesired formation of radicals. In particular iron(II) ions catalyze the formation (inter alia via Fenton reaction) of reactive oxygen species (ROS). These ROS cause damage to DNA, lipids, proteins and carbohydrates which has far-reaching effects in cells, tissue and organs. The formation of ROS is well known and described in the literature to cause the so-called oxidative stress. NTBI is widely described to exhibit high propensity to induce such ROS having the toxic potential for cellular damage, with the major organs being influenced by iron toxicity comprising heart, pancreas, kidney and organs involved in hematopoiesis. Accordingly, iron overload is known to cause tissue and organ damage, such as e.g. cardiac, liver and endocrine damage (Patel M. et al. *"Non Transferrin Bound Iron: Nature, Manifestations and Analytical Approaches for Estimation" Ind. J. Clin. Biochem.,* 2012; 27(4): 322-332 and Brissot P. et al. *Review "Non-transferrin bound iron: A key role in iron overload and iron toxicity" Biochimica et Biophysica Acta,* 2012; 1820, 403-410).

The iron overload disease β-thalassemia is an inherited anemia caused by mutations in the β-globin gene of hemoglobin (Hb) resulting in abnormal red blood cells (RBCs) with decreased lifespan (Rivella S. *"Iron metabolism under conditions of ineffective erythropoiesis in beta-thalassemia." Blood,* 2019; 133(1), 51-8 and Taher A. T. "Weatherall D. J. and Cappellini M. D. *"Thalassaemia" Lancet,* 2018; 391(10116), 155-67). In healthy subjects, Hb is composed of α- and β-globin chains which, together with the iron-containing heme groups, form $\alpha_2\beta_2$ functional heterotetramers within RBCs to efficiently deliver oxygen to tissues. The main pathophysiological mechanism in β-thalassemia results from the decreased synthesis of β-globin chains causing accumulation of unpaired α-globin aggregates on the membranes of RBCs. Precipitated α-globin aggregates contain heme and iron which generate ROS leading to a shortened lifespan of RBCs, anemia and tissue hypoxia (Mettananda S., Gibbons R. J., and Higgs D. R. *"alpha-Globin as a molecular target in the treatment of beta-thalassemia." Blood,* 2015; 125(24), 3694-701 and Rivella S. *"beta-thalassemias: paradigmatic diseases for scientific discoveries and development of innovative therapies." Haematologica,* 2015; 100(4), 418-30). As a compensatory response to the reduced lifespan of RBCs in β-thalassemia patients, erythropoiesis is greatly stimulated leading to increased proliferation and decreased differentiation of erythroid precursors (ineffective erythropoiesis) in bone marrow (BM) and extramedullary sites, such as spleen and liver (Rivella S. *"The role of ineffective erythropoiesis in non-transfusion-dependent thalassemia." Blood Rev.,* 2012; 26 Supl, S12-5). The ineffective erythropoiesis in β-thalassemia causes iron over-absorption to support the increased iron demand for Hb synthesis and leads to elevated iron concentrations in the plasma and ultimately organ iron overload. Liver, spleen, heart and pancreas are the tissues commonly affected by iron overload and without therapeutic intervention iron overload may lead to organ damage, such as liver cirrhosis, heart failure and diabetes.

The ineffective erythropoiesis in β-thalassemia causes iron over-absorption, due to feedback compensatory response to hypoxia, which suppresses hepcidin (Kattamis A., Papassotiriou I., Palaiologou D., Apostolakou F., Galani A., Ladis V., Sakellaropoulos N., and Papanikolaou G. "*The effects of erythropoetic activity and iron burden on hepcidin expression in patients with thalassemia major.*" Haematologica, 2006; 91(6), 809-12). Since the abnormally high iron levels that result from the suppression of hepcidin further stimulate erythropoiesis, anemia and iron overload are worsened in a vicious circle. HIF2α plays a major role in linking erythropoiesis and iron absorption, as HIF2α stimulates both synthesis of erythropoietin (EPO) and the production of the divalent metal transporter 1 (DMT1), duodenal cytochrome B (DCytB) and ferroportin (Anderson S. A., Nizzi C. P., Chang Y. I., Deck K. M., Schmidt P. J., Galy B., Damnernsawad A., Broman A. T., Kendziorski C., Hentze M. W, et al. "*The IRP1-HIF-2alpha axis coordinates iron and oxygen sensing with erythropoiesis and iron absorption.*" Cell Metab, 2013; 17(2), 282-90 and Schwartz A. J., Das N. K., Ramakrishnan S. K., Jain C., Jurkovic M. T., Wu J., Nemeth E., Lakhal-Littleton S., Colacino J. A., and Shah Y M. "*Hepatic hepcidin/intestinal HIF-2alpha axis maintains iron absorption during iron deficiency and overload.*" J Clin Invest, 2019; 129(1), 336-48). EPO stimulates the proliferation of erythroblasts and induces the production of the erythroid factor erythroferrone (ERFE), which in turn suppresses hepcidin (Kautz L., Jung G., Valore E. V., Rivella S., Nemeth E., and Ganz T. "*Identification of erythroferrone as an erythroid regulator of iron metabolism.*" Nat Genet, 2014). Therefore, correction of unbalanced iron absorption by induction of hepcidin synthesis or supplementation of hepcidin mimetics is evaluated as an attractive therapeutic approach to normalize the dysregulated iron metabolism in β-thalassemia.

Experimental drugs, such as shortened hepcidin-derived peptides containing unnatural amino acids (minihepcidins) or oligonucleotides that increase endogenous hepcidin synthesis by inhibition of Tmprss6 expression, have been shown to correct anemia and decrease iron overload in the Hbb th3/+ mouse model of non-transfusion dependent β-thalassemia intermedia (Casu C., Oikonomidou P. R., Chen H., Nandi V., Ginzburg Y., Prasad P., Fleming R. E., Shah Y. M., Valore E. V., Nemeth E., et al. "*Minihepcidin peptides as disease modifiers in mice affected by β-thalassemia and polycythemia vera.*" Blood 2016; 128(2), 265-76 and Schmidt P. J., Toudjarska I., Sendamarai A. K., Racie T., Milstein S., Bettencourt B. R., Hettinger J., Bumcrot D., and Fleming M. D. "*An RNAi therapeutic targeting Tmprss6 decreases iron overload in Hfe(−/−) mice and ameliorates anemia and iron overload in murine beta-thalassemia intermedia.*" Blood, 2013; 121(7), 1200-8 and Guo S., Casu C., Gardenghi S., Booten S., Aghajan M., Peralta R., Watt A., Freier S., Monia B. P., and Rivella S. "*Reducing TMPRSS6 ameliorates hemochromatosis and beta-thalassemia in mice.*" J Clin Invest, 2013; 123(4), 1531-41). Administration of hepcidin mimetic peptides to the th3/+ mouse, a model of non-transfusion dependent β-thalassemia resulted in relief of ineffective erythropoiesis, increased red cell survival time and improvement of anemia. In this model the prevention of iron overload due to reduction in the absorption of dietary iron turned out as an additional benefit of the hepcidin mimetic therapy.

In addition, synthetic human hepcidin (LJPC-401), as well as a hepcidin peptidomimetic (PTG-300) and an antisense oligonucleotide targeting Tmprss6 (IONIS-TMPRSS6-L RX) have been tested in clinical studies.

Regarding the treatment of thalassemia, it must be distinguished between the various forms and phenotypes of thalassemia. There are two main types of thalassemia: α-thalassemia (alpha-thalassemia) and β-thalassemia (beta-thalassemia), which affect a different part of the haemoglobin molecule. α-thalassemia is caused by mutations (gene deletion in chromosome 16) in the HBA1 and/or HBA2 genes, which encode alpha globin, whilst β-thalassemia is caused by mutations in the HBB gene, encoding beta globin. Each person has two copies of each of these genes, one inherited from the mother and one from the father. Loss (deletion) of some or all of the HBA1 and/or HBA2 genes results in a shortage of alpha globin, leading to α-thalassemia and mutations in the HBB gene leads to reduced levels of beta globin, causing β-thalassemia.

In β-thalassemia, clinical phenotypes are classified into three groups based on the degree to which beta globin production is impaired:

β-thalassemia minor (or trait)
β-thalassemia intermedia
β-thalassemia major

β-thalassemia minor (trait) occurs in heterozygotes ($\beta/\beta^+$ or $\beta/\beta^0$), who are usually asymptomatic with mild to moderate microcytic anemia. This phenotype may also occur in mild cases of $\beta^+/\beta^+$. Patients suffering from β-thalassemia minor (trait) generally do not require treatment. People affected by β-thalassemia minor can develop mild anemia or may have no signs or symptoms of the condition at all.

β-thalassemia intermedia is a variable clinical picture that is intermediate between thalassemia major or minor, caused by inheritance of 2 β-thalassemia alleles ($\beta^+/\beta^0$ or severe cases of $\beta^+/\beta^+$). Patients suffering from mild-to-moderate β-thalassemia intermedia may require occasional or intermittent infrequent transfusions to manage the disease and its complications.

β-thalassemia major (or Cooley anemia) occurs in homozygotes ($\beta^0/\beta^0$, $\beta^+/\beta^+$ or severe compound heterozygotes ($\beta^0/\beta^+$) and results from severe beta globin deficiency. β-thalassemia major is the most severe type of β-thalassemia.

These patients develop severe anemia and bone marrow hyperactivity. β-thalassemia major manifests by age 1 to 2 years with symptoms of severe anemia and transfusional and absorptive iron overload. Patients are jaundiced, and leg ulcers and cholelithiasis occur. Splenomegaly, often massive, is common. Splenic sequestration may develop, accelerating destruction of transfused normal red blood cells. Bone marrow hyperactivity causes thickening of the cranial bones and malar eminences. Long bone involvement predisposes to pathologic fractures and impairs growth, possibly delaying or preventing puberty. With iron overload, iron deposits in heart muscle may cause heart failure. Hepatic siderosis is typical, leading to functional impairment and cirrhosis. Patients suffering from β-thalassemia major necessarily require regular (lifelong) RBC transfusions (blood transfusions) for survival.

Also the interaction of hemoglobin E (HbE) with different forms of thalassemia results in a wide variety of clinical disorders, whereas its coinheritance with β-thalassemia is a condition called hemoglobin E β-thalassemia, which is by far the most common severe form of β-thalassemia in Asia and, globally, comprises approximately 50% of the clinically severe β-thalassemia disorders (Suthat Fucharoen and David J. Weatherall "*The Hemoglobin E Thalassemias*", Cold Spring Harb Perspect Med., 2012; 2 (8)). Hemoglobin E (HbE) is an extremely common structural hemoglobin variant that occurs at high frequencies throughout many Asian countries. It is a β-hemoglobin variant, which is produced at a slightly reduced rate and hence has the phenotype of a mild form of β-thalassemia. Although HbE alone does not cause any significant clinical problems, its interactions with various forms of α- and β-thalassemia produce a very wide range of clinical syndromes of varying severity.

A scoring system based on six independent parameters—hemoglobin level, age at disease presentation, age at receiving first blood transfusion, requirement for transfusion, spleen size, growth and development—has been developed to separate patients into three distinctive severity categories: mild, moderate, and severe with a scoring system consisting of six clinical criteria scored as 0, 0.5, 1, or 2, according to clinical presentation. HbE β-thalassemia patients with total scores ranging from 0 to 3.5, 4 to 7, and 7.5 to 10 are grouped as mild, moderate, and severe cases, respectively. The severe patients are very anemic and are transfusion dependent; some may have marked growth retardation, whereas the mild cases have mild anemia and usually have normal growth and development (Sripichai O, et al. "*A scoring system for the classification of β-thalassemia/Hb E disease severity*", Am J Hematol, 2008; 83: 482-484).

In 2012 a new terminology for clinical classification of thalassemia has been adopted by the Thalassemia International Federation in their guidelines, distinguishing between
non-transfusion-dependent β-thalassemia (NTDT) and
transfusion-dependent β-thalassemia (TDT).

This clinical classification of thalassemia is further described e.g. by Viprakasit V. et al. "*Clinical Classification, Screening and Diagnosis for Thalassemia*" Hematol. Oncol. Clin. N. Am., 2018; 32: 193-211. Therein, FIG. 1 illustrates that NTDT/TDT is a continuum and that both, NTDT and TDT can result from HbE/β-thalassemia, depending on the severity of the β-allele.

NTDT includes a variety of phenotypes that, unlike patients with β-thalassemia major or severe forms of hemoglobin E β-thalassemia, do not require regular transfusion therapy for survival. The most commonly investigated forms are β-thalassemia intermedia, hemoglobin E α- and β-thalassemia (mild and moderate forms), and α-thalassemia intermedia (hemoglobin H disease). However, transfusion-independence in such patients is not without side effects. Ineffective erythropoiesis, peripheral hemolysis and inadequate hepcidin production, the hallmarks of disease process, may lead to a variety of subsequent pathophysiologies including iron overload and hypercoagulability that ultimately lead to a number of serious clinical morbidities including slowed growth, delayed puberty, bone problems and/or an enlarged spleen.

In contrast TDT includes patients with β-thalassemia major and severe forms of hemoglobin E β-thalassemia, wherein the patients require regular red blood cell (RBC) transfusions for survival. TDT is the most severe form of β-thalassemia and is characterized by the requirement of regular blood transfusions, which inevitably leads to secondary iron overload, which is regularly treated with iron chelation therapy. Patients suffering from severe forms of β-thalassemia may also experience severe anemia, poor appetite, paleness, dark urine, yellow discoloration of skin (jaundice), and enlarged liver or heart. Regular blood transfusions and iron chelation therapy do not address the underlying pathological mechanism of the disease and are associated with increased risk of infection and adverse reactions. Further, the regular blood transfusions represent a considerable burden for patients and considerably reduce their quality of life.

The diagnosis and clinical classification are done by clinical evaluation applying acknowledged clinical and hematological parameters.

Iron overload is common in both thalassemia major and thalassemia intermedia but has a different etiology in each (Musallam K M, et al. "*Cross-talk between available guidelines for the management of patients with beta-thalassemia major.*" Acta Haematologica. 2013; 130(2): 64-73 and Musallam K M, et al. "*Iron overload in β-thalassemia intermedia: an emerging concern. Current Opinion in Hematology.*" 2013; 20(3): 187-192).

Patients with thalassemia major regularly receive RBC transfusions and without accompanying iron chelation therapy, the iron content from these transfusions can greatly increase the levels of circulating and stored iron in a patient's body.

In patients with thalassemia intermedia transfusions are not a major source of iron overload due to the low frequency of transfusions. However, patients with thalassemia intermedia experience iron overload because of increased intestinal absorption of iron, primarily driven by low serum levels of hepicidin resulting from chronic anemia, ineffective erythropoiesis, and tissue hypoxia.

The pathological effects of iron overload are broad and systemic in both thalassemia major and thalassemia intermedia patients, with some different and some overlapping clinical sequelae (Cappellini M D, et al. "*Guidelines for the Management of Transfusion Dependent Thalassaemia (TDT)*" (3rd edition), 2014 and Taher A, et al. "*Guidelines for the Management of Non Transfusion Dependent Thalassaemia (NTDT)*", 2013).

Both, the thalassemia major and thalassemia intermedia patient populations can experience endocrine system disruptions due to iron overload and may develop diabetes, hypothyroidism, and hypogonadism. However, thalassemia major patients generally experience iron overload earlier in life than thalassemia intermedia patients and as such can experience growth retardation and delayed puberty. Further, thalassemia major patients are at increased risk of heart failure due to iron induced cardiomyopathy, a condition that occurs significantly less frequently in thalassemia intermedia patients (Musallam K M, 2013). In thalassemia intermedia patients, an association was observed between increased concentration of liver iron and developing hepatic fibrosis and liver failure, potentially leading to hepatocellular carcinoma (Vichinsky E. "*Non-transfusion-dependent thalassemia and thalassemia intermedia: epidemiology, complications, and management.*" Current Medical Research and Opinion. 2016; 32(1): 191-204).

The long-term prognosis for patients suffering from thalassemia depends on the type and severity of the condition. For example, severe thalassemia can cause early death due to heart failure or liver complications, while less severe forms of thalassemia often do not shorten lifespan. Thalassemia major patients may live beyond the age of 40 if they are well transfused and adhere to their iron chelation therapy. The majority (71%) of thalassemia major deaths are related to cardiac complications resulting from iron overload (Galanello R, Origa R. "*Beta-thalassemia.*" Orphanet Journal of Rare Diseases. 2010; 5: 11).

The diagnosis of beta thalassemia differs for thalassemia major and thalassemia intermedia. Patients with thalassemia major generally present 6-24 months after birth with symptoms consisting of microcytic anemia, mild jaundice, and hepatosplenomegaly. Hematological findings include hemoglobin levels below 7 g/dL, an MCV (Mean Cell Volume) between 50 and 70 fL, and/or an MCH (Mean Cell Hemoglobin) between 12 and 20 pg (Cappellini M D, 2014).

Patients with thalassemia intermedia typically present later than thalassemia major patients between the ages of 2 and 6 in cases with more severely manifesting disease, while those on the milder end may remain asymptomatic into adulthood. Generally, thalassemia intermedia patients present with similar but milder symptoms compared with thalassemia major patients and thalassemia intermedia patients often present with extramedullary hematopoiesis. Hematological findings include a hemoglobin level between 7 and 10 g/dL, an MCV between 50 and 80 fL, and/or an MCH between 16 and 24 pg (Cappellini M D, 2014).

Once a diagnosis is suspected based on clinical presentation and hematological findings, confirmation is obtained through genetic analysis. Both mutation-specific PCR amplification and full β globin gene sequencing are available (Galanello R, 2010).

Various pharmaceutically active drugs from the group of iron chelators exist for treating iron overload or mild and mild-to-moderate phenotypes of β-thalassemia such as β-thalassemia minor and non-transfusion dependent β-thalassemia intermedia.

A further medicament in advanced clinical examination with an applied marketing authorization for treating or alleviating severe transfusion dependent β-thalassemia is Luspatercept, which is a recombinant engineered protein acting as ActRIIB signaling inhibitor, which is designed to neutralize certain proteins from the TGF-β family that slow down the maturation of RBCs. Luspatercept is administered parenterally. Luspatercept and its use in the treatment of transfusion-dependent thalassemia is described e.g. in WO2016183280.

The synthetic human hepcidin LJPC-401 of the company La Jolla Pharmaceutical and the hepcidin peptidomimetic PTG-300 of the company Protagonists Therapeutics, both for parenteral administration, entered phase II in a β-thalassemia study trial.

However, parenteral administration of drugs usually requires medical attendance, which further increases treatment costs and may negatively affect patient compliance and puts additional burden on the patient. In contrast, oral drug administration offers advantages over parenteral administration, such as the ease of administration by patients, in particular children, high degree of flexibility on dosages and formulation, cost-effectiveness, less sterility constraints and risk of infection, injection site reaction and anti-drug antibodies generation. Presently no oral drug for treating anemia in severe forms of β-thalassemia, in particular TDT, has been approved.

Considering the significant life threatening situation of patients suffering from severe forms of β-thalassemia, such as TDT, it is apparent that new and improved treatment options are required which achieve increased survival and better quality of life for patients affected by severe β-thalassemia.

J. H. Baek et al. *"Ferroportin inhibition attenuates plasma iron, oxidant stress, and renal injury following red blood cell transfusion in guinea pigs"*; Transfusion 2020 March; 60(4513-523 report results in the attenuation of plasma iron, NTBI levels, oxidative stress and cellular injury by intravenously administering the small-molecule ferroportin inhibitor VIT-2653, provided by Vifor (International) Ltd., immediately after acute red blood cell transfusions in a model with guinea pigs.

Besides the described treatment with Luspatercept, TDT is hitherto conventionally treated with regular blood transfusions (RBC transfusions) accompanied by regular co-treatment with iron chelating compounds which aims at the constant removal of excess iron resulting from the secondary iron overload caused by the regular blood transfusions.

Established drugs used in chelation therapy comprise deferoxamine (also known as desferrioxamine B; or Desferal®). Two newer drugs for iron chelation therapy, licensed for use in patients receiving regular blood transfusions to treat thalassemia, resulting in the development of iron overload, are deferasirox (also known as Exjade®) and deferiprone (also known as Ferriprox®).

WO2013/086312 A1 describes oral formulations comprising desazadesferrithiocin polyther (DADFT-PE) analogues for treating iron overload, including the treatment of subjects suffering from non-transfusion dependent thalassemia and transfusion dependent hereditary and acquired anemias, via iron chelation as the underlying mechanism of action.

The disadvantage of treating TDT only with regular blood transfusions and co-treatment of the occurring secondary iron overload by chelation therapy is the continuing need of regular removal of the excess iron from the body and the burden of lifelong regular transfusion and chelation therapy for the patients. Further, the established drugs for iron chelation therapy are known to exhibit a toxic potential, which becomes in particular problematic in long-term administration caused by the lifelong need of the TDT therapy.

However, as shown in the examples of the present invention, the combination of conventional chelation therapy with the ferroportin inhibitors of the present invention in a combination therapy turned out as a further effective approach in the novel treatment of thalassemia, in particular in TDT.

Low molecular weight compounds having activity as ferroportin inhibitors and their use for treating iron overload in mild and moderate β-thalassemia (e.g. β-thalassemia intermedia) by oral administration are described in the international applications WO2017/068089 and WO2017/068090. Further, international application WO2018/192973 relates to specific salts of selected ferroportin inhibitors described in WO2017/068089 and WO2017/068090. The ferroportin inhibitors described in said three international applications overlap with the compounds according to formula (I) used in the new medical indication of the present invention.

However, none of said documents describes the efficacy of said ferroportin inhibitors in the treatment of severe forms of transfusion dependent β-thalassemia (TDT) nor discloses the possibility of effectively treating TDT or ameliorating the burden connected with the conventional TDT treatment methods.

OBJECT OF THE INVENTION

The object of the present invention is to provide a new method for treating severe forms of β-thalassemia, such as in particular transfusion-dependent β-thalassemia (TDT). A particular object of the present invention can be seen in providing novel drug compounds for effectively treating TDT and the symptoms and pathological conditions associated therewith or ameliorating the burden connected with the conventional TDT treatment methods. In particular, novel drug compounds for treating TDT and the symptoms and pathological conditions associated therewith or for ameliorating the burden connected with the conventional TDT treatment methods using improved administration routes, such as in particular oral administration should be provided to simplify administration, reduce side-effects resulting from parenteral administration, enhance patient compliance, safe treatment costs and reduce the treatment burden for the patients. In a further aspect an object of the invention can be seen in providing compounds for treating TDT and the symptoms and pathological conditions associated therewith, which are easier and cheaper to prepare than drugs based on recombinant engineered proteins or genetically engineered drug compounds. A further aspect relates to providing a new combination therapy for treating severe forms of β-thalassemia, such as in particular TDT by administering an oral ferroportin inhibitor as described herein in a combination therapy with an iron chelator, in particular with deferasirox.

DESCRIPTION OF THE INVENTION

The inventors of the present invention surprisingly found that compounds of the general formula (I) as defined herein, which act as ferroportin inhibitor (FpnI), can be used for treating severe forms of β-thalassemia, such as transfusion-dependent β-thalassemia, including in particular β-thalassemia major and hemoglobin E β-thalassemia and the symptoms and pathological conditions associated therewith, such as in particular defective red blood cell production in the bone marrow, ineffective erythropoiesis, low hemoglobin levels/anemia, multiple organ dysfunction, iron overload, liver iron loading and cardiac iron overload, paleness, fatigue, jaundice, and splenomegaly.

Accordingly, a first aspect of the present invention relates to compounds according to formula (I) below for use in the treatment of transfusion-dependent β-thalassemia (TDT):

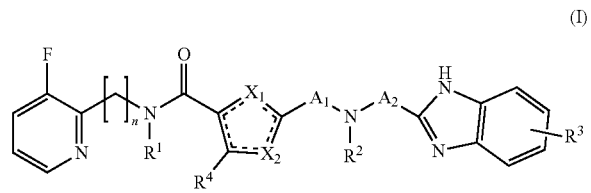

(I)

wherein
$X^1$ is N or O; and
$X^2$ is N, S or O;
with the proviso that $X^1$ and $X^2$ are different;
$R^1$ is selected from the group consisting of
  hydrogen and
  optionally substituted alkyl;
n is an integer of 1 to 3;
$A^1$ and $A^2$ are independently selected from the group of alkanediyl
$R^2$ is
  hydrogen, or
  optionally substituted alkyl;
or
$A^1$ and $R^2$ together with the nitrogen atom to which they are bonded form an optionally substituted 4- to 6-membered ring;
$R^3$ indicates 1, 2 or 3 optional substituents, which may independently be selected from the group consisting of
  halogen,
  cyano,
  optionally substituted alkyl,
  optionally substituted alkoxy, and
  a carboxyl group;
$R^4$ is selected from the group consisting of
  hydrogen,
  halogen,
  $C_1$-$C_3$-alkyl, and
  halogen substituted alkyl;
including also pharmaceutically acceptable salts, solvates, hydrates and polymorphs thereof.

Indication

The present invention relates to the new medical use of the compounds of the formula (I) and its salts, solvates, hydrates and polymorphs, as described herein, for the treatment of severe forms of β-thalassemia, such as in particular transfusion-dependent β-thalassemia (TDT), including in particular β-thalassemia major and severe forms of hemoglobin E β-thalassemia. As mentioned above, severe forms of β-thalassemia and hemoglobin E β-thalassemia, require that patients suffering therefrom achieve regular blood transfusions/Red Blood Cell transfusions (RBC transfusions). Such severe forms of β-thalassemia are thus also summarized as transfusion-dependent β-thalassemia (TDT).

The present invention thus further relates to a method of treating severe forms of β-thalassemia, such as in particular transfusion-dependent β-thalassemia (TDT), including in particular β-thalassemia major and severe forms of hemoglobin E β-thalassemia by administering to a patient in need thereof one or more of the compounds of the formula (I) of the present invention as defined herein, including its pharmaceutically acceptable salts, solvates, hydrates and polymorphs.

The new use and method of treatment according to the present invention comprises the administration of the compounds of the formula (I) of the present invention as defined herein, including its pharmaceutically acceptable salts, solvates, hydrates and polymorphs to patients suffering from β-thalassemia or haemoglobin E β-thalassemia and requiring regular blood transfusion.

In particular, the new use and method of treatment according to the present invention comprises the administration of the compounds of the formula (I) of the present invention as defined herein, including its pharmaceutically acceptable salts, solvates, hydrates and polymorphs to patients suffering from β-thalassemia major and/or severe haemoglobin E β-thalassemia, more particularly to patients suffering from β-thalassemia major.

The term "treat", "treatment" or "treating" in the context of the new use of the present invention includes amelioration of at least one symptom of or pathological condition associated with the transfusion-dependent β-thalassemia. Non-limiting examples of symptoms or pathological conditions associated with transfusion-dependent β-thalassemia include defective red blood cell production in the marrow, ineffective erythropoiesis, deficient hemoglobin levels, multiple organ dysfunction, iron overload, anemia, liver iron loading and cardiac iron overload, paleness, fatigue, jaundice, and splenomegaly.

The term "treat", "treatment" or "treating" in the context of the present invention further includes prophylaxis, e.g. by administering the compounds of the present invention prior to or accompanying blood transfusion to prevent or at least attenuate occurrence of transfusion-caused pathological conditions.

Patients with TDT have severe iron overload due to regular blood transfusion (BT). The major goals of blood transfusion therapy in the treatment of β-thalassemia are to correct the anemic condition and suppress erythropoiesis. This is considered to be accomplished at an Hb level of ≥9 g/dL. BT causes a transient upregulation of hepcidin, which returns to basal values when the hemoglobin (Hb) levels decrease (Pasricha S. R. et al. "*Transfusion suppresses erythropoiesis and increases hepcidin in adult patients with beta-thalassemia major: a longitudinal study.*" Blood, 2013; 122(1), 124-33). The administration of the ferroportin inhibitor compounds of formula (I) according to the present invention helps to prevent intestinal iron absorption during the intervals between transfusions, which helps to reduce further iron loading in TDT patients.

More importantly, BT generates non-transferrin bound iron (NTBI) which is released by macrophages recycling damaged RBCs contained in transfused RBC units and triggers oxidative stress, vascular damage and organ iron overload (Baek J. H. et al, "*Iron accelerates hemoglobin oxidation in vascular diseased guinea pigs following transfusion of stored blood.*" JCI Insight, 2017; 2 (9)). Accordingly, thalassemia patients on regular BT and iron chelation therapy have elevated NTBI levels which have been correlated to the presence of heart disease (Piga A, et al., "*High nontransferrin bound iron levels and heart disease in thalassemia major.*" Am J Hematol., 2009; 84(1), 29-33). The compounds of the formula (I) of the present invention, which act as ferroportin inhibitors, have been found to prevent these noxious effects by sequestrating iron in macrophages and therefore interrupting a vicious cycle in β-thalassemia.

The inventors of the present invention found that the compounds of the formula (I) of the present invention are particularly suitable for the treatment of transfusion-dependent thalassemia by limiting the iron availability for formation of toxic alpha globin aggregates. It has further been found that the compounds of the formula (I) of the present invention are particularly suitable for the treatment of transfusion-dependent thalassemia by limiting reactive oxygen species (ROS) in erythroid precursors and thereby improving erythropoiesis in patients suffering from severe forms of β-thalassemia such as TDT. As a result, more RBCs with extended life-span ameliorate anemia in TDT patients and improve tissue oxygenation. In TDT the compounds of the formula (I) further efficiently diminish elevated NTBI levels, which helps to prevent the occurrence of pathological conditions deriving therefrom, such as e.g. cardiac iron overload and thus heart diseases.

NTBI, which encompasses all forms of serum iron that are not tightly associated with transferrin, is chemically and functionally heterogeneous. LPI (Labile Plasma Iron) represents a component of NTBI that is both redox active and chelatable, capable of permeating into organs and inducing tissue iron overload. The compounds of the formula (I) have the potential to efficiently diminish elevated LPI levels in TDT.

The following parameters can be determined to evaluate the efficacy of the compounds of the present invention in the new medical use: serum iron, NTBI levels, LPI (Labile Plasma Iron) levels, erythropoietin, TSAT (transferrin saturation), Hb (hemoglobin), Hct (haematocrit), MCV (Mean Cell Volume), MCH (Mean Cell Hemoglobin), RDW (Red Blood Cell Distribution Width) and reticulocyte numbers, complete blood counts, spleen and liver weight, erythropoiesis in spleen and bone marrow, spleen and liver iron content and alpha-globin aggregates in RBC membranes. The determination can be carried out using conventional methods of the art, in particular by those described below in more detail. The compounds (I) of the present invention are suitable to improve at least one of these parameters.

As explained by Patel et al. (2012; cited above) in normal physiological conditions the level of transferrin is sufficient for complete scavenging of free iron, ensuring the absence of NTBI and accordingly NTBI levels in normal healthy individuals do not exceed 1 μmol/L and are mostly undetectable by most common methods. In the absence of transferrin NTBI levels up to 20 μmol/L were reported and in the presence of insufficient transferrin NTBI levels up to 10 μmol/L have been found. However, as described by Patel et al. (2012) and Brissot et al. (2012) the determination strongly depends from the applied method and assays used and the technical difficulties resulting from the determination of heterogeneous chemical forms of circulating NTBI must be taken into account. For example, fluorescent measurements with a repeatable accuracy down to 0.1 μM/L have been described by Hider et al. (2010) cited by Brissot et al. (2012). According to Patel et al. (2012; Table 1) elevated NTBI levels in clinical iron overload conditions range between 0.25 to 4.0 μmol/L (with varying accuracy and varying determination methods). Considering this, in the sense of the present invention NTBI levels are considered as elevated if detectable with the known methods (e.g. those described in Patel et al. (2012) or in Brissot et al. (2012), preferably when exceeding 0.1 μm/L.

In a particular aspect, the new treatment of the present invention results in reduced NTBI levels in a patient by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, or at least 100%, determined at any time point within a time period of up to 72 hours, up to 60 hours, up to 48 hours, up to 36 hours, up to 24 hours, or up to 12, 8, 6, 5, 4, 3, 2, 1 and 0.5 hours following the administration and as compared to the NTBI levels in the patient determined at any time point within 0.5, 1, 2, 3, 4, 5, 6, 8, 12, 24, 36, or 48 hours, or up to <1 week prior to the commencement of treatment of the invention. NTBI can be determined according to assays described in the Examples below.

In a particular aspect, the new treatment of the present invention results in reduced LPI levels in a patient by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, or at least 100%, determined at any time point within a time period of up to 72 hours, up to 60 hours, up to 48 hours, up to 36 hours, up to 24 hours, or up to 12, 8, 6, 5, 4, 3, 2, 1 and 0.5 hours following the administration and as compared to the total LPI levels in the patient determined at any time point within 0.5, 1, 2, 3, 4, 5, 6, 8, 12, 24, 36, or 48 hours, or up to <1 week prior to the commencement of treatment of the invention. LPI can be determined according to an assay described in the Examples below.

In a further aspect, the inventors of the present invention found that quantification of the alpha globin aggregates in RBCs is an important biomarker for efficacy of the compounds of the present invention in the presence or absence of blood transfusions. Alpha globin aggregates are measured by a method as described in the Examples below.

Precipitated alpha-globin aggregates contain heme and iron which generate reactive oxygen species (ROS) leading to a shortened lifespan of RBCs, anemia and tissue hypoxia. By reducing the alpha-globin aggregates in RBCs in TDT patients the compounds of the formula (I) of the present invention improve erythropoiesis, which has the potential to reduce the transfusion burden in TDT patients. The effect of the compounds of the present invention on ROS levels in donor RBCs can be monitored by commercially available far-red or green emitting ROS-sensitive sensor, e.g. as described in the Examples below.

Accordingly, in a further aspect, the new treatment of the present invention results in reduced alpha globin aggregate levels in a patient by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, or at least 100%, determined at any time point within a time period of up to one week, up to 2 weeks, up to 3 weeks, up to 4 weeks, up to 3 months following the first administration and as compared to the alpha globin aggregate levels in the patient determined at any time point within 1 week, 2 weeks, 3 weeks, or 4 weeks prior to the commencement of treatment of the invention. The levels of alpha-globin aggregates in RBCs can be determined according to an assay described in the Examples below.

In a further aspect, the new treatment of the present invention results in reduced ROS levels in RBCs of the patients by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, or at least 100%, determined at any time point within a time period of up to 5 days, up to 6 days, up to 7 days, up to 8 days, up to 9 days, up to 10 days, up to 11 days, up to 12 days, up to 13 days, up to 14 days, up to 15 days, up to 16 days, up to 17 days, up to 18 days, up to 19 days, up to 20 days, up to 21 days and up to 1 month following the first administration and/or following an ischemic event and as compared to the ROS levels in RBCs of the patient determined at any time point within 12 hours, 24 hours, 36 hours, 48 hours, 1 week, 2 weeks, 3 weeks, or 4 weeks prior to the commencement of treatment of the invention. ROS levels in RBCs can be determined according to an assay described in the Examples below.

As explained above, the reduction of elevated NTBI and LPI levels helps to decrease liver iron concentration and myocardial iron concentration.

Accordingly, in a further aspect, the new treatment may result in a decrease in liver iron concentration in the patient by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, or at least 100%, determined at any time point within a time period of up to one week, up to 2 weeks, up to 3 weeks, up to 4 weeks, up to 3 months following the first administration and as compared to the levels of liver iron concentration in the patient determined at any time point within 1 week, 2 weeks, 3 weeks, or 4 weeks prior to the commencement of treatment of the invention. Liver iron concentration can be determined according to an assay described in the Examples below.

In a further aspect, the new treatment may result in a decrease in myocardial iron concentration in the patient by at least 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95% or at least 100%, determined at any time point within a time period of up to one week, up to 2 weeks, up to 3 weeks, up to 4 weeks, up to 3 months following the first administration and as compared to myocardial iron concentration in the subject determined at any time point within 1 week, 2 weeks, 3 weeks, or 4 weeks prior to the commencement of treatment of the invention. Myocardial iron concentration can be determined according to an assay described in the Examples below.

In a further aspect, the new treatment may result in a reduction of spleen size in the patient by at least 5%, 10%, 15%, 20%, 25%, 30%, 35%, 40%, 45%, 50%, 55%, 60%, 65%, 70%, 75%, 80%, 85%, 90%, 95% or at least 100%, determined at any time point within a time period of up to one week, up to 2 weeks, up to 3 weeks, up to 4 weeks, up to 3 months following the first administration and as compared to spleen size in the subject determined at any time point within 1 week, 2 weeks, 3 weeks, or 4 weeks prior to the commencement of treatment of the invention. Spleen size can be determined according to conventional methods.

In a further aspect, the new treatment may result in an improvement of at least one of the parameters Hct, MCV, MCH, RDW and reticulocyte numbers in the patient by at least 5%, 10%, 15%, 20%, 25%, 30%, 35%, 40%, 45%, 50%, 55%, 60%, 65%, 70%, 75%, 80%, 85%, 90%, 95% or at least 100%, determined at any time point within a time period of up to one week, up to 2 weeks, up to 3 weeks, up to 4 weeks, up to 3 months following the first administration and as compared to the respective parameter in the subject determined at any time point within 1 week, 2 weeks, 3 weeks, or 4 weeks prior to the commencement of treatment of the invention. Said parameters can be determined according to conventional methods.

In a further aspect, the new treatment may result in an erythroid response, which comprises a reduction in transfusion burden in the patient by at least 33%, preferably by at least 50%. In principle, the erythroid response may comprises a reduction in transfusion burden in the patient by at least 10%, 15%, 20%, 25%, 30%, 33%, 35%, 40%, 45%, 50%, 55%, 60%, 65%, 70%, 75%, 80%, 85%, 90%, 95%, 98%, or 100%. In a further aspect, the new treatment may result in an erythroid response, which comprises a reduction in transfusion burden in the patient by at least 10%, 15%, 20%, 25%, 30%, 33%, 35%, 40%, 45%, 50%, 55%, 60%, 65%, 70%, 75%, 80%, 85%, 90%, 95%, 98%, or 100% for at least 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 5 months, 6 months, 7 months, 8 months, 9 months, 10 months, 11 months, 12 months, up to 18 months, up to 24 months or even beyond up to transfusion independence. In a further aspect, the new treatment may result in an erythroid response, which comprises a reduction of red blood cell transfusion in the patient by at least 1, 2, 3, 4 or more red blood cells units. In a further aspect, the new treatment may result in an erythroid response, which comprises a reduction of red blood cell transfusion in the patient by at least 1, 2, 3, 4 or more red blood cells units for at least 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 5 months, 6 months, 7 months, 8 months, 9 months, 10 months, 11 months, 12 months, up to 18 months, up to 24 months or even beyond up to independence of transfusion of red blood cell units. It is also possible that the erythroid response comprises one or more of the aforesaid improvements. Erythroid response can be determined as described in the Examples below.

Therein, one unit of red blood cells refers to a quantity of packed red blood cells derived from approximately 200-500 mL of donated blood. Usually, blood transfusions are adjusted depending on the age, severity of the disease and the patient's starting blood parameters. Guidelines for choosing the amount of blood transfusions recommend e.g.:

| | HAEMATOCRT OF IONO. REDCELLS | | | |
|---|---|---|---|---|
| | 50% | 60% | 75% | 80% |
| Target increase in haemgolobin level 2 g/dl | 12 ml/kg | 10 ml/kg | 8 ml/kg | 7.5 ml/kg |
| 3 g/dl | 18 ml/kg | 15 ml/kg | 12 ml/kg | 11.2 ml/kg |
| 4 g/dl | 24 ml/kg | 20 ml/kg | 16 ml/kg | 15 ml/kg |

An individual blood transfusion volume can further be calculated with the following formula:

(desired−actual Hb)×body weight[kg]×3/haematocrit of transfused unit=ml to be transfused According to the recommended transfusion scheme for thalassemia major the equivalent of 100 to 200 ml of pure red blood cell (RBC) per kg body weight per year are transfused.

In a further aspect, the new treatment may result in a reduction of transfusion burden in the patient compared to the transfusion burden for the patient within 1 week, 2 weeks, 3 weeks or 4 weeks, 2 months, 3 months, 4 months, 6 months, 8 months, 9 months, 12 months, 24 months, prior to the commencement of treatment of the invention.

In a further aspect, the new treatment may achieve that a transfusion-dependent β-thalassemia patient treated according to the new method of the present invention does not require red blood cell transfusion for at least 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 5 months, 6 months, 7 months, 8 months, 9 months, 10 months, 11 months, 12 months, 18 months, 24 months or even longer up to independence from red blood cell transfusions after treatment.

In a further aspect, the new treatment may result in reduced daily iron chelation therapy in the patient, such as, for example, a decrease in the dose or frequency of one or more iron chelation therapeutic agents administered to the patient. Non-limiting examples of iron chelation therapeutic agents include those mentioned above.

In a further aspect, the new treatment may result in reduced serum ferritin levels in the patient by at least 5%, 10%, 15%, 20%, 25%, 30%, 35%, 40%, 45%, 50%, 55%, 60%, 65%, 70%, 75%, 80%, 85%, 90%, 95% or at least 100%, determined at any time point within a time period of up to one week, up to 2 weeks, up to 3 weeks, up to 4 weeks, up to 3 months following the first administration and as compared to the serum ferritin levels in the patient determined at any time point within 1 week, 2 weeks, 3 weeks, or 4 weeks prior to the commencement of treatment of the invention. Serum ferritin levels can be determined according to conventional assays.

In a further aspect, the new treatment may result in a reduction of the symptoms associated with one or more transfusion-dependent β-thalassemia clinical complications. Non-limiting examples of transfusion-dependent β-thalassemia symptoms include growth retardation, pallor, jaundice, poor musculature, genu valgum, hepatosplenomegaly, leg ulcers, development of masses from extramedullary hematopoiesis, skeletal changes resulting from expansion of the bone marrow, and clinical complications of chronic red blood cell transfusions, such as, for example hepatitis B virus infection, hepatitis C virus infection and human immunodeficiency virus infection, alloimmunization, and organ damage due to iron overload, such as, for example, liver damage, heart damage and endocrine gland damage. Although the compounds of the formula (I) are not expected to directly affect growth differentiation factor 11 (GDF11), decrease of skeletal deformities can also occur caused by reduced extramedullary erythropoiesis. Accordingly, the compounds of the formula (I) as defined herein have the potential to ameliorate this pathological condition indirectly.

In a further aspect, the new treatment may result in an improvement in the quality of life in the patients as compared to the quality of life in the patients determined within the 1, 2, 3, or 4 week(s) prior to the commencement of treatment of the invention. The improvement of Quality of life is determined within 3, 6, 9, 12, 15, 18, 21 or 24 months after the commencement of the treatment. Quality of life can be determined according to an assay described in the Examples below.

With the new method of treatment according to the present invention, one or more of the aforesaid improvements can be achieved.

Patient Group

The present invention relates to the new medical use of the compounds of the formula (I) and its salts, solvates, hydrates and polymorphs, as described herein, for the treatment of severe forms of β-thalassemia.

In principle, the subjects to be treated in the new use according to the invention can be any mammals such as rodents and primates, and in a preferred aspect the new medical use relates to the treatment of humans. The subjects suffering from severe β-thalassemia and to be treated with the new method according to the invention are also designated as "patients".

The subjects to be treated can be of any age. A preferred aspect of the invention relates to the treatment of children and adolescents. Accordingly, in a preferred aspect of the invention the subjects to be treated with the new methods described herein are less than 18 years old. More particularly, the subjects to be treated with the new methods described herein are less than 16 years old, less than 15 years old, less than 14 years old, less than 13 years old, less than 12 years old, less than 11 years old, less than 10 years old, less than 9 years old, less than 8 years old, less than 7 years old, less than 6 years old, or less than 5 years old. In a further aspect of the invention the subjects to be treated with the new methods described herein are 1-3 years old, 3-5 years old, 5-7 years old, 7-9 years old, 9-11 years old, 11-13 years old, 3-15 years old, 15-20 years old, 20-25 years old, 25-30 years old, or greater than 30 years old. In the case of treating adults, the subjects to be treated with the new methods described herein are 18-25 years old, 20-25 years old, 25-30 years old, 30-35 years old, 35-40 years old, 40-45 years old, 45-50 years old, 50-55 years old, 55-60 years old, or greater than 60 years old. In the case of treating elderly patients the subjects to be treated with the new methods described herein are 60-65 years old, 65-70 years old, 70-75 years old, 75-80 years old, or greater than 80 years old.

The treatment of children and adolescents is particularly preferred due to the significant advantages provided by the treatment with the ferroportin inhibitor compounds of the formula (I) of the present invention. Said compounds can be administered orally, which is advantageous over parenteral administration of the so far available drugs (e.g. Luspatercept). Further, the orally bioavailable ferroportin inhibitors of the present invention turned out to have a moderate bioavailability and half-life in the body and are thus relatively quickly washed out. This leads to less adverse effects and a faster reversibility of the drug, which is of particular importance in the treatment of children.

The patient group or population suffering from the severe forms of β-thalassemia and to be treated with the new method according to the invention are selected from subjects (patients) having
- a) a genotype from the group consisting of β°/β°, β⁺/β⁺, β°/β⁺, and β°/HbE, preferably β⁺/β⁺, β°/β⁺, and β°/HbE, and/or
- b) a genotype comprising coinheritance of two severe hemoglobin beta chain mutations. Therein, "β⁰" refers to an allele associated with a lack of beta globin subunit synthesis. "β⁺" refers to an allele associated with reduced beta globin subunit synthesis. "Hb" refers to hemoglobin protein. "HbE" or "hemoglobin E" is a conventionally recognized term and refers to a mutated form of hemoglobin, for example, human hemoglobin. Hemoglobin E comprises two alpha subunits and two In a further aspect of the invention the patient group or population suffering from the severe forms of β-thalassemia and to be treated with the new method according to the invention are selected from subjects (patients) having elevated LPI levels. LPI levels are considered as elevated, if detectable with the known methods as discussed above. Preferably, elevated LPI levels in TDT patients ("Major TD & CH") according to the present invention are LPI values exceeding the values determined in NTDT patients ("Major Naïve" or "*Intermedia* Naïve") in the respective determination method as described in de Swart et al. "*Second international round robin for the quantification of serum non-transferrin-bound iron and labile plasma iron in patients with iron-overload disorders*" Haematologica, 2016; 101 (1): 38-45, Table 2:

|  |  | LPI assays | | | |
| --- | --- | --- | --- | --- | --- |
| Assay ID | | L1 | L2 | L3$^{c,d}$ | L4$^{e,d}$ |
| Assay subgroup | N | LPI | LPI | LPI | eLPI |
| Disease/Total β-Thalassemia | 60 | 0.09 (0.07) | 0.24 (0.17) | 0.14 (0.04) | 0.46 (0.11) |
| 4. Major Naïve | 6 | −0.01 (0.04) | 0.08 (0.09) | 0.01 (0.01) | 0.17 (0.05) |
| 5. Major TD & CH | 6 | 0.43 (0.12) | 0.68 (0.24) | 0.54 (0.15) | 1.43 (0.17) |
| 6. Intermedia Naïve | 7 | 0.28 (0.10) | 0.64 (0.25) | 0.52 (0.06) | 0.83 (0.14) | beta subunits, wherein position 26 of the beta subunit is mutated from glutamic acid to lysine (E26K). "HbE β-thalassemia" refers to the co-inheritance of hemoglobin E and a β° allele.

In a further aspect, the patient groups to be treated with the new method of the present invention further have hereditary persistence of fetal hemoglobin.

In a further aspect of the invention the patient group or population suffering from the severe forms of β-thalassemia and to be treated with the new method according to the invention are selected from subjects (patients) having elevated NTBI levels. NTBI levels are considered as elevated, if detectable with the known methods as discussed above. Preferably, NTBI levels 0.1 μM/L are considered as elevated in TDT patients. More preferably, elevated NTBI levels in TDT patients ("Major TD & CH"; CH=receiving chelation) according to the present invention are NTBI values exceeding the values determined in NTDT patients ("Major Naïve" or "*Intermedia* Naïve") in the respective determination method as described in de Swart et al. "*Second international round robin for the quantification of serum non-transferrin-bound iron and labile plasma iron in patients with iron-overload disorders*" Haematologica, 2016; 101(1): 38-45, Table 2:

Usually, the hemoglobin level (Hb) is used to classify the severity and form of thalassemia. Patients suffering from mild and mild-to-moderate forms of thalassemia, such as thalassemia minor or intermedia maintains Hb levels between 9 and 12 g/dl or between 6 and 7 g/dl, respectively. Patients suffering from severe forms of thalassemia as described herein, i.e. TDT patients, are usually classified by a Hb level of <7 g/dl on two consecutive tests or in patients with a hemoglobin level z 7 g/dL that also present with facial changes, skeletal fractures, extramedullary hematopoiesis or growth retardation. Hb levels in TDT patients may be as low as 4 to 5 g/dl. Although, international guidelines recommend transfusing patients reaching a hemoglobin range of 9-0 g/dL with the optimal post-transfusion range being 13-14 g/dL, in clinical practice Hb levels up to 7 g/dL are usually considered as sufficient without regular transfusion and then under transfusion the usual aim is to maintain patients at hemoglobin levels between 9.5 and 10 g/dL. Reaching the recommended higher Hb levels of β-14 g/dL would require an undue increase in transfusion burden. However, the amount of blood required varies greatly between patients and is largely influenced by the patient's weight and targeted hemoglobin level.

Considering this, in a further aspect of the invention the patient group or population suffering from the severe forms

|  |  | NTBI assays | | | | |
| --- | --- | --- | --- | --- | --- | --- |
| Assay ID | | N1 | N2$^e$ | N3$^a$ | N4$^b$ | N6 |
| Assay subgroup | N | DCI | NTBI | NTBI | NTBI | Isoform |
| Disease/Total β-Thalassemia | 60 | 1.60 (0.37) | −0.73 (0.20) | 1.32 (0.14) | 2.19 (0.64) | 1.10 (0.15) |
| 4. Major Naïve | 6 | 0.61 (0.25) | −1.19 (0.17) | 0.76 (0.05) | 1.68 (1.07) | 1.08 (0.36) |
| 5. Major TD & CH | 6 | 5.79 (0.65) | 0.38 (0.27) | 2.46 (0.12) | 4.00 (0.67) | 0.87 (0.11) |
| 6. Intermedia Naïve | 7 | 3.32 (0.44) | 0.04 (0.17) | 2.46 (0.17) | 3.74 (2.25) | 1.51 (0.06) |

*DCI = direct chelatable iron of β-thalassemia and to be treated with the new method according to the invention can be selected from subjects (patients) having hemoglobin (Hb) levels below 7 g/dL or hemoglobin level ≥7 g/dL but also present with facial changes, skeletal fractures, extramedullary hematopoiesis or growth retardation.

In a further aspect of the invention the patient group or population suffering from the severe forms of β-thalassemia and to be treated with the new method according to the invention can be selected from subjects (patients) having an MCV between 50 and 70 fL.

In a further aspect of the invention the patient group or population suffering from the severe forms of β-thalassemia and to be treated with the new method according to the invention can be selected from subjects (patients) having an MCH between 12 and 20 pg.

In a further aspect the patient group or population suffering from the severe forms of β-thalassemia and to be treated with the new method according to the invention can be selected from subjects (patients) having one or more of the characteristics comprising a) Hb levels below 7 g/dL or hemoglobin level ≥7 g/dL and facial changes, skeletal fractures, extramedullary hematopoiesis or growth retardation, b) MCV (between 50 and 70 fL and c) MCH between 12 and 20 pg.

In a further aspect of the invention the patient group or population suffering from the severe forms of β-thalassemia and to be treated with the new method according to the invention receives regular blood transfusions. Thalassemia patients requiring more than 5 blood transfusions per 24 weeks (in accordance with Cappellini M D, et al. "The Believe Trial: Results of a Phase 3, Randomized, Double-Blind, Placebo-Controlled Study of Luspatercept in Adult Beta-Thalassemia Patients Who Require Regular Red Blood Cell (RBC) Transfusions". Blood 2018) are generally recognized as TDT patients, whereas patients requiring 5 or less blood transfusions per 24 weeks are usually still considered as NTDT patients. However, further clinical symptoms and parameters also play an important role in determining TDT vs. NTDT status as discussed above in detail. Regular blood transfusions further mean more than one repeating transfusion of red blood cell (RBC) units within time intervals of at least up to two months or in shorter intervals. The intervals may be of equal length or may vary depending on the individual patient, the course of disease, its severity and the treatment response. Regular blood transfusion may further comprise the repeating transfusion of equal or varying transfusion units at subsequent transfusion time points. Regular blood transfusion may comprise

- repeated blood transfusions of equal RBC units in varying subsequent time intervals or
- repeated blood transfusions of equal RBC units in equal subsequent time intervals or
- repeated blood transfusions of varying RBC units in equal subsequent time intervals or
- repeated blood transfusions of varying RBC units in varying subsequent time intervals.

In a further aspect of the invention regular blood transfusion means transfusion-free periods of not more than 3 months, preferably of not more than 2 months.

In a further aspect of the invention the patient group or population suffering from the severe forms of β-thalassemia and to be treated with the new method according to the invention are selected from subjects (patients) which require regular iron chelation therapy.

Such patient group or population requiring regular iron chelation therapy may further be characterized by one or more of the characteristics defined above.

Administration Forms

In a further aspect of the invention the treatment of severe forms of β-thalassemia, such as transfusion-dependent β-thalassemia and/or β-thalassemia major comprises the oral administration of one or more of the compounds of the formula (I), its salts, solvates, hydrates or polymorphs, each as described anywhere herein, to a patient in need thereof.

For this purpose, the compounds of the formula (I) according to the invention are preferably provided in medicaments or pharmaceutical compositions in the form of oral administration forms, including e.g. pills, tablets, such as enteric-coated tablets, film tablets and layer tablets, sustained release formulations for oral administration, depot formulations, dragees, granulates, emulsions, dispersions, microcapsules, microformulations, nanoformulations, liposomal formulations, capsules, such as enteric-coated capsules, powders, microcrystalline formulations, epipastics, drops, ampoules, solutions and suspensions for oral administration.

In a preferred embodiment of the invention the compounds of the formula (I) according to the invention are administered in the form of a tablet or capsule, as defined above. These may be present, for example, as acid resistant forms or with pH dependent coatings.

Accordingly, a further aspect of the present invention relates to the compounds of the formula (I) according to the invention, including pharmaceutically acceptable salts, solvates, hydrates and polymorphs thereof, as well as medicaments, compositions and combined preparations comprising the same for the use in the treatment of severe forms of β-thalassemia, such as in particular transfusion-dependent β-thalassemia and/or β-thalassemia major in the form of oral administration forms.

Dosing Regimen

A further aspect of the invention relates to the compounds of the formula (I) according to the invention for the use according to the present invention, wherein the treatment is characterized by one of the following dosing regimens:

In one aspect the compounds of the formula (I) according to the invention can be administered to a patient in need thereof in a dose of 0.001 to 500 mg, for example 1 to 4 times a day. However, the dose can be increased or reduced depending on the age, weight, condition of the patient, severity of the disease or type of administration. In a further aspect of the invention the compounds of the formula (I) can be administered as a dose of 0.1 mg, 0.2 mg, 0.3 mg, 0.4 mg, 0.5 mg, 0.6 mg, 0.7 mg, 0.8 mg, 0.9 mg, 1 mg, 1.5 mg, 2 mg, 2.5 mg, 3 mg, 3.5 mg, 4 mg, 4.5 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 155 mg, 160 mg, 165 mg, 170 mg, 175 mg, 180 mg, 185 mg, 190 mg, 195 mg, 200 mg, 205 mg, 210 mg, 215 mg, 220 mg, 225 mg, 230 mg, 235 mg, 240 mg, 245 mg, 250 mg, 255 mg, 260 mg, 265 mg, 270 mg, 275 mg, 280 mg, 285 mg, 290 mg, 295 mg, 300 mg, 325 mg, 350 mg, 375 mg, 400 mg, 425 mg, 450 mg, 475 mg, 500 mg.

Preferred is a dose of between 0.5 to 500 mg, more preferred between 1 to 300 mg or 3 to 300 mg, more preferred between 1 to 250 mg or 5 to 250 mg.

Most preferred is a dose of 5 mg, 15 mg, 60 mg, 120 mg or 240 mg.

It is possible to administer the above defined dosages as a total daily dose either in a single dose daily or divided into sub-doses for administration twice or more times daily.

In a further aspect a dose between 0.001 to 35 mg/kg body weight, between 0.01 to 35 mg/kg body weight, between 0.1 to 25 mg/kg body weight, or between 0.5, 1, 2, 3, 4, 5, 6, 7, 8, 9, 10 and up to 20 mg/kg body weight can be administered. Particularly preferred is a dose of 120 mg for patients with >50 kg body weight and of 60 mg for patients with <50 kg body weight, in each case once or twice daily.

In a further aspect it is possible to select one of the above defined dosages as an initial dose and subsequently administer 1 or more times the same or varying doses of those defined above in repeating intervals of 1 to 7 days, 1 to 5 days, preferably of 1 to 3 days, or every second day.

The initial dose and the subsequent doses can be selected among the above defined dosages and adjusted/varied in accordance with the need of the TDT patient within the provided ranges.

In particular, the amount of subsequent doses can be appropriately selected depending on the individual patient, the course of disease and the treatment response. It is possible to administer 1, 2, 3, 4, 5, 6, 7, and more subsequent doses.

It is possible that the initial dose is equal or different to the one or more subsequent doses. It is further possible, that the subsequent doses are equal or different.

The repeating intervals can be of the same length or can be varied depending on the individual patient, the course of disease and the treatment response.

Preferably, the subsequent doses are of decreasing amount with increasing number of subsequent dosing.

Preferably a dose of between 3 mg and 300 mg, more preferred between 5 mg and 250 mg, most preferred of 5 mg, 15 mg, 60 mg, 120 mg or 240 mg is administered once daily over a treatment period of at least 3 days, at least 5 days, at least 7 days. In a further preferred aspect a dose of 60 mg or 120 mg is administered once daily. In a further preferred aspect a total daily dose of 120 mg is administered by administering twice daily a 60 mg dose.

In a further preferred aspect a total daily dose of 240 mg is administered by administering twice daily a 120 mg dose. Said doses turned out to be safe and well tolerated.

The preferred dosing regimen further showed fast oral absorption with detectable levels as early as 15 to 30 minutes post-dose. The absorption level can be maintained stable even upon repeated dosing and no critical accumulation is observed.

The preferred dosing regimen further turned out to efficiently decrease mean serum iron levels and mean calculated transferrin saturation and to shift the mean serum hepcidin peak, indicating its efficiency for treating TDT.

In a further aspect of the invention, the initial and one or more subsequent dosing is adjusted depending on the hemoglobin concentration of the treated patient. The hemoglobin concentration is determined with conventional methods.

Ferroportin (Fpn) Inhibitor Compounds

The present invention relates to the new medical use of the compounds of the formula (I) as defined herein:

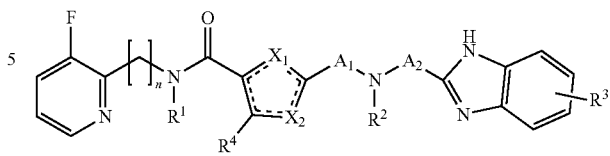

(I)

Therein and throughout the invention, the substituent groups have the meaning as defined in detail anywhere herein:

Optionally substituted alkyl preferably includes: linear or branched alkyl preferably containing 1 to 8, more preferably 1 to 6, particularly preferably 1 to 4, even more preferred 1, 2 or 3 carbon atoms, also being indicated as $C_1$-$C_4$-alkyl or $C_1$-$C_3$-alkyl.

Optionally substituted alkyl further includes cycloalkyl containing preferably 3 to 8, more preferably 5 or 6 carbon atoms.

Examples of alkyl residues containing 1 to 8 carbon atoms include: a methyl group, an ethyl group, an n-propyl group, an i-propyl group, an n-butyl group, an i-butyl group, a sec-butyl group, a t-butyl group, an n-pentyl group, an i-pentyl group, a sec-pentyl group, a t-pentyl group, a 2-methylbutyl group, an n-hexyl group, a 1-methylpentyl group, a 2-methylpentyl group, a 3-methylpentyl group, a 4-methylpentyl group, a 1-ethylbutyl group, a 2-ethylbutyl group, a 3-ethylbutyl group, a 1,1-dimethylbutyl group, a 2,2-dimethylbutyl group, a 3,3-dimethylbutyl group, a 1-ethyl-1-methylpropyl group, an n-heptyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 4-ethylpentyl group, a 1,1-dimethylpentyl group, a 2,2-dimethylpentyl group, a 3,3-dimethylpentyl group, a 4,4-dimethylpentyl group, a 1-propylbutyl group, an n-octyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 5-ethylhexyl group, a 1,1-dimethylhexyl group, a 2,2-dimethylhexyl group, a 3,3-dimethylhexyl group, a 4,4-dimethylhexyl group, a 5,5-dimethylhexyl group, a 1-propylpentyl group, a 2-propylpentyl group, etc. Those containing 1 to 4 carbon atoms ($C_1$-$C_4$-alkyl), such as in particular methyl, ethyl, n-propyl, i-propyl, n-butyl, i-butyl, sec-butyl, and t-butyl are preferred. $C_1$-$C_3$ alkyl, in particular, methyl, ethyl, propyl and i-propyl are more preferred. Most preferred are $C_1$ and $C_2$ alkyl, such as methyl and ethyl.

Cycloalkyl residues containing 3 to 8 carbon atoms preferably include: a cyclopropyl group, a cyclobutyl group, a cyclopentyl group, a cyclohexyl group, a cycloheptyl group and a cyclooctyl group. A cyclopropyl group, a cyclobutyl group, a cyclopentyl group and a cyclohexyl group are preferred. A cyclopropyl group is particularly preferred.

Substituents of the above-defined optionally substituted alkyl preferably include 1, 2 or 3 of the same or different substituents, selected, for example, from the group consisting of: halogen as defined below, such as preferably F, cycloalkyl as defined above, such as preferably cyclopropyl, optionally substituted heteroaryl as defined below, such as preferably a benzimidazolyl group, optionally substituted amino as defined below, such as preferably an amino group or benzyloxycarbonylamino, a carboxyl group, an aminocarbonyl group as defined below, as well as an alkylene group such as in particular a methylene-group, forming for example a methylene-substituted ethyl-group

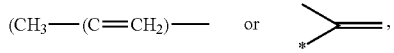

wherein * indicates the binding site).

Within the meaning of the present invention, halogen includes fluorine, chlorine, bromine and iodine, preferably fluorine or chlorine, most preferred is fluorine.

Examples of a linear or branched alkyl residue substituted by halogen and containing 1 to 8 carbon atoms include: a fluoromethyl group, a difluoromethyl group, a trifluoromethyl group, a chloromethyl group, a dichloromethyl group, a trichloromethyl group, a bromomethyl group, a dibromomethyl group, a tribromomethyl group, a 1-fluoroethyl group, a 1-chloroethyl group, a 1-bromoethyl group, a 2-fluoroethyl group, a 2-chloroethyl group, a 2-bromoethyl group, a difluoroethyl group such as a 1,2-difluoroethyl group, a 1,2-dichloroethyl group, a 1,2-dibromoethyl group, a 2,2-difluoroethyl group, a 2,2-dichloroethyl group, a 2,2-dibromoethyl group a 2,22-trifluoroethyl group, a heptafluoroethyl group, a 1-fluoropropyl group, a 1-chloropropyl group, a 1-bromopropyl group, a 2-fluoropropyl group, a 2-chloropropyl group, a 2-bromopropyl group, a 3-fluoropropyl group, a 3-chloropropyl group, a 3-bromopropyl group, a 1,2-difluoropropyl group, a 1,2-dichloropropyl group, a 1,2-dibromopropyl group, a 2,3-difluoropropyl group, a 2,3-dichloropropyl group, a 2,3-dibromopropyl group, a 3,3,3-trifluoropropyl group, a 2,2,3,3,3-pentafluoropropyl group, a 2-fluorobutyl group, a 2-chlorobutyl group, a 2-bromobutyl group, a 4-fluorobutyl group, a 4-chlorobutyl group, a 4-bromobutyl group, a 4,4,4-trifluorobutyl group, a 2,2,3,3,4,4,4-heptafluorobutyl group, a perfluorobutyl group, a 2-fluoropentyl group, a 2-chloropentyl group, a 2-bromopentyl group, a 5-fluoropentyl group, a 5-chloropentyl group, a 5-bromopentyl group, a perfluoropentyl group, a 2-fluorohexyl group, a 2-chlorohexyl group, a 2-bromohexyl group, a 6-fluorohexyl group, a 6-chlorohexyl group, a 6-bromohexyl group, a perfluorohexyl group, a 2-fluoroheptyl group, a 2-chloroheptyl group, a 2-bromoheptoyl group, a 7-fluoroheptyl group, a 7-chloroheptyl group, a 7-bromoheptyl group, a perfluoroheptyl group, etc. Fluoroalkyl, difluoroalkyl and trifluoroalkyl are mentioned in particular, and trifluoromethyl and mono- and di-fluoroethyl is preferred. Particularly preferred is trifluoromethyl.

Examples of a cycloalkyl-substituted alkyl group include the above-mentioned alkyl residues containing 1 to 3, preferably 1 cycloalkyl group such as, for example: cyclopropylmethyl, cyclobutylmethyl, cyclopentylmethyl cyclohexylmethyl, 2-cyclopropylethyl, 2-cyclobutylethyl, 2-cyclopentylethyl 2-cyclohexylethyl, 2- or 3-cyclopropylpropyl, 2- or 3-cyclobutylpropyl, 2- or 3-cyclopentylpropyl, 2- or 3-cyclohexylpropyl, etc. Preferred is cyclopropylmethyl.

Examples of a heteroaryl-substituted alkyl group include the above-mentioned alkyl residues containing 1 to 3, preferably 1 (optionally substituted) heteroaryl group, such as, for example a pyridinyl, a pyridazinyl, a pyrimidinyl, a pyrazinyl, a pyrazolyl, an imidazolyl, a benzimidazolyl, a thiophenyl, or an oxazolyl group, such as pyridine-2-yl-methyl, pyridine-β-yl-methyl, pyridine-4-yl-methyl, 2-pyridine-2-yl-ethyl, 2-pyridine-1-yl-ethyl, 2-pyridine-3-yl-ethyl, pyridazine-3-yl-methyl, pyrimidine-2-yl-methyl, pyrimidine-4-yl-methyl, pyrazine-2-yl-methyl, pyrazol-3-yl-methyl, pyrazol-4-yl-methyl, pyrazol-5-yl-methyl, imidazole-2-yl-methyl, imidazole-5-yl-methyl, benzimidazol-2-yl-methyl, thiophen-2-yl-methyl, thiophen-3-yl-methyl, 1,3-oxazole-2-yl-methyl.

Preferred is an alkyl group which is substituted with a benzimidazolyl group, such as benzimidazol-2-yl-methyl and benzimidazol-2-yl-ethyl.

Examples of an amino-substituted alkyl residue include the above-mentioned alkyl residues containing 1 to 3, preferably 1 (optionally substituted) amino group, as defined below, such as, for example, aminoalkyl ($NH_2$-alkyl) or mono- or dialkylamino-alkyl, such as aminomethyl, 2-aminoethyl, 2- or 3-aminopropyl, methylaminomethyl, methylaminoethyl, methylaminopropyl, 2-ethylaminomethyl, 3-ethylaminomethyl, 2-ethylaminoethyl, 3-ethylaminoethyl, etc. with 3-aminopropyl being preferred, or an alkyl group, which may be substituted with an optionally substituted alkyloxycarbonylamino group such as a group according to formula

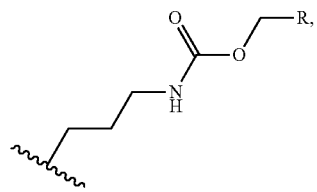

wherein R defines a phenyl group, forming a benzyloxycarbonylaminopropyl group.

Optionally substituted amino according to the invention preferably includes: amino ($—NH_2$), optionally substituted mono- or dialkylamino (alkyl-NH—, (alkyl)$_2$N—), wherein with respect to "alkyl" reference can be made to the definition of optionally substituted alkyl above. Preferred is mono- or dimethylamino, mono- or diethylamino and mono-propylamino. Most preferred is an amino group ($—NH_2$), and monopropylamino.

Further, in the sense of the present invention, a carboxyl group indicates a group [—(C=O)—OH] and an aminocarbonyl group indicates a group [$NH_2$—(C=O)—].

Optionally substituted alkoxy includes an optionally substituted alkyl-O-group, wherein reference may be made to the foregoing definition of the alkyl group. Preferred alkoxy groups are linear or branched alkoxy groups containing up to 6 carbon atoms such as a methoxy group, an ethoxy group, an n-propyloxy group, an i-propyloxy group, an n-butyloxy group, an i-butyloxy group, a sec-butyloxy group, a t-butyloxy group, an n-pentyloxy group, an i-pentyloxy group, a sec-pentyloxy group, a t-pentyloxy group, a 2-methylbutoxy group, an n-hexyloxy group, an i-hexyloxy group, a t-hexyloxy group, a sec-hexyloxy group, a 2-methylpentyloxy group, a 3-methylpentyloxy group, a 1-ethylbutyloxy group, a 2-ethylbutyloxy group, a 1,1-dimethylbutyloxy group, a 2,2-dimethylbutyloxy group, a 3,3-dimethylbutyloxy group, a 1-ethyl-1-methylpropyloxy group, as well as cycloalkyloxy groups such as a cyclopentyloxy group or a cyclohexyloxy group. A methoxy group, an ethoxy group, an n-propyloxy group and an i-propyloxy group are preferred. A methoxy and ethoxy group is more preferred. Particularly preferred is a methoxy group.

Throughout the invention, optionally substituted alkanediyl is preferably a divalent straight-chained or branched alkanediyl radical having from 1 to 6, preferably from 1 to 4, more preferably 1, 2 or 3 carbon atoms, which can optionally carry from 1 to 3, preferably 1 or 2 substituents selected from the group consisting of halogen, hydroxyl (—OH), an oxo group (C=O; forming a carbonyl or acyl group [—(C=O)—]) and an alkyl group as defined above such as preferably methyl. The following may be mentioned as preferred examples; methylene, ethane-1,2-diyl, ethane-1,1-diyl, propane-1,3-diyl, propane-1,1-diyl, propane-1,2-diyl, propane-2,2-diyl, butane-1,4-diyl, butane-1,2-diyl, butane-1,3-diyl, butane-2,3-diyl, butane-1,1-diyl, butane-2,2-diyl, butane-3,3-diyl, pentane-1,5-diyl, etc. Particularly preferred is methylene, ethane-1,2-diyl, ethane-1,1-diyl, propane-1,3-diyl, propane-2,2-diyl, and butane-2,2-diyl. Most preferred are methylene, ethane-1,2-diyl and propane-1,3-diyl.

A preferred substituted alkanediyl radical is a hydroxy-substituted alkanediyl such as a hydroxy-substituted ethanediyl, an oxo-substituted alkanediyl such as an oxo-substituted methylene or ethanediyl radical, forming a carbonyl or an acyl (acetyl) group, a halogen substituted alkanediyl group such as an alkanediyl group being substituted with one or two halogen atoms selected from F and Cl, preferably 2,2-di-fluoro-ethanediyl, or an alkanediyl group which is substituted with a methyl group.

According to the present invention it is further possible that $A^1$, having the meaning of a linear or branched alkanediyl group as defined above, and $R^2$, having the meaning of an optionally substituted alkyl group as defined above, together with the nitrogen atom to which they are bonded form an optionally substituted 4- to 6-membered ring, which may be substituted with 1 to 3 substituents as defined above. Accordingly, $A^1$ and $R^2$ may together from a group according to one the following formulae

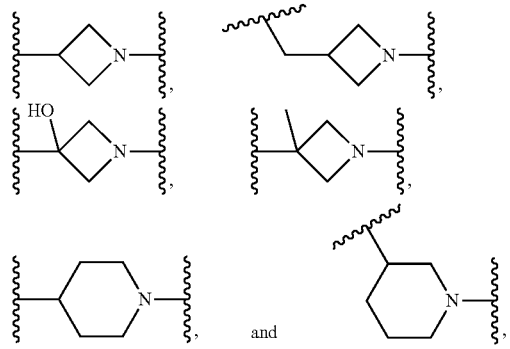

Therein a (substituted or unsubstituted) 4-membered ring-formation is preferred, such as very particularly a group

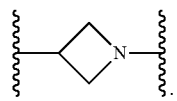

Therein the left-hand binding site indicates the direct binding site to the heterocyclic 5-membered ring between the positions $X^1$ and $X^2$ in formula (I) of the present invention. The right-hand binding site indicates the binding site to the group $A^2$ having the meaning of an alkanediyl group as defined herein.

In the formula (I) as defined anywhere herein n has the meaning of an integer of 1 to 3, including 1, 2 or 3 thus indicating a methylene-group, an ethane-1,2-diyl group or a propane-1,3-diyl group. More preferably n is 1 or 2 and even more preferably n is 1, indicating a methylene group.

In the present invention the individual substituents of the formula (I) above may have the following meaning:
A) $X^1$ is N or O; and
$X^2$ is N, S or O;
with the proviso that $X^1$ and $X^2$ are different;
thus forming 5-membered heterocycles according to the formulae

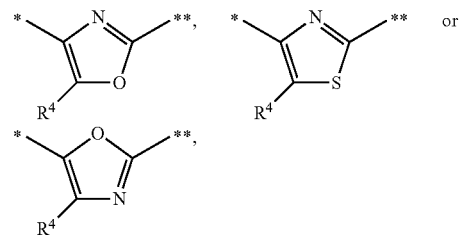

wherein * indicates the binding site to the aminocarbonyl-group and ** indicates the binding site to the $A^1$-group.
B) n is an integer of 1, 2 or 3; preferably n is 1 or 2, more preferably n is 1
C) $R^1$ is selected from the group consisting of
hydrogen and
optionally substituted alkyl (as defined above);
preferably $R^1$ is hydrogen or methyl, more preferably $R^1$ is hydrogen.
D) $R^2$ is selected from the group consisting of
hydrogen, and
optionally substituted alkyl (as defined above);
preferably $R^2$ is hydrogen or $C_1$-$C_4$-alkyl, more preferably $R^2$ is hydrogen or methyl, even more preferably $R^2$ is hydrogen.
E) $R^3$ indicates 1, 2 or 3 optional substituents, which may independently be selected from the group consisting of
halogen (as defined above),
cyano,
optionally substituted alkyl (as defined above),
optionally substituted alkoxy (as defined above), and
a carboxyl group (as defined above);
preferably $R^3$ indicates 1 or 2 optional substituents, which may independently be selected from the consisting of
halogen,
cyano,
alkyl (as defined above), which may be substituted with 1, 2 or 3 halogen atoms (as defined above),
optionally substituted alkoxy (as defined above), and
a carboxyl group (as defined above);
more preferably $R^3$ indicates 1 or 2 optional substituents, which may independently be selected from the group consisting of
F and Cl,
cyano,
trifluoromethyl,
methoxy, and
a carboxyl group;
even more preferably $R^3$ is hydrogen, indicating an unsubstituted terminal benzimidazolyl-ring in formula (I).
F) $R^4$ is selected from the group consisting of
hydrogen,
halogen (as defined above), $C_1$-$C_5$-alkyl, and
halogen substituted alkyl (as defined above);
preferably $R^4$ is selected from the group consisting of
hydrogen
Cl,
methyl, ethyl, iso-propyl, and
trifluoromethyl;
more preferably $R^4$ is selected from the group consisting of
hydrogen,
Cl,
methyl, and
trifluoromethyl;
more preferably $R^4$ is selected from the group consisting of
hydrogen,
Cl, and
methyl;
even more preferably $R^4$ is hydrogen.

G) $A^1$ is alkanediyl;
preferably $A^1$ is methylene or ethane-1,2-diyl, more preferably $A^1$ is ethane-1,2-diyl.

H) $A^2$ is alkanediyl;
preferably $A^2$ is methylene, ethane-1,2-diyl or propane-1,3-diyl;
more preferably $A^2$ is methylene or ethane-1,2-diyl;
even more preferably $A^2$ is ethane-1,2-diyl.

I) or $A^1$ and $R^2$ together with the nitrogen atom to which they are bonded form an optionally substituted 4- to 6-membered ring as defined above;
therein $A^1$ and $R^2$ together with the nitrogen atom to which they are bonded preferably form an optionally substituted 4-membered ring as defined above;
therein $A^1$ and $R^2$ together with the nitrogen atom to which they are bonded more preferably form an unsubstituted 4-membered ring (azetidinyl-ring).

The substituents of the compounds of the following (I) may in particular have the following meaning:

n has any of the meanings according to B) above and the remaining substituents may have any of the meanings as defined in A) and C) to I).

$R^1$ has any of the meanings according to C) above and the remaining substituents may have any of the meanings as defined in A) and B) and D) to I).

$R^2$ has any of the meanings according to D) above and the remaining substituents may have any of the meanings as defined in A) to C) and E) to H) or I).

$R^3$ has any of the meanings according to E) above and the remaining substituents may have any of the meanings as defined in A) to D) and F) to I).

$R^4$ has any of the meanings according to F) above and the remaining substituents may have any of the meanings as defined in A) to E) and G) to I).

$A^1$ has any of the meanings according to G) above and the remaining substituents may have any of the meanings as defined in A) to F) and H) or I).

$A^2$ has any of the meanings according to H) above and the remaining substituents may have any of the meanings as defined in A) to G) and I).

$R^2$ and $A^1$ have any of the meanings as defined in I) and the remaining substituents may have any of the meanings as defined in A) to C), E), F) and H).

In a preferred embodiment of the present invention the compounds of general formula (I) are defined by
$X^1$ is N or O; and
$X^2$ is N, S or O;
with the proviso that $X^1$ and $X^2$ are different;
$R^1$ is hydrogen;
n is 1, 2 or 3;
$A^1$ is methylene or ethane-1,2-diyl;
$A^2$ is methylene, ethane-1,2-diyl or propane-1,3-diyl;
$R^2$ is hydrogen or $C_1$-$C_4$-alkyl;
or
$A^1$ and $R^2$ together with the nitrogen atom to which they are bonded form an optionally substituted 4-membered ring;
$R^3$ indicates 1 or 2 optional substituents, which may independently be selected from the group consisting of
halogen,
cyano,
alkyl, which may be substituted with 1, 2 or 3 halogen atoms,
optionally substituted alkoxy, and
a carboxyl group;
$R^4$ is selected from the group consisting of
hydrogen
Cl,
methyl, ethyl, iso-propyl, and
trifluoromethyl.

In a further preferred embodiment of the present invention the compounds of general formula (I) are defined by
$X^1$ is N or O; and
$X^2$ is N, S or O;
with the proviso that $X^1$ and $X^2$ are different;
$R^1$ is hydrogen;
n is 1 or 2;
$A^1$ is methylene or ethane-1,2-diyl;
$A^2$ is methylene, ethane-1,2-diyl or propane-1,3-diyl;
$R^2$ is hydrogen or methyl;
or
$A^1$ and $R^2$ together with the nitrogen atom to which they are bonded form an unsubstituted 4-membered ring;
$R^3$ indicates 1 or 2 optional substituents, which may independently be selected from the group consisting of
F and Cl,
cyano,
trifluoromethyl,
methoxy, and
a carboxyl group;
$R^4$ is selected from the group consisting of
hydrogen,
Cl,
methyl, and
trifluoromethyl.

In a further preferred embodiment of the present invention the compounds of general formula (I) are defined by
$X^1$ is N or O; and
$X^2$ is N, S or O;
with the proviso that $X^1$ and $X^2$ are different;
$R^1$ is hydrogen;
n is 1;
$A^1$ is methylene or ethane-1,2-diyl;
$A^2$ is methylene, ethane-1,2-diyl or propane-1,3-diyl;
$R^2$ is hydrogen;
or
$A^1$ and $R^2$ together with the nitrogen atom to which they are bonded form an unsubstituted 4-membered ring;
$R^3$ indicates hydrogen, thus forming an unsubstituted terminal benzimidazolyl-ring;
$R^4$ is selected from the group consisting of
hydrogen,
Cl, and
methyl.

In a further preferred embodiment of the present invention the compounds of general formula (I) are defined by $X^1$ is N or O; and $X^2$ is N, S or O;

with the proviso that $X^1$ and $X^2$ are different;

$R^1$ is hydrogen;

n is 1;

$A^1$ is methylene or ethane-1,2-diyl;

$A^2$ is methylene, ethane-1,2-diyl or propane-1,3-diyl;

$R^2$ is hydrogen;

or $A^1$ and $R^2$ together with the nitrogen atom to which they are bonded form an unsubstituted 4-membered ring;

$R^3$ indicates hydrogen, thus forming an unsubstituted terminal benzimidazolyl-ring; and $R^4$ is hydrogen.

In a further aspect the present invention relates to the new use and method of treatment as defined herein, wherein the compounds according to formula (I), or its salts, solvates, hydrates and polymorphs, are selected from compounds of the formula (I) as shown above, wherein n=1;

$R^3$=hydrogen;

$R^4$=hydrogen;

$A^1$=methylene or ethane-1,2-diyl;

$A^2$=methylene, ethane-1,2-diyl or propane-1,3-diyl;

or $A^1$ and $R^2$ together with the nitrogen atom to which they are bonded form an optionally substituted 4-membered ring, forming compounds according to formula (II) or (III):

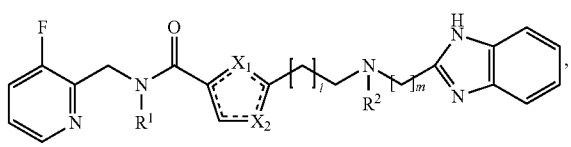

(II)

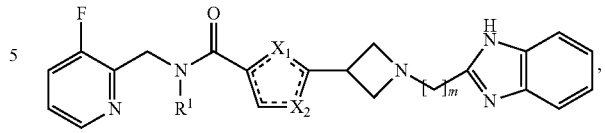

(III)

wherein in formula (II) and/or (III)

l is 0 or 1;

m is an integer of 1, 2 or 3 and $X^1$, $X^2$, $R^1$ and $R^2$ have the meaning as defined for compounds of formula (I) anywhere herein.

Preferably, in the formulae (II) and (III) $X^1$ and $X^2$ have the meaning as defined above in A).

In formula (II) $R^1$ and $R^2$ are preferably hydrogen.

In formula (III) $R^1$ is preferably hydrogen and m is preferably 2.

In a further preferred embodiment of the present invention the compounds of general formula (II) are defined by $X^1$ and $X^2$ are selected from N and O and are different;

$R^1$=hydrogen;

$R^2$=hydrogen:

l=1; and m=2.

In a further preferred aspect, the present invention relates to the new use and method of treatment as defined herein, wherein the compounds according to formula (I) are used in the form of its pharmaceutically acceptable salts, or solvates, hydrates and polymorphs thereof.

With respect to suitable pharmaceutically acceptable salts of the compounds of the formulae (I), (II) and (III) as defined anywhere herein reference is made to the international applications WO02017/068089, WO2017/068090 and in particular WO2018/192973. The definition of pharmaceutically acceptable salts as disclosed therein is herein enclosed by reference.

Further compounds acting as ferroportin inhibitors and being suitable in the treatment of severe forms of β-thalassemia as defined herein are those as described in WO2020/123850 A1, incorporated herein by reference in its entirety. Particular compounds among those described in 02020/123850 A1 being suitable in the treatment of severe forms of β-thalassemia as defined herein can be selected from the group consisting of:

| Structure | IUPAC Name | Mass Found (M + 1) |
|---|---|---|
|  | 2-(2-{[2-(1H-1,3-benzodiazol-2-yl)ethyl]amino}ethyl)-N-[(3-fluoropyridin-2-yl)methyl]-[1,3]thiazolo[5,4-d]pyrimidin-7-amine | 449.2 |

-continued

| Structure | IUPAC Name | Mass Found (M + 1) |
|---|---|---|
| | 2-(2-{[2-(1H-1,3-benzodiazol-2-yl)ethyl]amino}ethyl)-N-[(3-fluoropyridin-2-yl)methyl]-[1,3]oxazolo[4,5-c]pyridin-4-amine | 432.2 |
| | 2-(2-{[2-(1H-1,3-benzodiazol-2-yl)ethyl]amino}ethyl)-7-{[(3-fluoropyridin-2-yl)methyl]amino}-[1,3]thiazolo[5,4-d]pyrimidin-5-ol | 465.1 |
| | 2-[(1R)-2-{[2-(1H-1,3-benzodiazol-2-yl)ethyl]amino}-1-fluoroethyl]-N-[(3-fluoropyridin-2-yl)methyl]-[1,3]oxazolo[4,5-c]pyridin-4-amine | 450.2 |
| | 2-[(1S)-2-{[2-(1H-1,3-benzodiazol-2-yl)ethyl]amino}-1-fluoroethyl]-N-[(3-fluoropyridin-2-yl)methyl]-[1,3]oxazolo[4,5-c]pyridin-4-amine | 450.2 |
| | 2-[(1R)-2-{[2-(1H-1,3-benzodiazol-2-yl)ethyl]amino}-1-fluoroethyl]-N-[(3-fluoropyridin-2-yl)methyl]-[1,3]thiazolo[5,4-d]pyrimidin-7-amine | 467 |

In a further preferred aspect the present invention relates to the new use and method of treatment as defined herein, wherein the pharmaceutically acceptable salts of the compounds of the formulae (I), (II) or (III) or of the compounds according to WO2020/123850 A1 are selected from salts with acids from the group consisting of benzoic acid, citric acid, fumaric acid, hydrochloric acid, lactic acid, malic acid, maleic acid, methanesulfonic acid, phosphoric acid, succinic acid, sulfuric acid, tartaric acid and toluenesulfonic acid. Preferably acids from the group consisting of citric acid, hydrochloric acid, maleic acid, phosphoric acid and sulfuric acid are selected.

In a further preferred aspect the present invention relates to the new use and method of treatment as defined herein, wherein the pharmaceutically acceptable salts of the compounds of the formulae (I), (II) or (III) are selected from mono-salts (1:1 salts), triple salts (1:3 salts) and salts being characterized by a ratio of compound (I), (II) or (III) to acid of 1-2: 1-3; including solvates, hydrates and polymorphs thereof.

Therein, the salts of the compounds (I), (II) or (III) may be characterized by a selected ratio of base:acid, i.e. compound (I), (II) or (III): the acids as defined above, in the range of 1.0 to 2.0 (mol base):1.0 to 3.0 (mol acid). In a particular embodiment the selected ratio of base:acid is 1.0 to 2.0 (mol base):1.0 to 2.0 (rind acid).

Particular examples comprise the following ratios of base:acid, i.e. compound (I), (II) or (III): the acids as defined above:

1.0 (mol base):1.0 (mol acid);
1.0 (mol base):1.25 (mol acid):
1.0 (mol base):1.35 (mol acid);
1.0 (mol base):1.5 (mol acid);
1.0 (mol base):1.75 (mol acid);
1.0 (mol base):2.0 (mol acid);
1.0 (mol base):3.0 (mol acid); and
2.0 (mol base):1.0 (mol acid).

Therein, a salt having a ratio of base:acid of 1:1 is also called "mono-salt(s)" or "1:1 salt(s)". For example, a mono-HCl salt is also designated as 1HCl or 1HCl salt.

Therein, a salt having a ratio of base:acid of 1:2 is also called "di-salt(s)" or "1:2 salt(s)". For example, a di-HCl salt is also designated as 2HCl or 2HCl salt.

Therein, a salt having a ratio of base:acid of 1:3 is also called "tri-salt(s)", "triple salts(s)" or "1:3 salt(s)". For example, a tri-HCl salt is also designated as 3HCl or 3HCl salt.

A salt having a ratio of base:acid of 1:1.25 is also called "1:1.25 salt(s)".

A salt having a ratio of base:acid of 1:1.35 is also called "1:1.35 salt(s)".

A salt having a ratio of base:acid of 1:1.5 is also called "1:1.5 salt(s)".

A salt having a ratio of base:acid of 1:1.75 is also called "1:1.75 salt(s)".

A salt having a ratio of base:acid of 2:1 is also called "hemi-salt(s)" or "2:1 salt(s)".

The salts of the compounds of formulae (I), (II) or (III) according to the present invention may be present in amorphous, polymorphous, crystalline and/or semi-crystalline (partly crystalline) form as well as in the form of a solvate of the salt. Preferably salts of the compounds of formulae (I), (II) or (III) according to the present invention are present in crystalline and/or semi-crystalline (partly crystalline) form and/or in the form of solvates thereof.

The preferable crystallinity of the salts or salt solvates can be determined by using conventional analytical methods, such as especially by using the various X-ray methods, which permit a clear and simple analysis of the salt compounds. In particular, the grade of crystallinity can be determined or confirmed by using Powder X-ray diffraction (reflection) methods or by using Powder X-ray diffraction (transmission) methods (PXRD). For crystalline solids having identical chemical composition, the different resulting crystal gratings are summarized by the term polymorphism. Regarding solvates, hydrates and polymorphs and salts with particular crystallinity reference is made to the international application WO2018/192973, which is included herein by reference.

In a further preferred aspect the present invention relates to the new use and method of treatment as defined herein, wherein the compounds of the formulae (I), (II) or (III) are selected from the group consisting of:

| Exp No. | Structure |
|---|---|
| 1 |  |
| 2 |  |
| 4 |  |

-continued
| Exp No. | Structure |
|---|---|
| 40 | 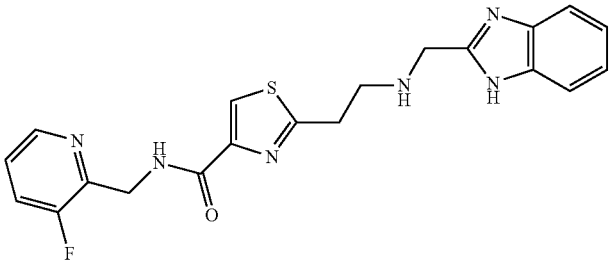 [SMILES: O=C(NCc1ncccc1F)c1csc(CCNCc2nc3ccccc3[nH]2)n1] |
| 94 | 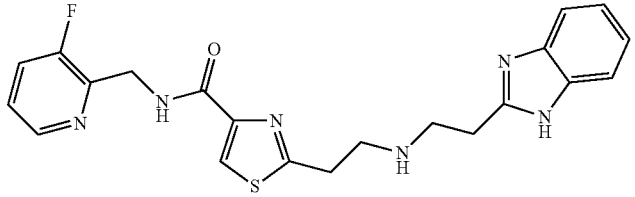 |
| 118 | 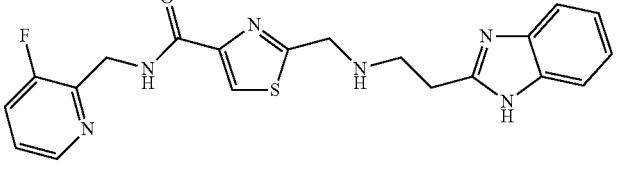 |
| 126 | 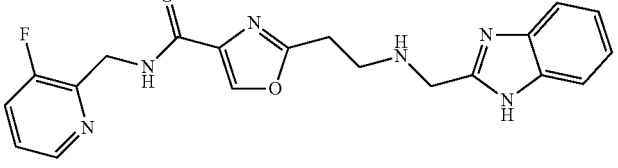 |
| 127 | 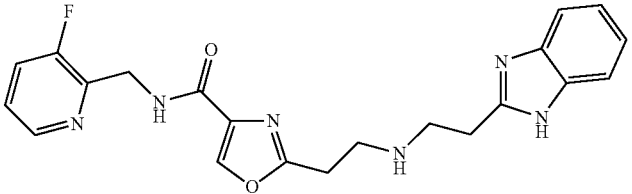 |
| 193 | 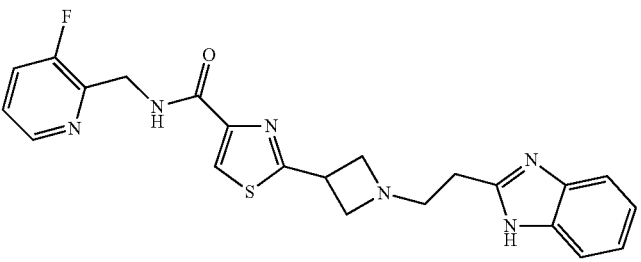 [SMILES: O=C(NCc1ncccc1F)c1csc(C2CN(CCc3nc4ccccc4[nH]3)C2)n1] |
| 206 | 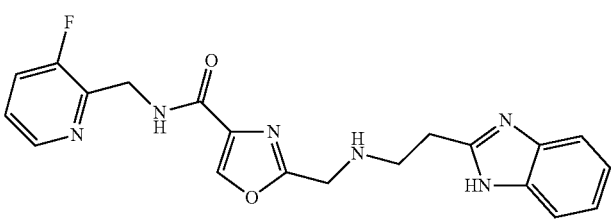 [SMILES: O=C(NCc1ncccc1F)c1coc(CNCCc2nc3ccccc3[nH]2)n1] |

| Exp No. | Structure |
|---|---|
| 208 | 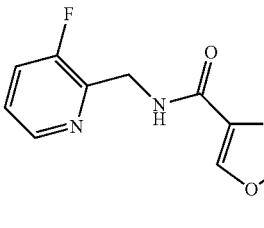 |
| 233 | 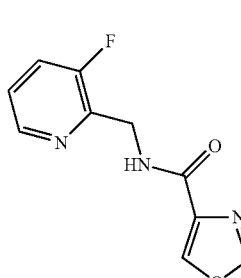 |
and its pharmaceutically acceptable salts, solvates, hydrates and polymorphs.
In a further preferred aspect the present invention relates to the new use and method of treatment as defined herein, wherein the compounds of the formulae (I), (II) or (III) are selected from the group consisting of:
| Exp. No. | Structure |
|---|---|
| 1 | |
| 40 | |
| 94 | |

| Exp. No. | Structure |
|---|---|
| 127 | (structure) |
| 208 | (structure) | and its pharmaceutically acceptable salts, solvates, hydrates and polymorphs.

In a further preferred aspect the present invention relates to the new use and method of treatment as defined herein, wherein the compounds of the formulae (I), (II) or (III) are selected from the group consisting of:

| Exp. No. | Structure |
|---|---|
| 1 | (structure) |
| 2 | (structure) |
| 4 | (structure) |

-continued
| Exp. No. | Structure |
|---|---|
| 126 | 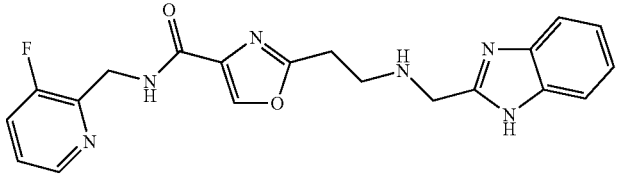 |
| 127 | 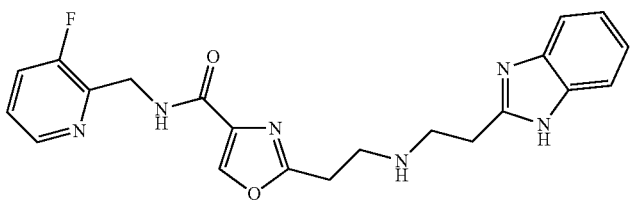 [SMILES: O=C(NCc1ncccc1F)c1csc(CCNCCc2nc3ccccc3[nH]2)n1] |
| 206 | 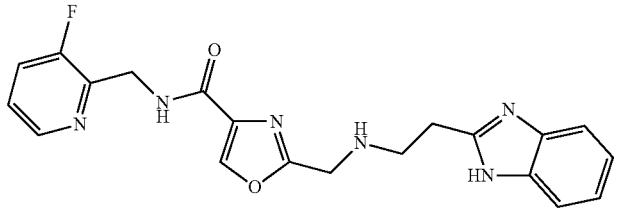 [SMILES: O=C(NCc1ncccc1F)c1coc(CNCCc2nc3ccccc3[nH]2)n1] |
| 208 | 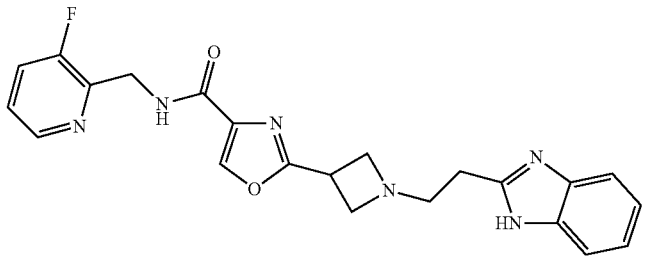 [SMILES: O=C(NCc1ncccc1F)c1coc(C2CN(CCc3nc4ccccc4[nH]3)C2)n1] |
| 233 | 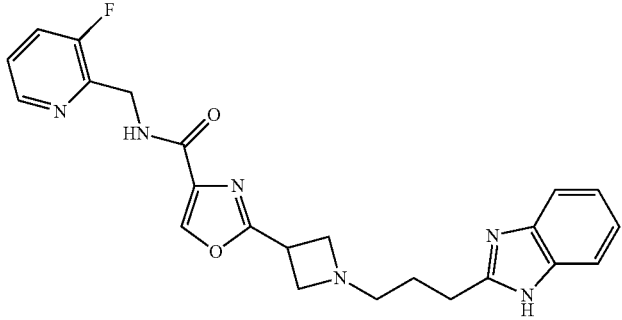 [SMILES: O=C(NCc1ncccc1F)c1coc(C2CN(CCCc3nc4ccccc4[nH]3)C2)n1] |

In a further preferred aspect the present invention relates to the new use and method of treatment as defined herein, wherein the compounds of the formulae (I), (II) or (III) are selected from the group consisting of:

| Exp. No. | Structure |
|---|---|
| 1 | ![structure 1] |
| 208 | ![structure 208] |
| 127 | ![structure 127] | and its pharmaceutically acceptable salts, solvates, hydrates and polymorphs.

In an even more preferred aspect of the invention the compounds of the formulae (I), (II) or (III) are selected from the group consisting of:

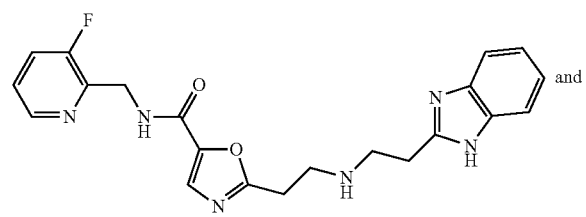

and

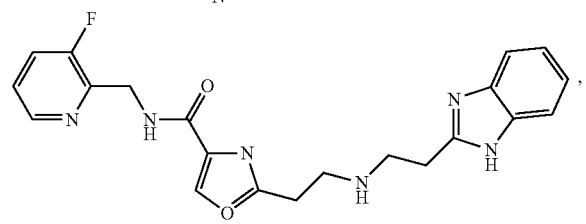

and its pharmaceutically acceptable salts, solvates, hydrates and polymorphs.

In a further preferred aspect of the invention the compounds of the formulae (I), (II) or (III) are selected from the group consisting of the following salts:

a 1:1 sulfate salt having the formula

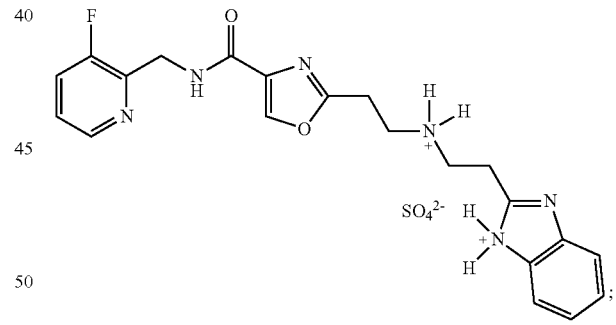

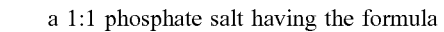

a 1:1 phosphate salt having the formula

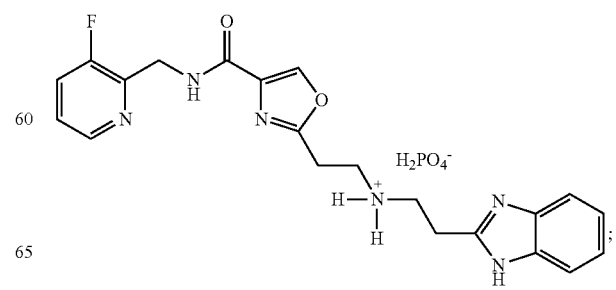

a 2:1 phosphate salt (hemiphosphate)

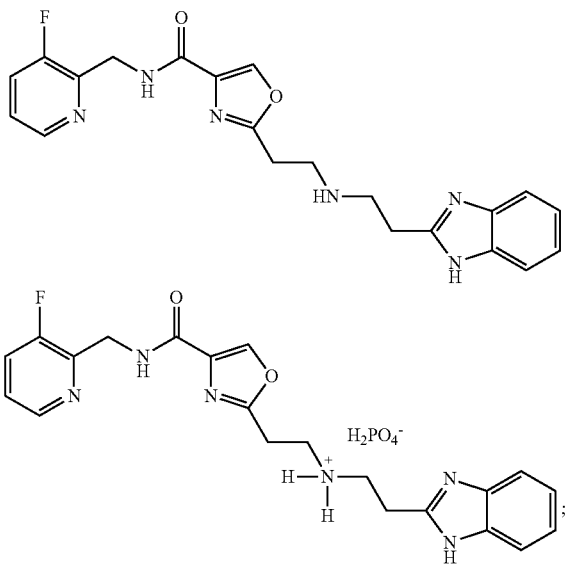

a 1:3 HCl salt having the formula

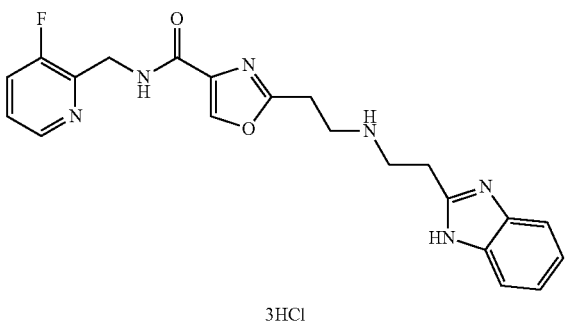 [SMILES: O=C(NCc1ncccc1F)c1coc(CCNCCc2nc3ccccc3[nH]2)n1]

and polymorphs thereof.

As described in WO2017/068089, WO2017/068090 and WO2018/192973 the compounds of the formula (I) act as ferroportin inhibitors. Regarding the ferroportin inhibitor activity of the compounds reference is thus made to said international applications.

Medicaments Containing the Ferroportin Inhibitor Compounds

A further aspect of the invention relates to a medicament or a pharmaceutical composition containing one or more of the compounds of the formulae (I), (II) or (III) as defined anywhere herein for the new use and method of treatment of severe forms of β-thalassemia as defined anywhere herein.

Such medicament may further contain one or more pharmaceutical carriers and/or one or more auxiliaries and/or one or more solvents.

Preferably, the medicament is in the form of an oral dosage form, e.g. such as defined above.

Preferably the pharmaceutical carriers and/or auxiliaries and/or solvents are selected among suitable compounds for preparing oral dosage forms.

The said pharmaceutical compositions contain, for example up to 99 weight-% or up to 90 weight-% or up to 80 weight-% or or up to 70 weight-% of the ferroportin inhibitor compounds of the present invention, the remainder being each formed by pharmacologically acceptable carriers and/or auxiliaries and/or solvents and/or optionally further pharmaceutically active compounds.

Therein, the pharmaceutically acceptable carriers, auxiliary substances or solvents are common pharmaceutical carriers, auxiliary substances or solvents, including various organic or inorganic carrier and/or auxiliary materials as they are customarily used for pharmaceutical purposes, in particular for solid medicament formulations. Examples include excipients, such as saccharose, starch, mannitol, sorbitol, lactose, glucose, cellulose, talcum, calcium phosphate, calcium carbonate; binding agents, such as cellulose, methylcellulose, hydroxypropylcellulose, polypropyl pyrrolidone, gelatine, gum arabic, polyethylene glycol, saccharose, starch; disintegrating agents, such as starch, hydrolyzed starch, carboxymethylcellulose, calcium salt of carboxymethylcellulose, hydroxypropyl starch, sodium glycol starch, sodium bicarbonate, calcium phosphate, calcium citrate; lubricants, such as magnesium stearate, talcum, sodium laurylsulfate; flavorants, such as citric acid, menthol, glycin, orange powder; preserving agents, such as sodium benzoate, sodium bisulfite, paraben (for example methylparaben, ethylparaben, propylparaben, butylparaben); stabilizers, such as citric acid, sodium citrate, acetic acid and multicarboxylic acids from the titriplex series, such as, for example, diethylenetriaminepentaacetic acid (DTPA); suspending agents, such as methycellulose, polyvinyl pyrrolidone, aluminum stearate; dispersing agents; diluting agents, such as water, organic solvents; waxes, fats and oils, such as beeswax, cocoa butter; polyethylene glycol; white petrolatum; etc.

Liquid medicament formulations, such as solutions, suspensions and gels usually contain liquid carrier, such as water and/or pharmaceutically acceptable organic solvents. Furthermore, such liquid formulations can also contain pH-adjusting agents, emulsifiers or dispersing agents, buffering agents, preserving agents, wetting agents, gelatinizing agents (for example methylcellulose), dyes and/or flavouring agents, for example as defined above. The compositions may be isotonic, that is, they can have the same osmotic pressure as blood. The isotonicity of the composition can be adjusted by using sodium chloride and other pharmaceutically acceptable agents, such as, for example, dextrose, maltose, boric acid, sodium tartrate, propylene glycol and other inorganic or organic soluble substances. The viscosity of the liquid compositions can be adjusted by means of a pharmaceutically acceptable thickening agent, such as methylcellulose. Other suitable thickening agents include, for example, xanthan gum, carboxymethylcellulose, hydroxypropylcellulose, carbomer and the like. The preferred concentration of the thickening agent will depend on the agent selected.

Pharmaceutically acceptable preserving agents can be used in order to increase the storage life of the liquid composition. Benzyl alcohol can be suitable, even though a plurality of preserving agents including, for example, paraben, thimerosal, chlorobutanol and benzalkonium chloride can also be used.

Combination Therapy

A further object of the present invention relates to medicaments or combined preparations containing one or more of the ferroportin inhibitor compounds as defined anywhere herein and at least one further pharmaceutically active compound ("combination therapy compound"), preferably an additional active compound being useful in the treatment of severe β-thalassemia as defined herein, in particular in the treatment of TDT. Preferred combination therapy compounds are in particular compounds used in the prophylaxis and treatment of iron overload and the associated symptoms. Most preferred combination therapy compounds are iron-chelating compounds, or compounds for the prophylaxis and treatment of any of the states, disorders or diseases accompanying or resulting from iron overload and β-thalassemia. Suitable combination therapy compounds may be selected from pharmaceutically active compounds for the prophylaxis and treatment of thalassemia, haemochromatosis, sickle cell disease, neurodegenerative diseases (such as Alzheimer's disease or Parkinson's disease) and the associated symptoms. Preferably, the at least one additional pharmaceutically active combination therapy compound is selected from drugs for reducing iron overload (e.g. Tmprss6-ASO) and iron chelators, in particular curcumin, SSP-004184, Deferitrin, deferasirox, deferoxamine and deferiprone as well as hydroxyurea or with JAK2 inhibitors. The most preferred combination therapy compound from the group of iron-chelating compounds is deferasirox.

Further preferred combination therapy compounds may be selected from drugs for treating β-thalassemia, such as Luspatercept, LentiGlobin BB305 (a gene therapy developed by the company Bluebird Bio), synthetic human hepcidin (LJPC-401), the hepcidin peptidomimetic PTG-300 and the anti-sense oligonucleotide targeting Tmprss6 (IO-NIS-TMPRSS6-L RX).

In a further aspect the present invention relates to the new use and medical treatment as defined herein, wherein the ferroportin inhibitor compounds as defined herein are administered to the patient in need thereof in a combination therapy with one or more of the combination therapy compounds defined above in a fixed dose or free dose combination for sequential use. Such a combination therapy comprises co-administration of the ferroportin inhibitor compounds as defined in the present invention with the at least one additional pharmaceutically active compound (drug/combination therapy compound).

Combination therapy in a fixed dose combination therapy comprises co-administration of the ferroportin inhibitor compounds as defined herein with the at least one additional pharmaceutically active compound in a fixed-dose formulation.

Combination therapy in a free dose combination therapy comprises co-administration of the ferroportin inhibitor compounds as defined herein and the at least one additional pharmaceutically active compound in free doses of the respective compounds, either by simultaneous administration of the individual compounds or by sequential use of the individual compounds distributed over a time period.

In a particularly preferred embodiment, a combination therapy comprises concurrent administration of the oral ferroportin inhibitor according to Example compound No, 127, described infra, and the iron chelator deferasirox.

A further embodiment of the present invention relates to a combination therapy as described supra, wherein the ferroportin inhibitor compound is one selected among those described in WO2020/123850 A1, in particular one of the particular example compounds thereof as described supra. Preferably, such combination therapy comprises concurrent administration of the ferroportin inhibitor compound and the iron chelator deferasirox.

Figure 1:
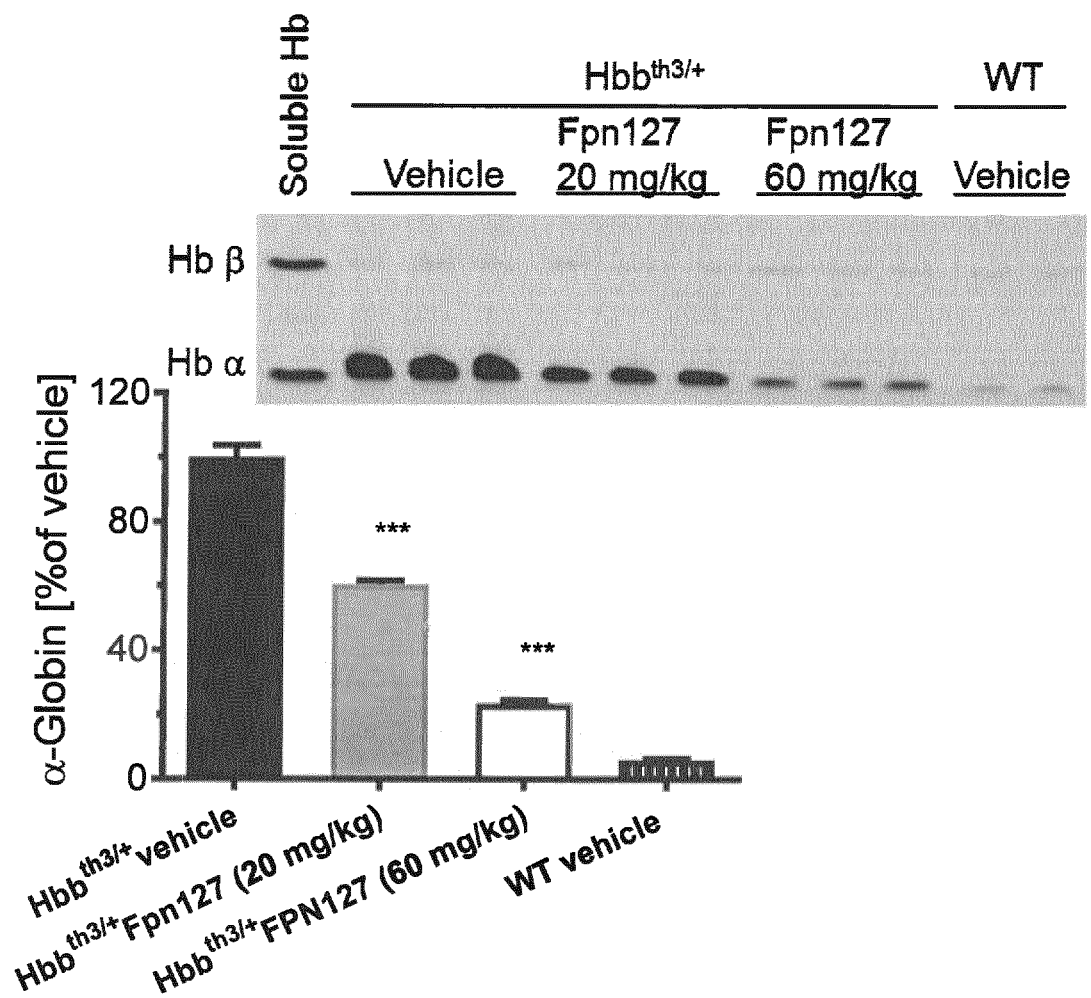
FIG. 1: TAU gel electrophoresis analysis of membrane-bound globins in RBC from $Hbb^{th3/+}$ and WT mice. Soluble α and β hemoglobin from WT RBC are shown as a reference (Left). Quantification of the signal intensity of the α-globin bands by densitometry (Right). Significant differences between treatment groups are indicated: *** $p<0.001$ (One-way ANOVA with Bonferroni's multiple comparison test).

In the Figures "VIT-2763" indicates the test compound Fpn127 (Example Compound No. 127)

EXAMPLES

The invention is illustrated in more detail by the following examples. The examples are merely explanatory, and the person skilled in the art can extend the specific examples to further ferroportin inhibitor compounds according to the present invention.

I. Ferroportin Inhibitor Example Compounds

Regarding the preparation of the specific Ferroportin Inhibitor Example Compounds Nos. 1, 2, 4, 40, 94, 118, 126, 127, 193, 206, 208 and 233 as described herein and the preparation of pharmaceutically acceptable salts thereof reference is made to the international applications WO2017/068089, WO2017/068090 and WO2018/192973.

Regarding the preparation of the specific Ferroportin Inhibitor Compounds described in WO2020/123850 A1 reference is made to the preparation methods described in said international application WO2020/123850 A1.

II. Pharmacological Assays

II.1 Efficacy of the Ferroportin Inhibitor Example Compound No. 127 in a ROS Biomarker-Based TDT Mouse Model Combining a Mouse Model of β-Thalassemia Intermedia with Transfusions The orally bioavailable ferroportin inhibitors, such as the clinical stage compound according to Example Compound No. 127 (Fpn127) has been shown to improve ineffective erythropoiesis, ameliorate anemia and prevent liver iron loading in a Hbb$^{th3/+}$ mouse model of β-thalassemia. Ferroportin inhibitors, such as the clinical stage Example Compound No. 127 further limit iron availability for formation of toxic alpha globin aggregates and reactive oxygen species (ROS) in erythroid precursors and thereby improve ineffective erythropoiesis. As a result, more RBCs with extended life-span ameliorate anemia and improve tissue oxygenation.

Based on this, the inventors of the present invention have found that the described ferroportin inhibitors are particularly efficient in treating severe forms of β-thalassemia, in particular transfusion-dependent thalassemia (TDT). Patients with TDT have severe iron overload due to regular blood transfusion (BT). BT causes a transient upregulation of hepcidin, which returns to basal values when the hemoglobin (Hb) levels decrease (Pasricha S R, et al. "*Transfusion suppresses erythropoiesis and increases hepcidin in adult patients with beta-thalassemia major: a longitudinal study.*" Blood, 2013; 122(1), 124-33). Prevention of intestinal iron absorption by ferroportin inhibitors during the intervals between transfusions helps to reduce further iron loading in TDT patients. More importantly, BT generates non-transferrin bound iron (NTBI) which is released by macrophages recycling damaged RBCs and triggers oxidative stress and vascular damage (Baek J H et al, "*Iron accelerates hemoglobin oxidation increasing mortality in vascular diseased guinea pigs following transfusion of stored blood.*" JCI Insights, 2017, 2(9)). Moreover, thalassemia patients on regular BT and chelation therapy have elevated NTBI levels which correlate to the presence of heart disease (Piga A, et al. "*High nontransferrin bound iron levels and heart disease in thalassemia major.*", Am J Hematol. 2009; 84(1):29-33).

It has now been found that oral ferroportin inhibitors according to the present invention, such as the ferroportin inhibitor Example Compound No. 127, have the potential to prevent these noxious effects by sequestrating iron in macrophages and therefore interrupting the vicious cycle in β-thalassemia. With the beneficial effects to be achieved with the ferroportin inhibition therapy on hemoglobin levels, NTBI levels and LPI levels in TDT patients the ferroportin inhibitor compounds of the present invention have the potential to achieve a reduction in transfused RBC units and thus a reduction in transfusion burden for TDT patients.

As the standard of care TDT patients necessarily comprise regular BT. With the transfusion mouse model of the present Example the beneficial effects of the ferroportin inhibitor compounds of the present invention in the treatment of TDT can be determined using biomarkers in a newly developed β-thalassemia mouse model with combined blood transfusions.

The efficacy of the ferroportin inhibitors can be tested using as a ferroportin inhibitor compound the Example Compound No. 127 (Fpn127). This ferroportin inhibitor compound can be administered orally in a modified Hbb$^{th3/+}$ mouse model of β-thalassemia intermedia which is combined with a new regiment of blood transfusions using biomarkers for evaluating the drug efficacy thus providing a transfusion β-thalassemia mouse model. Therein, female and male Hbb$^{th3/+}$ mice (n=5 per gender) at age of 8 to 12 weeks are distributed in the following study groups (Table 1):

TABLE 1

Study groups, mouse strains and treatment schedule.

| Study group | Mouse strain | Fpn127 (1 mg/ml) or Vehicle | BT |
| --- | --- | --- | --- |
| 1. Hbb$^{th3/+}$/Vehicle | Hbb$^{th3/+}$ | Vehicle | No |
| 2. Hbb$^{th3/+}$/Fpn127 | Hbb$^{th3/+}$ | Fpn127 | No |
| 3. Hbb$^{th3/+}$/Vehicle/BT | Hbb$^{th3/+}$ | Vehicle | Yes |
| 4. Hbb$^{th3/+}$/Fpn127/BT | Hbb$^{th3/+}$ | Fpn127 | Yes |
| 5. C57BL/6/Vehicle | C57BL/6 | Vehicle | No |

Hbb$^{th3/+}$-thalassemic mice; C57BL/6-wild type mice; BT-Blood transfusion

Mice are adapted to an iron diet with a content of iron <10 mg/kg for 3 days before study start. At day 1 mice are receiving either vehicle or Fpn127 (1 mg/ml) formulated into the drinking water in the presence of 0.5 mM $^{58}$Fe(I)SO$_4$, 10 mM ascorbic acid and 1% glucose. Supplementing the stable isotope $^{58}$Fe into the drinking water allows to distinguish between dietary iron absorbed before or during the study. The drinking water of the vehicle group is supplemented with 0.5 mM $^{58}$Fe(II)SO$_4$, 10 mM ascorbic acid and 1% glucose. Mice have access to food and drinking water ad libitum during the study (6 weeks). In addition, mice from groups 3 and 4 are receiving RBC transfusion (300 μl blood) from a green fluorescent protein (GFP) transgenic C57BL/6 donor mice ((C57BL/6-Tg(UBC-GFP) 30Scha/J, Jackson Laboratories, Stock #004353)), as previously published (Casu C et al "*Short-term administration of JAK2 inhibitors reduces splenomegaly in mouse models of β-thalassemia intermedia and major*", Haematologica, 2017). Mice from groups 3 and 4 are receiving BT at days 14 and 28 depending on the levels of Hb and the donor's GFP-RBC counts.

The following criteria are used to determine the necessity for additional BT:

- If at day 14 the average Hb levels in group 3 (Hbb$^{th3/+}$/Vehicle/BT) are close to the values in group 1 (Hbb$^{th3/+}$/Vehicle), in a way that no statistical difference (t-test) is detected by comparing the averages of group 1 and 3, a second BT will be performed on day 14. The same procedure applies for the third BT that could take place at day 28.
- If average Hb levels in group 3 are statistically different (higher) from the values in group 1, no BT on day 14 will be performed. In such a case, Hb of groups 1 and 3 will be measured on day 21 and a second BT could be made in case Hb values of group and 3 do not differ statistically significantly.

The donor GFP-RBC counts are evaluated by flow cytometry according to conventional methods on day 1 (after the first BT), then weekly before BT and at the study end.

Serum hepcidin is evaluated according to conventional methods at a biweekly interval before BT as an indicator of prevention of intestinal iron absorption by the ferroportin inhibitor during the intervals between BT and the reduction of iron loading in Hbb$^{th3/+}$ mice.

At the study end (d42) mice are analyzed for a range of hematological parameters, including serum iron, NTBI, LPI, erythropoietin, TSAT, Hb, complete blood counts, spleen and liver weight, erythropoiesis in spleen and bone marrow, spleen and liver iron content and alpha-globin aggregates in RBC membranes using the methods described below.

As a particular biomarker for evaluating the efficacy of ferroportin inhibitors, e.g. of Fpn127, in the presence or absence of BT quantification of the alpha globin aggregates in RBC is used. Precipitated alpha-globin aggregates contain heme and iron which generate reactive oxygen species (ROS) leading to a shortened lifespan of RBCs, anemia and tissue hypoxia.

II.2 Reduction of the formation of alpha-globin aggregates in RBCs of Hbb$^{th3/+}$ mice Erythrocyte Membrane-Associated α-Globin Detection and Quantification:

Fresh EDTA-blood samples of mice from each group were pooled (blood from 2 mice/pool), lysed, and membrane lipids were extracted, as previously described (Sorensen S, Rubin E, Polster H, Mohandas N, Schrier S. "*The role of membrane skeletal-associated alpha-globin in the pathophysiology of beta-thalassemia.*" Blood. 1990 Mar. 15; 75(6):1333-6). The insoluble membrane fraction was separated by electrophoresis on triton acetic acid urea (TAU) gels and visualized by Coomassie staining (*Alter B et al, Br J Haematol* 44:527, 1980). The signal intensity of the α-globin bands was quantified by densitometry using LAS-4000 Image Analyzer with Multi Gauge v.3 software (GE Healthcare Life Sciences).

Analysis of the alpha globin aggregates by TAU gel electrophoresis showed a significant dose-dependent decrease in levels of toxic α-globin/heme aggregates in RBC membrane skeleton preparations of Hbb$^{th3/+}$ animals treated with Fpn127 compared to vehicle-treated Hbb$^{th3/+}$ animals (FIG. 1).

II.3 Reduction of the Proportion of ROS$^+$ RBCs in Hbb$^{th3/+}$ Mice

The effect of the ferroportin inhibitor, e.g. of Fpn127, on ROS levels in donor GFP-RBCs can be monitored by commercially available far-red emitting ROS-sensitive sensor.

Figure 2A:
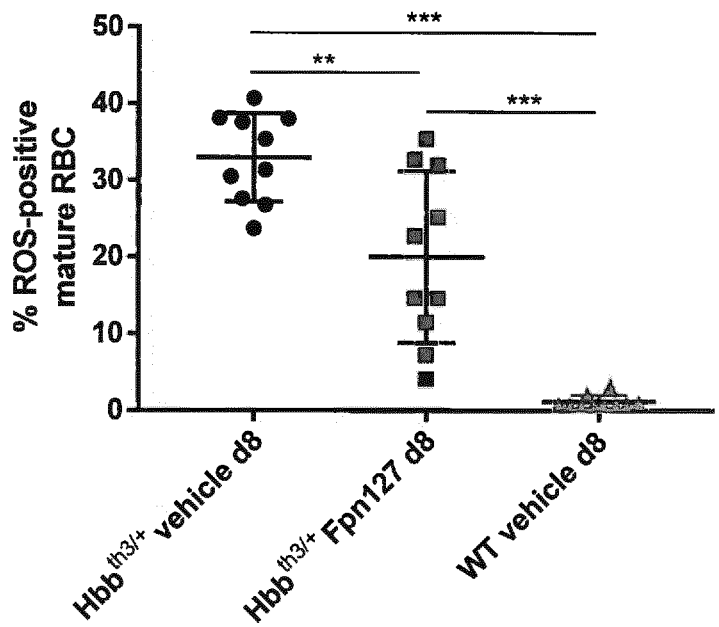
FIG. 2: Fpn127 decreased ROS levels in mature RBCs of $Hbb^{th3/+}$ mice after 8 (A) or 15 (B) days of oral dosing at 60 mg/kg twice daily
Figure 2B:
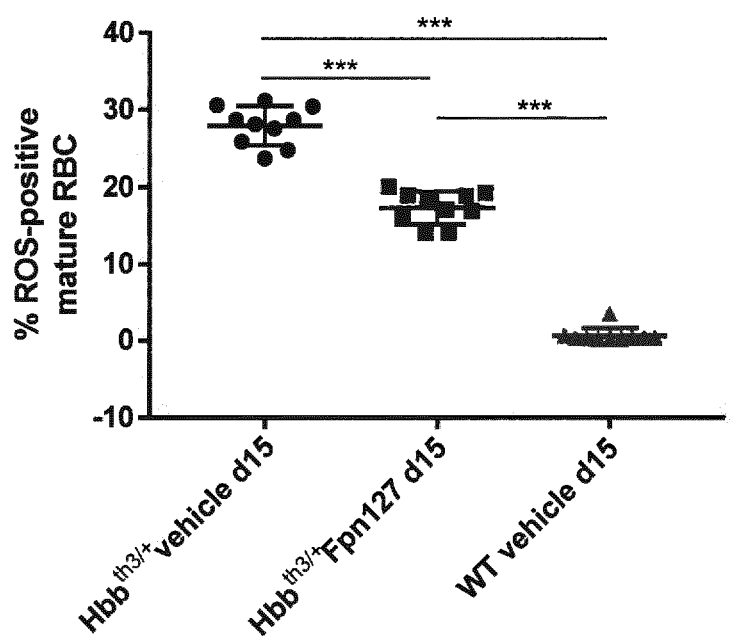

In the absence of BT, Fpn127 decreased ROS levels in RBCs of Hbb$^{th3/+}$ mice as of day 8 of oral dosing of the compound (FIG. 2A). The ROS levels further decreased after 15 days of treatment (FIG. 2B). These data indicate that the ferroportin inhibitors of the present invention, such as Fpn127, have a relatively quick effect on erythropoiesis in Hbb$^{th3/+}$ mice and thus ROS levels in RBCs can be used as a suitable biomarker to evaluate the efficacy of ferroportin inhibitors in the novel Hbb$^{th3/+}$ mouse model in combination with BT as described herein.

II.4 Effect of Fpn127 on NTBI and LPI Levels in Hbb$^{th3/+}$ Mice

As described above, the BT in TDT lead to elevated plasma NTBI levels as a result of ferroportin-mediated export of iron from macrophages recycling damaged RBCs (Piga A. et al, *Am J Hematol*, 2009). Dosing of ferroportin inhibitors of the present invention, such as Fpn127, in combination with BT has the potential to reduce the levels of plasma NTBI (and LPI) and the associated adverse effects.

Fpn 127 prevents release of non-transferrin bound iron (NTBI) generated by BT in Hbb$^{th3/+}$ mice.

In order to establish the kinetics of NTBI generation in Hbb th3/+ mice (B6.129P2-Hbb-b1tm1Unc Hbb-b2tm1Unc/J, #002683) following blood transfusion (BT) pilot experiments were performed. The wild-type (We) littermates of Hbbth3/+ were used as blood donors for transfusions. Peripheral blood was collected from terminally anesthetized WT mice via retro-orbital route from 3-5 female mice and seven parts of blood were mixed with one part of 14% citrate-phosphate-dextrose adenine and stored at 4° C. until the transfusion (24 h or 15 days). The donor blood was pre-warmed to 37° C. prior to the transfusion. Hbbth3/+ mice at age of 12 weeks received a single oral dose of Fpn 127 at 120 mg/kg body weight or vehicle (0.5% methylcellulose in ddH$_2$O). Thirty minutes post-dose, mice were transfused with 0.2 ml of WT blood via tail vein injection. A group of vehicle treated Hbb th3/+ mice not receiving BT was used as non-transfused control. Blood was collected from terminally anaesthetized mice at 3 h post BT.

NTBI was measured in murine plasma samples by a Fe-Nitrilotriacetate (NTA)-based assay, adapted from a protocol published by Gosriwatana I et al. 1999 (Quantification of non-transferrin-bound iron in the presence of unsaturated transferrin. Gosriwatana I, Loreal O. Lu S, Brissot P, Porter J, Hider R C. Quantification of non-transferrin-bound iron in the presence of unsaturated transferrin. Anal Biochem. 1999 Sep. 10; 273(2):212-20. First, a solution of 800 mM Nitrilotriacetate acid (NTA) trisodium (Sigma, 72565) and a solution of 800 mM NTA disodium (Sigma, N0128) were prepared and then mixed together to obtain a solution at pH 7.0. Second, 90 μL of plasma samples (prepared in heparin)

were incubated with 10 µL of 800 mM NTA solution for 30 minutes at room temperature. During the incubation time, NTA chelates the protein-unbound iron (NTBI), forming Fe-NTA complexes, without interfering with the transferrin-bound iron. In the meanwhile, centrifugal filters (Amicon Ultracel 10 kda, Merck UFC501096) were pre-rinsed with 0.5 ml of 10 mM NTA (1:80 dilution of 800 mM NTA solution) and centrifuged at 10'000 g for 10 minutes, followed by two steps of rinsing with deionized water and spinned down at 10'000 g for 10 minutes each. After the incubation, the samples were transferred to the filters and centrifuged at 10'000 g for 1 h at 4° C. For the colorimetric assay-based Fe-NTA measurement, 60 mM of bathophenanthroline disulphonic acid (BDA, Sigma, 146617) and 120 mM of thioglycolic acid (TGA, Sigma, T6750-100 ml) were prepared and then mixed together at 1:1 ratio. Standard curve was obtained by serial dilutions of Fe-NTA 10 mM stock solution in deionized water (50-10-5-2.5-1.25-0.625-0 µM). Fe-NTA stock solution was previously prepared by mixing 2 mmol (0.550 g) of NTA trisodium (Sigma, 72565) and 1 mmol (0.270 g) of Iron (III) chloride hexahydrate (Sigma, 31234) in 100 ml of 1 mM HCl. 60 µL of ultrafiltrated samples or 60 µL of iron standards were mixed with 30 µL of BDA-TGA solution in a 96 wells plate. After 30 minutes of incubation at room temperature, samples were measured in a plate reader (Biotec) at 537 nm.

Figure 13:
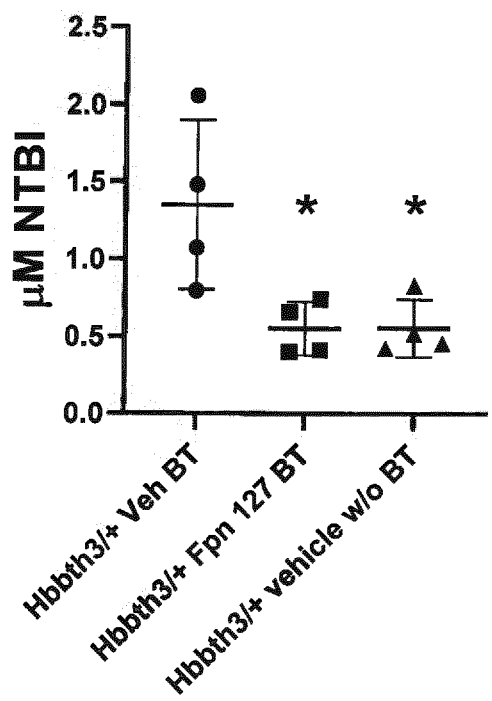
FIG. 13: Effect of Fpn127 on NTBI concentration in plasma at 3 h after blood transfusion (BT) in Hbbth3/+ mice. Individual values and mean±SD are shown, statistical analysis was performed by comparing all treatment groups to the vehicle-treated BT group using one-way ANOVA with Dunnett's multiple comparison test, * p<0.05, n=4 mice per group.

Blood-transfused $Hbb^{th3/+}$ mice showed higher NTBI levels in plasma at 3 h after transfusion (FIG. 13) compared to the control non-transfused animals administered with vehicle only. Interestingly, Fpn 127 administration prevented the increase of NTBI in the circulation after the transfusion, suggesting that inhibition of ferroportin might protect $Hbb^{th3/+}$ mice from blood transfusions-induced iron overload.

In a further test setting the levels of NTBI in $Hbb^{th3/+}$ mice in the absence of BT are investigated in $Hbb^{th3/-}$ mice treated with either vehicle or ferroportin inhibitors of the present invention, such as Fpn127, for 6 weeks. The nitrilotriacetate-NTBI method (NTA-NTBI) previously described (Singh S, Hider R C, Porter J B. "*A direct method for quantification of non-transferrin-bound iron.*" Anal Biochem. 1990 May 1; 186(2):320-3) is used with minor modifications.

Briefly, 0.02 mL of 800-mM NTA (at pH 5.7) is added to 0.18-mL mouse serum pool and allowed to stand for 30 minutes at 22° C. The solution is ultrafiltered using Whatman Vectaspin ultracentrifugation devices (30 kDa) at 12320 g and the ultrafiltrate (0.02 mL) injected directly onto an high-performance liquid chromatography column (Chrom-Spher-ODS, 5 µM, 100×3 mm, glass column fitted with an appropriate guard column) equilibrated with 5% acetonitrile and 3-mM deferiprone (DFP) in 5-mM MOPS (pH 7.8). The NTA-iron complex then exchanges to form the DFP-iron complex detected at 460 nm by a Waters 996 photodiode array. Injecting standard concentrations of iron prepared in 80-mM NTA is used to generate a standard curve. The 800-mM NTA solution used to treat the samples and prepare the standards is treated with 2-µM iron to normalize the background iron that contaminates reagents. This means that the zero standard gives a positive signal because it contains the added background iron as an NTA-complex. When unsaturated transferrin is present in sera, this additional background iron can be donated to vacant transferrin sites resulting in a loss of the background signal and yielding a negative NTBI value.

NTBI is also measured using an alternative method (CP851 bead-NTBI) assay as described in Garbowski M W, Ma Y, Fucharoen S, Srichairatanakool S, Hider R, Porter J B. "*Clinical and methodological factors affecting non-transferrin-bound iron values using a novel fluorescent bead assay*" Transl Res. 2016). The standards for this assay are prepared as follows: 1-mM iron-NTA complex (1:2.5 molar ratio), prepared from 100-mM NTA and 18-mM atomic absorption standard iron solution, is diluted with MilliQ water to a final concentration between 0 and 100 µM. For the standard curve, 120 µL of probe-labeled bead suspensions are incubated with 20 µL of buffered NTA-iron solutions of known concentration for 20 minutes at room temperature, with subsequent addition of 20 µL control serum from wild type mice (without free iron) and 40-µL paraformaldehyde (10% in MOPS) at a final concentration of 2%. The suspensions in sealed 96-well plates are incubated at 37° C. for 16 hours with shaking before fluorescence measurement by flow-cytometry. For serum samples of unknown iron concentrations, 140 µL quantities of beads are incubated with 20 µL of serum samples for 20 minutes, with subsequent addition of 40-µL paraformaldehyde at a final concentration of 2%. The chelatable fluorescent beads are mixed with serum from wild type mice as a control to set up the fluorescence at 100% and the relative fluorescence of chelatable fluorescent beads with serum from $Hbb^{th3/+}$ mice was calculated accordingly. Measurements are performed on Beckman Coulter FC500 flow-cytometer and analysis on FlowJo software. Gates were based on dot-plots of untreated bead populations. Median fluorescence of 10,000 events was recorded and corrected for bead auto-fluorescence. A standard curve was fitted with variable-slope sigmoidal dose response function.

NTBI, which encompasses all forms of serum iron that are not tightly associated with transferrin, is chemically and functionally heterogeneous. LPI represents a component of NTBI that is both redox active and chelatable, capable of permeating into organs and inducing tissue iron overload. LPI assay (Esposito BPI, Breuer W, Sirankapracha P, Pootrakul P, Hershko C, Cabantchik Z I. "*Labile plasma iron in iron overload: redox activity and susceptibility to chelation.*" Blood. 2003) measures the iron-specific capacity of a given sample to produce ROS and is considered one of the most relevant reactive iron species involved in pathological iron overload.

FeROS™ LPI kit (Aferrix Ltd.) is used to measure LPI in sera of $Hbb^{th3/+}$ mice treated with either vehicle or ferroportin inhibitors of the present invention, such as Fpn127, for 6 weeks in the presence or absence of BT.

NTBI and LPI levels in $Hbb^{th3/+}$ mice receiving BT have been found to serve as translational markers allowing to evaluate the efficiency of the oral ferroportin inhibitor therapy.

This model can also be used to optimally design the dosing regimen of ferroportin inhibitors (such as e.g. Fpn127) in patients with TDT. Therewith an optimal combination therapy for TDT can be established using a combination of blood transfusion (BT) and oral ferroportin inhibitor administration.

With the models and examples described above, it is possible to demonstrate the capacity of orally administered ferroportin inhibitors in improving transfusion burden and in improving the deleterious side-effects of transfusion dependent β-thalassemia.

III. Determination of Alpha Globin Aggregates in RBCs

Blood samples are washed three times with ice cold DPBS in the presence of 1 mM EDTA and lysed in an ice-cold hypotonic lysis buffer (5 mM sodium phosphate, pH 7.6 containing Complete Ultra protease inhibitors, Roche). The soluble Hb is collected to serve as standard on the gel. The erythrocyte ghosts are further washed three times by resuspending in hypotonic lysis buffer and centrifugation at 21'000×g. Membrane lipids are extracted in 50 mM sodium borate pH 8, 1 mM EDTA, 0.5% Triton X-100 (Sigma-Aldrich) and protease inhibitors. After a last 30 min centrifugation at 30'000×g the supernatant is completely removed and the triton-insoluble pellet corresponding to the membrane cytoskeletons is snap frozen. TAU polyacrylamide gel (12% Acrylamide/0.08% Bisacrylamide (60:0.4% acrylamide/bis-acrylamide, Bio-Rad Laboratories), 5% acetic acid, 6 M urea (both from Sigma-Aldrich) and 1% Triton X-100 is cast and run in a SE660 tall standard dual cooled vertical electrophoresis unit (Hoefer). After polymerization, the gel is pre-electrophoresed 3.5 hours at 140 V with anode on top in 5% acetic acid and then for another 3 h at 200 V with the gel overlaid with scavenger solution (1 M cysteamine, Sigma-Aldrich), 2.5 M urea, 5% acetic acid). The membrane cytoskeletons are dissolved in 100 µl TAU sample buffer (6 M urea, 5% acetic acid, 5% β-Mercaptoethanol and 0.02% Pyronin Y (both from Sigma-Aldrich) and 20 µl were loaded per well. The samples are electrophoresed overnight at 200 V constant current and the gel is stained with Coomassie Brilliant blue G-250.

IV. Transfusion Burden

Transfusion burden in a subject treated according to the methods of the present invention can be evaluated by determining the transfusion requirement of the patient, e.g. via the required amount and/or frequency of red blood cell transfusion by conventional and clinically acknowledged assessment.

V. Iron Levels

Iron levels, such as, e.g., liver or myocardial iron levels can be determined using conventional assay(s). For example, iron levels (e.g., liver iron concentration or myocardial iron concentration) can be determined by magnetic resonance imaging.

VI. Serum Ferritin Level Determination

Serum ferritin levels can be determined using conventional assay(s).

VII. Erythroid Response

The duration of the erythroid response can be calculated for a subject who achieves a response using the following algorithm:
First Day of Response=the first day of the first 12-week interval showing response.
Last Day of Response=last day of the last consecutive 129-week interval showing response.
Date of Last Assessment=either the last visit date for subjects still on drug or the date of discontinuation for subjects who discontinued from the treatment.
The duration of the erythroid response can be calculated as follows, depending on whether or not the response ends before the Date of Last Assessment:
1. a subject whose response does not continue to the end of a treatment period, the duration of response is not censored, and is calculated as:
Response Duration=Last Day of Response−First Day of Response+1;
2. a subject who continues to exhibit an erythroid response at the end of a treatment period, the end date of the response is censored and duration of the response is calculated as:
Response Duration=Date of Last Response Assessment−First Day of Response+1.

The time to the first erythroid response can be calculated as follows:
the day from the first dose of study drug to the First Day of Response starts will be calculated using:
Time to Response=First Day of Response−Date of First Study Drug+1.

VIII. Hemoglobin Determination

Hemoglobin levels can be determined using conventional assay(s).

IX. Quality of Life

The assessment of quality of life can be evaluated using the Short Form (36) Health Survey (SF-26) and/or the Functional Assessment of Cancer Therapy-Anemia (FACT-An) as described e.g. in WO2016/183280 can be used.

X. Efficacy of the Ferroportin Inhibitor VIT-2653 (Example Compound No. 40) to Attenuate Plasma Iron, Oxidant Stress and Renal Injury Following Red Blood Cell Transfusion in Guinea Pigs The efficacy of the ferroportin inhibitor compounds of the present invention in the treatment of TDT has further been confirmed by the results of J. H. Baek et al. "Ferroportin inhibition attenuates plasma iron, oxidant stress, and renal injury following red blood cell transfusion in guinea pigs"; Transfusion 2020 March; 60(3):513-523.

Said experiments have been carried out by intravenously administering the small-molecule ferroportin inhibitor VIT-2653, corresponding to Example Compound No. 40 of the present invention and further confirm the findings of the present invention.

The NTBI and Hb levels following exchange transfusion were significantly improved by dosing of the ferroportin inhibitor.

Also, total iron in kidneys following transfusion can be reduced by dosing of the ferroportin inhibitor. The contribution of circulating Hb on renal iron loading and the subsequent effects on oxidative stress and cellular injury was evaluated revealing that dosing of the ferroportin inhibitor to transfused guinea pigs significantly reduced the occurrence of changes in plasma creatinine >0.3 mg/dL, which is used as indicator of early acute kidney injury (AKI).

The experimental details and study conditions and the concrete study results can be derived from the mentioned paper.

XI. Combination Therapy with the Ferroportin Inhibitor Example Compound No. 127 (Fpn127) and Deferasirox in a Mouse Model of β-Thalassemia

XI.1 Introduction

As explained above, management of iron overload by chelation therapy has become the main focus in the conventional treatment of β-thalassemia and in particular in the treatment of severe forms thereof such as TDT. However, iron chelation does not target the underlying disease mechanisms. Correction of unbalanced iron absorption by induction of hepcidin synthesis or supplementation of hepcidin mimetics has been shown to normalize the dysregulated iron metabolism in β-thalassemia (Casu C, et al, Blood, 2018). Restriction of iron availability by the ferroportin inhibitor compound No. 127 (Fpn inhibitor No. 127; Fpn127) has been shown to ameliorate anemia and the dysregulated iron homeostasis in the Hbb$^{th3/+}$ mouse model of β-thalassemia intermedia (Manolova V, et al: "Oral ferroportin inhibitor ameliorates ineffective erythropoiesis in a model of β-thalassemia", JCI, 2019). Since many patients with β-thalassemia are on chelation therapy, the inventors of the present invention investigated whether the concurrent use of the conventional iron chelator deferasirox (DFX) and Fpn127 causes any therapeutic interactions in the Hbb$^{th3/+}$ mouse model of β-thalassemia intermedia and its potential in a respective combination therapy according to the present invention.

XI.2 Selection of the Mouse Model Test System

The heterozygous Hbb$^{th3/+}$ mice display a phenotype closely recapitulating transfusion-independent β-thalassemia in patients characterized by ineffective erythropoiesis, anemia, splenomegaly and organ iron overload. Several published studies using the Hbb$^{th3/+}$ mouse model using experimental medicines inducing endogenous hepcidin or hepcidin agonists demonstrated that iron restriction by inhibition of Fpn in combination with iron chelation is a valid approach to reduce iron overload and improve anemia in th3/+ mice (Schmidt P J, et al, Am. J. Hematol. 2015, Casu C, et al, Haematologica 2015 and Casu C, et al. Blood, 2016). Therefore, Hbb$^{th3/+}$ mice currently represent the best available animal model to test novel therapies for β-thalassemia, which may further serve as an indicator for respective effectiveness in even more severe forms such as TDT.

XI.3 Study Set-Up

The aim of this study was to test whether the concurrent use of the iron chelator DFX administered once daily (QD) alone at 30 mg/kg or in combination with Fpn127 administered QD at 120 mg/kg for 3 weeks is causing any therapeutic interactions in a mouse model of β-thalassemia intermedia (Hbb$^{th3/+}$; B6; 129P—b1tm1Unc-b2tm1Unc/J, Jackson Laboratories, Stock Number: 002683). These mice have a targeted deletion of both β major and β minor Hb genes (Yang B, et al, PNAS, 1995).

Hbb$^{th3/+}$ mice were fed low iron diet (lid) for 18 h and had access to standard diet (sd) for 6 h per day starting 3 h after dosing of DFX. Animals were euthanized 1 h after the last dose of DFX on study day 23 (dosing day 17). Blood and organs (spleen, liver, and kidney) were collected to analyze the effect of the compounds on serum parameters.

The study fully complied with animal protection law.

The test compound Fpn127 has been administered in the form the 3×HCl salt, dissolved in 0.5% methylcellulose (MC) at 15.24 mg/mL to provide dosing of animals with 120 mg/kg Fpn127 free base in 10 ml/kg volume.

DFX was provided by Ontario Chemicals Inc. (Cat. D1063) and dissolved in 30% Kolliphor at 3 mg/mL to provide dosing of animals with 30 mg/kg.

Kolliphor® EL was purchased from Sigma-Aldrich (Cat. C5135, Lot BCBV8968) and 30% Kolliphor (w/v) solution was made in Milli-Q purified water.

Daily dosing of DFX alone at 30 mg/kg was well tolerated for 3 weeks (without WE) and showed good efficacy in reducing liver iron in Hbb$^{th3/+}$ mice. Therefore, 30 mg/kg was selected as the maximum dose for DFX in this combination study. The feeding regimen was selected to prevent contact of the chelators with dietary iron in the gastrointestinal tract (lid for 3 h post-dosing). Limited access (6 h) to sd was introduced in order to improve the dynamic range of the model as spontaneous liver de-ironing was observed in previous studies feeding lid during the whole study period. Orally administered Fpn127 has a relatively short half-life of about 2 hours in rodents. A single oral dose of 100 mg/kg in rats causes reduction in serum iron for at least 8 h. In chronic settings, a dose of 60 mg/kg twice daily was established and showed consistent efficacy in several studies. In this study, both compounds needed to be dosed orally and we therefore selected a single oral dose of 120 mg/kg once daily for Fpn127 to keep the number of oral applications to a minimum. Accumulation of each compound at the tested doses is not expected because of their moderate half-life.

TABLE 2

Overview of the treatment groups.
Male (m) and female (f) mice were used in each group.

| Genotype | Treatment | Frequency | Gender of mice | Animal No. |
|---|---|---|---|---|
| th3/+ | Vehicle/vehicle* | QD | 6m/6f | 1-12 |
| th3/+ | DFX 30 mg/kg | QD | 6m/6f | 13-24 |
| th3/+ | DFX 30 mg/kg + Fpn127 120 mg/kg** | QD + QD | 7m/6f | 25-37 |
| th3/+ | Fpn127 120 mg/kg | QD | 6m/6f | 38-49 |
| WT*** | Vehicle/vehicle* | QD | 5m/5f | 50-59 |

*Vehicles are 30% Kolliphor in Milli-Q purified water and 0.5% methylcellulose in Milli-Q purified water
**DFX and Fpn127 are dosed 3 h apart
***WT are C579U69 mice obtained as breeding littermates from the th3/+ breeding XI.4 Treatment of Mice

TABLE 3

Treatment Groups and Application Doses, Concentrations and Schedule.

| Genotype | Group Name | Dose [mg/kg BW] | Concentration [mg/mL] | Dose volume [mL/kg BW] | Frequency | Sex | Animal No. |
|---|---|---|---|---|---|---|---|
| th3/+ | th3/+ vehicle* | — | — | 10 | QD | male | 1-6 |
| | | | | | | female | 7-12 |
| th3/+ | th3/+ DFX | 30 | 3.0 | 10 | QD | male | 13-18 |
| | | | | | | female | 19-24 |
| th3/+ | th3/+ DFX + Fpn127 ** | 30 + 120 | 3.0 + 15.24 | 10 | QD + QD | male | 25-31 |
| | | | | | | female | 32-37 |

TABLE 3-continued

Treatment Groups and Application Doses, Concentrations and Schedule.

| Geno-type | Group Name | Dose [mg/kg BW] | Concentration [mg/mL] | Dose volume [mL/kg BW] | Frequency | Sex | Animal No. |
|---|---|---|---|---|---|---|---|
| th3/+ | th3/+ Fpn127 | 120 | 15.24 | 10 | QD | male | 38-43 |
|  |  |  |  |  |  | female | 44-49 |
| WT*** | WT vehicle* | — | — | 10 | QD | male | 50-54 |
|  |  |  |  |  |  | female | 55-59 |

*Vehicles are 30% Kolliphor in Milli-Q purified water and 0.5% methylcellulose in Milli-Q purified water
** DFX and Fpn127 are dosed 3 h apart
***WT are C57BL/6J mice obtained as breeding littermates from the th3/+ breeding One day after switching to lid a blood sample was taken by tail vein incision to determine the baseline Hb levels. Hb was measured using a HaemoCue® device. Hb was also measured on days 8, 15, and 22 in the morning before dosing. The animals were dosed p.o. D with 30 mg/kg DFX in 30% Kolliphor, 120 mg/kg Fpn127 in 0.5% C, or both for a total of 17 doses during the 23 days of study. 30% Kolliphor and 0.5% C were dosed as vehicles. The dose of DFX was administered at the beginning of the dark cycle (active phase) at 9:00 followed by 3 h of access to lid. Then, mice were dosed with Fpn127 (or 0.5% C) and were given access to sd for a 6 h period before switched back to lid. On the dosing was paused and mi had access to lid ad libitum.

All suspensions/solutions were mixed by vortexing immediately before application. Oral gavage was performed at 10 mL/kg using a bulbed needle (Cat. 191300, Provet, Lyssach, Switzerland) attached to a suitable syringe. All dosages were applied as a bolus within seconds.

XI.5 Serial Observations

Clinical Observations and Mortality

Animals and their cages were checked daily by the experimenter during the study on working days. During the experimental phase, animals were weighted minimum once per week and scored according to their clinical symptoms: BW, general behavior and activity, appearance of hair coat, eyes, and nose. Clinical observations were recorded when present on separate score sheets.

Body Weight

BW was recorded once before the start of the experimental phase on day −1. During the experimental phase, individual BW were recorded 1 to 2 times per week to calculate the dosing volume and to monitor weight loss.

Hemoglobin

Hb was measured on days 1, 8, 15 and 22. Individual Hb values were determined at the starting day of the experiment (day 1) and weekly thereafter during the experimental phase in the morning before the first daily dose. A blood sample was taken by tail vein incision and Hb was measured using a HemoCue® DM201 Hb photometer.

Euthanasia and Organ Sampling

At the end of the study (day 23), animals were pre-terminally anesthetized using isoflurane and blood was collected by retro-orbital bleeding into BD Microtainer Tubes (Cat. 365967 and 365975). Individual animals were subsequently euthanized by cervical dislocation.

On the final study day (day 23), spleen, liver, and kidneys were collected and snap frozen in liquid nitrogen for further analysis, as outlined below. Wet weight of spleen, liver, and kidneys were recorded.

Tissue Iron

Content of total Fe was determined in pieces of spleens, livers, and kidneys by ICP-OES in the Analytical Development group of Vifor (International) Ltd., St. Gallen.

Hematology and Erythropoiesis

Complete blood counts were performed on fresh EDTA-blood on an automated blood cell analyzer (ProCyte Dx®, IDEXX Laboratories) in-house.

Distinct stages of erythroid cell differentiation in spleens of female mice were identified by flow cytometry (CANTOII cytometer, BD Biosciences) using PE-conjugated rat anti-mouse CD71 (transferrin receptor-1, eBioscience, Cat. 12-0711), APC-conjugated rat anti-mouse Ter119 (erythroid lineage marker, eBioscience, Cat. 17-5921) and APC-Cy7-conjugated rat anti-mouse CD44 (adhesion molecule that progressively decreases on the surface of developing erythroid cells, BioLegend. Cat. 103028) antibodies. Data were analyzed using FlowJo® software (FlowJo. LLC, version 10.1)

Serum Parameters

On day 23 (study end) 1 hour after dosing blood was collected by retro-orbital bleeding from pre-terminally anesthetized mice into BD Microtainer Tubes (Cat. 365967 and 365975) for determination of serum iron, transferrin, erythropoietin and compound exposure. Anesthetized animals were subsequently euthanized by cervical dislocation.

Serum levels of iron were determined in triplicates using MULTIGENT Iron assay (Abbott Diagnostics, Cat. 6K95). Serum Transferrin (TO was measured in duplicates using a mouse-specific ELISA according to the manufacturer's instructions (Abcam, Cat. ab157724). Transferrin saturation (TSAT) was calculated using the formula:

$$TSAT[\%] = \frac{SI[\mu g/dL]}{Tf[mg/dL]} \times 71.24$$

Serum EPO was measured using a mouse-specific DuoSet ELISA according to the manufacturer's instructions (R&D Systems, Cat. DY959). Plasma concentrations of Fpn127 and DFX were measured at GVK Biosciences, Hyderabad, IN.

Flow Cytometric Analysis of Intracellular ROS, Mitochondria, and PS Exposure

In peripheral blood taken on day 22 by tail vein incision, ROS were detected with the indicator chloromethyl-2',7'-dichlorodihydrofluorescein diacetate (CM-H2DCFDA, Invitrogen), the presence of mitochondria was detected with MitoTracker Deep Red FM (Invitrogen), and PS exposure was detected using the Annexin V Apoptosis Detection Kit (Invitrogen) in mature RBC labelled with Ter119 and CD71 antibodies.

For all analysis, cells were analyzed on a CANTOII cytometer (BD Biosciences) and data were analyzed using FlowJo® software (FlowJo, LLC, version 10.2).

XI.6 Data Management

Body Weight

Individual values were recorded. Mean±SD of BW in grams was calculated for each group on days of recording. BW is presented graphically.

Tissue Iron

Individual wet weights of organs were recorded. Individual values of total Fe were measured in livers, spleens, and kidneys. Individual values of total Fe content and concentration were calculated. Mean±SD of total Fe concentration and content in livers, spleens, and kidneys was calculated for each group. Organ weights and total Fe concentrations are presented graphically.

Hemoglobin

Individual values were recorded. Mean±SD of Hb levels in g/L were calculated for each group on days of measurement. Hb levels are presented graphically.

Hematology and Erythropoiesis

Individual values of blood parameters were recorded. Mean±SD was calculated for each group. Selected hematological parameters are presented graphically.

The fraction of erythroid differentiation stages in spleens of female mice was recorded individually. Mean±SD of each fraction in each group was calculated and is presented graphically.

Serum Parameters

Individual means of serum iron were calculated from duplicate measurements. Tf and EPO levels were determined from duplicate measurements. TSAT was calculated from Tf and serum iron levels. Mean±SD of serum iron, TSAT, and EPO were calculated for each group. Data for serum iron, TSAT, and EPO are presented graphically.

Flow Cytometric Analysis of Intracellular ROS, Mitochondria, and PS Exposure

The percentage of erythroid cells staining positive for ROS, mitochondria and Annexin V was recorded individually. Mean±SD was calculated for each group and is presented graphically.

XI.7 Statistical Analysis

Statistical analysis for BW data and Hb was performed using a two-way ANOVA with repeated measures for time course effects. Where significant effects were observed post tests were performed using Dunnett's multiple comparison test. For analysis of all other parameters one-way ANOVA with Dunnetts's multiple comparisons test were performed as indicated in the corresponding figure legends. For separate analysis of males and females one-way ANOVA with Dunnett's multiple comparison tests were performed. A $\beta$-value of <0.05 was considered statistically significant. Statistical analyses were carried out with Prism software (GraphPad Prism version 8.1.2. San Diego California USA).

XI.8 Results

Clinical Observations, Scoring, and Mortality

Fpn127 and DFX dosed QD was generally well tolerated and no clinical symptoms were observed during the 23 days of the study. Animal 7 (Hbb$^{th3/+}$ vehicle) lost >20% of BW from day 14 to day 17 and was sacrificed due to animal welfare reasons. Most likely; this animal was injured during oral gavage and was debilitated in food intake. Animal 7 is excluded from all further analysis.

Body Weight

Mean BW of mice is summarized in Table 4:

TABLE 4

BW development of treatment groups during the whole study. Data are represented as mean ± SD of indicated No. of animals per treatment group. Values are shown for all animals, and males and females separately. Statistically significant difference to th3/+ vehicle group are indicated by values in bold.

| | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| day | mean | SD | n | mean | SD | n | mean | SD | n | mean | SD | n | mean | SD | n |
| all animals | | | | | | | | | | | | | | | |
| 1 | 22.1 | 3.1 | 11 | 21.5 | 2.7 | 12 | 22.5 | 2.6 | 13 | 22.2 | 3.1 | 12 | 22.5 | 2.2 | 10 |
| 3 | 24.1 | 3.2 | 11 | 23.2 | 2.8 | 12 | 24.1 | 2.7 | 13 | 23.6 | 3.5 | 12 | 24.0 | 2.1 | 10 |
| 7 | 24.2 | 3.8 | 11 | 23.2 | 2.7 | 12 | 23.8 | 2.8 | 13 | 23.1 | 3.6 | 12 | 23.9 | 2.5 | 10 |
| 10 | 24.1 | 3.6 | 11 | 22.9 | 2.7 | 12 | 23.8 | 2.6 | 13 | 23.4 | 3.3 | 12 | 23.7 | 2.3 | 10 |
| 14 | 24.2 | 3.7 | 11 | 23.0 | 2.7 | 12 | 24.1 | 2.7 | 13 | 23.3 | 3.3 | 12 | 24.0 | 2.4 | 10 |
| 17 | 24.4 | 3.8 | 11 | 22.8 | 2.9 | 12 | 23.6 | 2.8 | 13 | 23.2 | 3.6 | 12 | 23.9 | 2.9 | 10 |
| 22 | 24.5 | 4.2 | 11 | 23.3 | 3.1 | 12 | 23.9 | 2.6 | 13 | 23.3 | 3.7 | 12 | 24.1 | 2.7 | 10 |
| males | | | | | | | | | | | | | | | |
| 1 | 24.5 | 1.4 | 6 | 23.7 | 1.3 | 6 | 24.7 | 1.1 | 7 | 25.1 | 1.0 | 6 | 24.4 | 0.8 | 5 |
| 3 | 26.6 | 1.5 | 6 | 25.6 | 1.5 | 6 | 26.4 | 0.9 | 7 | 26.9 | 0.8 | 6 | 25.7 | 1.1 | 5 |
| 7 | 27.1 | 2.0 | 6 | 25.4 | 1.4 | 6 | 26.1 | 1.0 | 7 | 26.5 | 0.6 | 6 | 26.0 | 1.0 | 5 |
| 10 | 26.9 | 1.7 | 6 | 25.2 | 1.4 | 6 | 26.0 | 1.0 | 7 | 26.5 | 0.7 | 6 | 25.7 | 1.0 | 5 |
| 14 | 27.1 | 1.8 | 6 | 25.2 | 1.4 | 6 | 26.4 | 0.9 | 7 | 26.3 | 0.6 | 6 | 26.1 | 1.2 | 5 |
| 17 | 27.4 | 1.8 | 6 | 25.2 | 1.4 | 6 | 26.0 | 0.8 | 7 | 26.6 | 0.5 | 6 | 26.4 | 1.4 | 5 |
| 22 | 27.8 | 2.0 | 6 | 25.9 | 1.7 | 6 | 26.0 | 0.9 | 7 | 26.7 | 0.6 | 6 | 26.4 | 1.4 | 5 |
| females | | | | | | | | | | | | | | | |
| 1 | 19.3 | 1.6 | 5 | 19.2 | 1.3 | 6 | 20.0 | 0.8 | 6 | 19.4 | 1.0 | 6 | 20.5 | 1.1 | 5 |
| 3 | 21.1 | 1.6 | 5 | 20.9 | 1.4 | 6 | 21.5 | 0.8 | 6 | 20.3 | 1.1 | 6 | 22.3 | 1.2 | 5 |
| 7 | 20.7 | 1.5 | 5 | 21.0 | 1.4 | 6 | 21.1 | 0.6 | 6 | 19.8 | 1.0 | 6 | 21.8 | 1.5 | 5 |

TABLE 4-continued

BW development of treatment groups during the whole study. Data are represented as mean ± SD of indicated No. of animals per treatment group. Values are shown for all animals, and males and females separately. Statistically significant difference to th3/+ vehicle group are indicated by values in bold.

| day | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| 10 | 20.7 | 1.9 | 5 | 20.6 | 1.3 | 6 | 21.2 | 0.7 | 6 | 20.3 | 0.9 | 6 | 21.8 | 1.2 | 5 |
| 14 | 20.8 | 1.4 | 5 | 20.7 | 1.3 | 6 | 21.5 | 0.7 | 6 | 20.2 | 0.9 | 6 | 21.9 | 1.1 | 5 |
| 17 | 20.9 | 1.7 | 5 | 20.4 | 1.4 | 6 | 20.8 | 0.7 | 6 | 19.7 | 0.6 | 6 | 21.5 | 1.3 | 5 |
| 22 | 20.5 | 1.5 | 5 | 20.8 | 1.7 | 6 | 21.3 | 0.8 | 6 | 19.8 | 0.9 | 6 | 21.7 | 1.2 | 5 |

BW at day 1 were: 24.5±1.4 g (th3/+ vehicle males); 19.3±1.6 g (th3/+ vehicle females); 23.7±1.3 g (th3/+ DFX males); 19.2±1.3 g (th3/+ DFX females); 24.7 g±1.1 (th3/+ DFX+ Fpn127 males); 20.0±0.8 g (th3/+ DFX+ Fpn127 females); 25.1±1.0 g (th3/+ Fpn127 males); 19.4±1.0 g (th3/+ Fpn127 females); 24.4±0.8 g (WT vehicle males); and 20.5±1.1 g (WT vehicle females). During the 23 days of the BW increased slightly or remained constant in all groups (Table 4). The absence of growth can largely be attributed to the age of animals used in this study. Overall there was no effect on BW following treatment with Fpn127 once daily for the duration of the study (last BW was taken the day before sacrifice, d22) in Hbb$^{th3/+}$ mice when compared to vehicle-treated Hbb$^{th3/+}$ mice (males and females) or WT mice. Treatment of males with DFX alone or in combination with Fpn127 resulted in slightly but significantly lower BW by the end of the study compared to vehicle treated Hbb$^{th3/+}$ mice.

Tissue Iron

Figure 3:
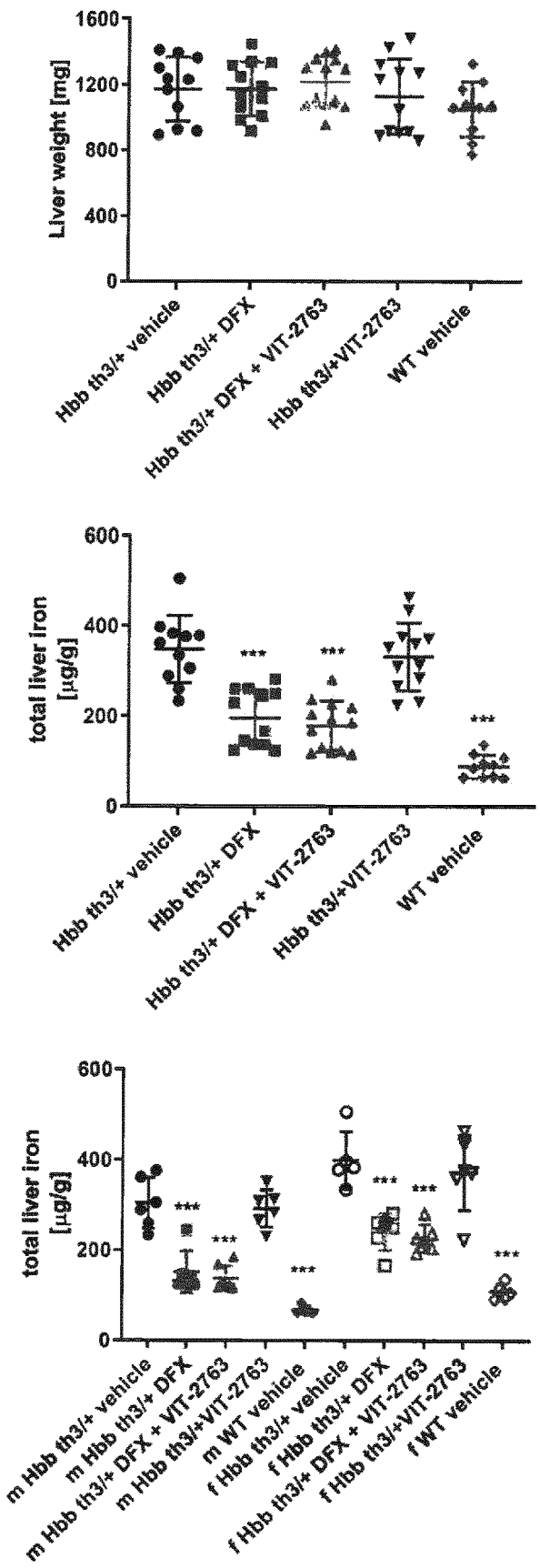
FIG. 3: Liver weight (left), total Fe concentration in all animals (middle), and total Fe concentration for males (m) and females (f) separated (right) in livers of Hbbth3/+ and WT mice. Individual values with mean±SD are shown. Significant differences compared to vehicle treated Hbbth3/+ group are indicated: *** $p<0.001$ (One-way ANOVA Dunnett's multiple comparison test).

Liver weight was assessed at the end of the study. There was no difference in liver weight in th3/+ mice (1176±196 mg) compared to WT mice (1053±169 mg). Treatment of Hbbth3/+ mice with DFX, Fpn127 or both QD had no effect on liver weight when compared to vehicle-treated Hbbth3/+ mice (Table 5; FIG. 3).

Total liver iron concentration (µg/g) was strongly elevated in th3/+ mice (348.2±75.4 µg/g) compared to WT mice (88.2±25.7 µg/g) (Table 5, FIG. 3). Treatment with DFX alone or in combination with Fpn127 significantly reduced total liver iron concentration when compared to vehicle-treated th3/+ mice (FIG. 3, middle): 348.2±75.4 µg/g (th3/+ vehicle); 196.3±62.5 µg/g (th3/+ DFX); and 178.91±54.4 µg/g (th3/+ DFX+ Fpn127). The efficacy of DFX alone and in combination with Fpn127 was comparable. As previously shown, Fpn127 alone had no effect on liver iron concentration: 332.2±75.2 µg/g (th3/+ Fpn127).

Figure 4:
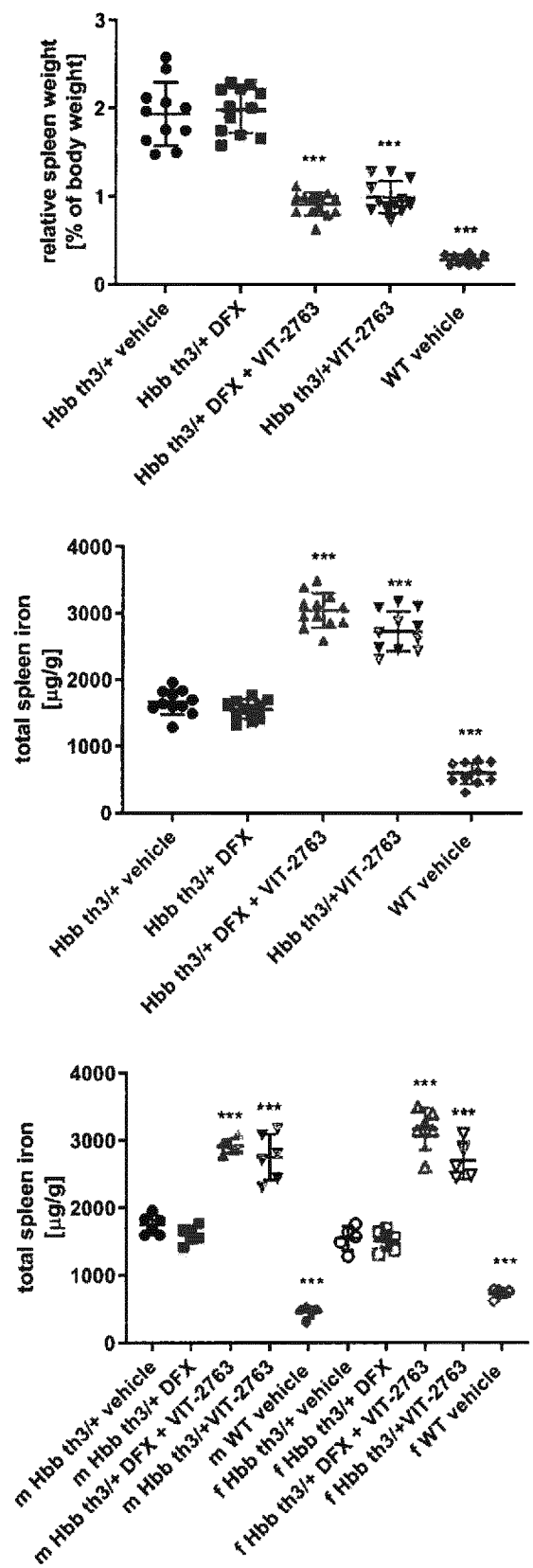
FIG. 4: Relative spleen weight (left), total Fe concentration in all animals (middle), and total Fe concentration for males (m) and females (f) separated (right) in spleens of Hbbth3/+ and WT mice. Individual values with means are shown. Significant differences compared to vehicle treated Hbbth3/+ group are indicated: *** $p<0.001$ (One-way ANOVA with Dunnett's multiple comparison test).

Spleen weight was assessed and normalized to the BW at the end of the study (d23). Relative spleen weight (expressed as percent of body weight) was significantly higher in Hbbth3/+ animals (1.94±0.36%) compared to WT animals (0.28±0.06%) (FIG. 4, Table 6). Treatment of Hbbth3/+ mice with Fpn127 alone or in combination with DFX significantly reduced relative spleen weight in th3/+ animals while DFX alone showed no effect (FIG. 4, Table 6): 1.94±0.36% (th3/+ vehicle); 1.98±0.26% (th3/+ DFX); 0.92±0.13% (th3/+ DFX+ Fpn127); and 0.99±0.18% (th3/+ Fpn127).

Total spleen iron concentration (µg/g) was strongly elevated in Hbbth3/+ mice (1664.0±185.6 µg/g) compared to WT mice (596.9±164.4 µg/g) (Table 6. FIG. 4). No treatment effect of DFX alone was observed on total spleen iron concentration while treatment with Fpn127 alone or in combination with DFX significantly increased spleen iron concentration in th3/+ mice compared to vehicle-treated th3/+ mice (Table 6. FIG. 4): 1664.0±185.6 µg/g (th3/+ vehicle); 1553.0±144.7 µg/g (th3/+ DFX); 3051.0±258.4 µg/g (th3/+ DFX+ Fpn127); 2738.0±300.8 µg/g (th3/+ Fpn127); and 596.9±164.4 µg/g (WT vehicle). No gender differences were observed for spleen iron concentration (FIG. 4, bottom). The increased spleen iron concentration in th3/+ mi treated with Fpn127 is related to decreased spleen weight and retention of iron as a consequence of ferroportin inhibition in spleen macrophages.

Figure 5:
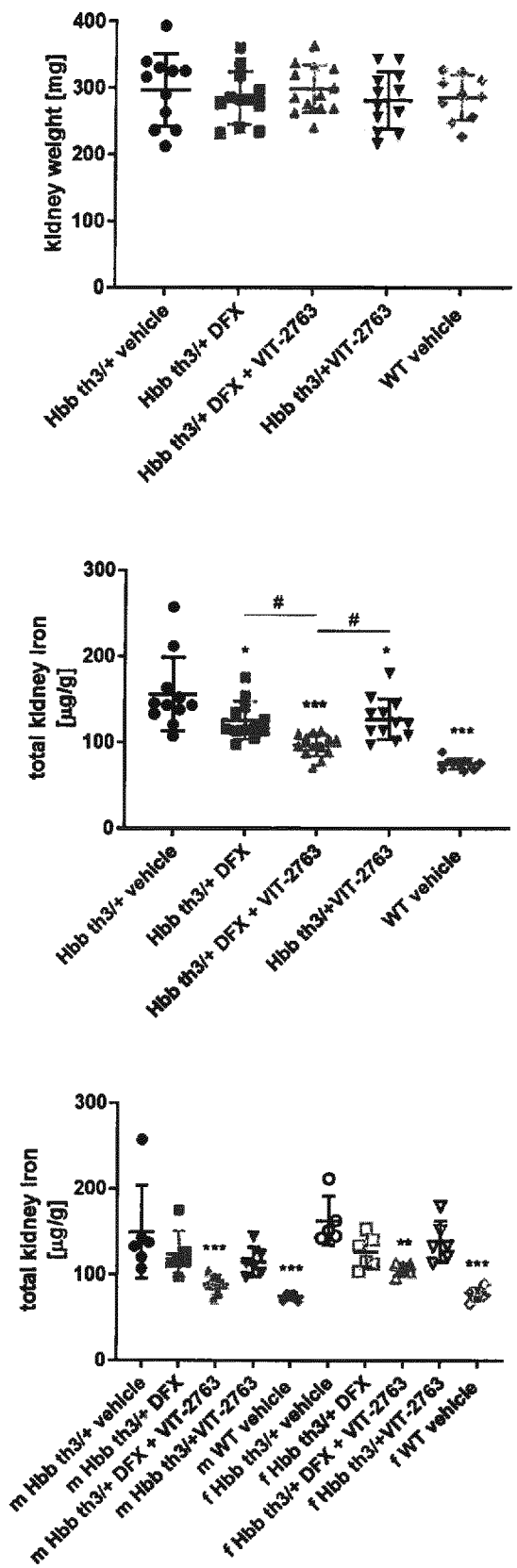
FIG. 5: Kidney weight (left), total Fe concentration in all animals (middle), and total Fe concentration for males and females separated (right) in kidneys of $Hbb^{th3/+}$ and WT mice. Individual values with means are shown. Significant differences compared to vehicle treated Hbbth3/+ group are indicated: * $p<0.05$,  $p<0.01$, * $p<0.001$ (One-way ANOVA with Dunnett's multiple comparison test). Significant differences compared to th3/+ DFX+VIT-2763 group are indicated: #$p<0.05$ (One-way ANOVA with Dunnett's multiple comparison test).

Kidney weight was assessed at the end of the study. Kidney weights were not different in Hbbth3/+ mice (297±55 g) compared to mice (286±34 g) (FIG. 5). Treatment of Hbbth3/+ mice with DFX, Fpn127 or both compounds had no effect on kidney weight when compared to vehicle-treated Hbbth3/+ mice (Table 7, FIG. 5 top).

Total kidney iron concentration (µg/g) was significantly elevated in Hbbth3/+ mice (155.5±42.9 µg/g) compared to mice (75.3±6.5 µg/g) (Table 7). All treatments significantly reduced total kidney iron concentration compared to vehicle-treated Hbbth3/+ mice (FIG. 5 middle): 155.5±42.9 µg/g (th3/+ vehicle); 125.1±22.2 µg/g (th3/+ DFX); 96.6±12.8 µg/g (th3/+ DFX+ Fpn127); 126.7±23.6 µg/g (th3/+ Fpn127); and 75.3±6.5 µg/g vehicle). Surprisingly, the combination of DFX with Fpn127 resulted in a larger reduction of liver iron concentration compared to DFX or Fpn127 alone (p=0.02 and p=0.01, respectively). This additive effect might be due to iron removal by DFX and prevention of further iron loading in kidneys by Fpn127. No gender differences were observed for kidney iron concentration (FIG. 5, bottom).

TABLE 5

Liver weight and iron concentration in treatment groups at the end of the study.
Data are represented as mean ± SD of indicated No. of animals per treatment group.
Statistically significant difference to th3/+ vehicle group are indicated by values in bold.

| | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| all animals | | | | | | | | | | | | | | | |
| liver weight [mg] | 1176 | 196 | 11 | 1177 | 165 | 12 | 1221 | 153 | 13 | 1131 | 230 | 12 | 1053 | 169 | 10 |
| Fe conc. [µg/g] | 348.2 | 75.4 | 11 | 196.3 | 62.5 | 12 | 178.9 | 54.4 | 13 | 332.2 | 75.2 | 12 | 88.2 | 25.7 | 10 |
| males | | | | | | | | | | | | | | | |
| liver weight [mg] | 1326 | 78 | 6 | 1302 | 111 | 6 | 1350 | 48 | 7 | 1337 | 99 | 6 | 1171 | 109 | 5 |
| Fe conc. [µg/g] | 304.7 | 56.1 | 6 | 151.5 | 46.1 | 6 | 137.6 | 28.4 | 7 | 292.5 | 41.9 | 6 | 67.4 | 9.4 | 5 |
| females | | | | | | | | | | | | | | | |
| liver weight [mg] | 996 | 119 | 5 | 1052 | 101 | 6 | 1071 | 59 | 6 | 925 | 64 | 6 | 935 | 132 | 5 |
| Fe conc. [µg/g] | 400.4 | 63.6 | 5 | 241.2 | 40.4 | 6 | 227.2 | 30.7 | 6 | 371.8 | 83.1 | 6 | 109.0 | 17.8 | 5 |

TABLE 6

Spleen weight and iron concentrations in treatment groups at the end of the study.
Data are represented as mean ± SD of indicated No. of animals per treatment group.
Statistically significant difference to th3/+ vehicle group are indicated by values in bold.

| | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| all animals | | | | | | | | | | | | | | | |
| relative spleen weight [%] | 1.94 | 0.36 | 11 | 1.98 | 0.26 | 12 | 0.92 | 0.13 | 13 | 0.99 | 0.18 | 12 | 0.28 | 0.06 | 10 |
| Fe conc. [µg/g] | 1664.0 | 185.6 | 11 | 1553.0 | 144.7 | 11 | 3051.0 | 258.4 | 12 | 2738.0 | 300.8 | 11 | 596.9 | 164.4 | 10 |
| males | | | | | | | | | | | | | | | |
| relative spleen weight [%] | 1.68 | 0.18 | 6 | 1.79 | 0.21 | 6 | 0.82 | 0.10 | 7 | 0.86 | 0.08 | 6 | 0.24 | 0.03 | 5 |
| Fe conc. [µg/g] | 1757.0 | 144.3 | 6 | 1602.0 | 136.3 | 5 | 2927.0 | 106.9 | 6 | 2760.0 | 344.7 | 6 | 456.8 | 86.5 | 5 |
| females | | | | | | | | | | | | | | | |
| relative spleen weight [%] | 2.25 | 0.25 | 5 | 2.17 | 0.12 | 6 | 1.03 | 0.05 | 6 | 1.12 | 0.16 | 6 | 0.33 | 0.03 | 5 |
| Fe conc. [µg/g] | 1554.0 | 178.7 | 5 | 1511.0 | 150.1 | 6 | 3175.0 | 314.2 | 6 | 2713.0 | 276.1 | 5 | 737.0 | 65.4 | 5 |

TABLE 7

Kidney weight and iron concentration in treatment groups at the end of the study.
Data are represented as mean ± SD of indicated No. of animals per treatment group.
Statistically significant difference to th3/+ vehicle group are indicated by values in bold.

| | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| all animals | | | | | | | | | | | | | | | |
| Kidney weight [mg] | 297 | 55 | 11 | 285 | 40 | 12 | 299 | 36 | 13 | 281 | 43 | 12 | 286 | 34 | 10 |
| Fe conc. [µg/g] | 155.5 | 42.9 | 11 | 125.1 | 22.2 | 12 | 96.6 | 12.8 | 13 | 126.7 | 23.6 | 12 | 75.3 | 6.5 | 10 |
| males | | | | | | | | | | | | | | | |
| Kidney weight [mg] | 338 | 28 | 6 | 313 | 31 | 6 | 325 | 25 | 7 | 317 | 22 | 6 | 311 | 16 | 5 |
| Fe conc. [µg/g] | 149.5 | 54.2 | 6 | 123.6 | 26.7 | 6 | 88.4 | 11.2 | 7 | 114.5 | 17.2 | 6 | 73.5 | 4.7 | 5 |
| females | | | | | | | | | | | | | | | |
| Kidney weight [mg] | 247 | 30 | 5 | 256 | 23 | 6 | 268 | 15 | 6 | 245 | 22 | 6 | 260 | 25 | 5 |
| Fe conc. [µg/g] | 162.7 | 28.3 | 5 | 126.6 | 19.1 | 6 | 106.0 | 6.4 | 6 | 138.9 | 23.8 | 6 | 77.1 | 8.1 | 5 |

Hemoglobin

Figure 6:
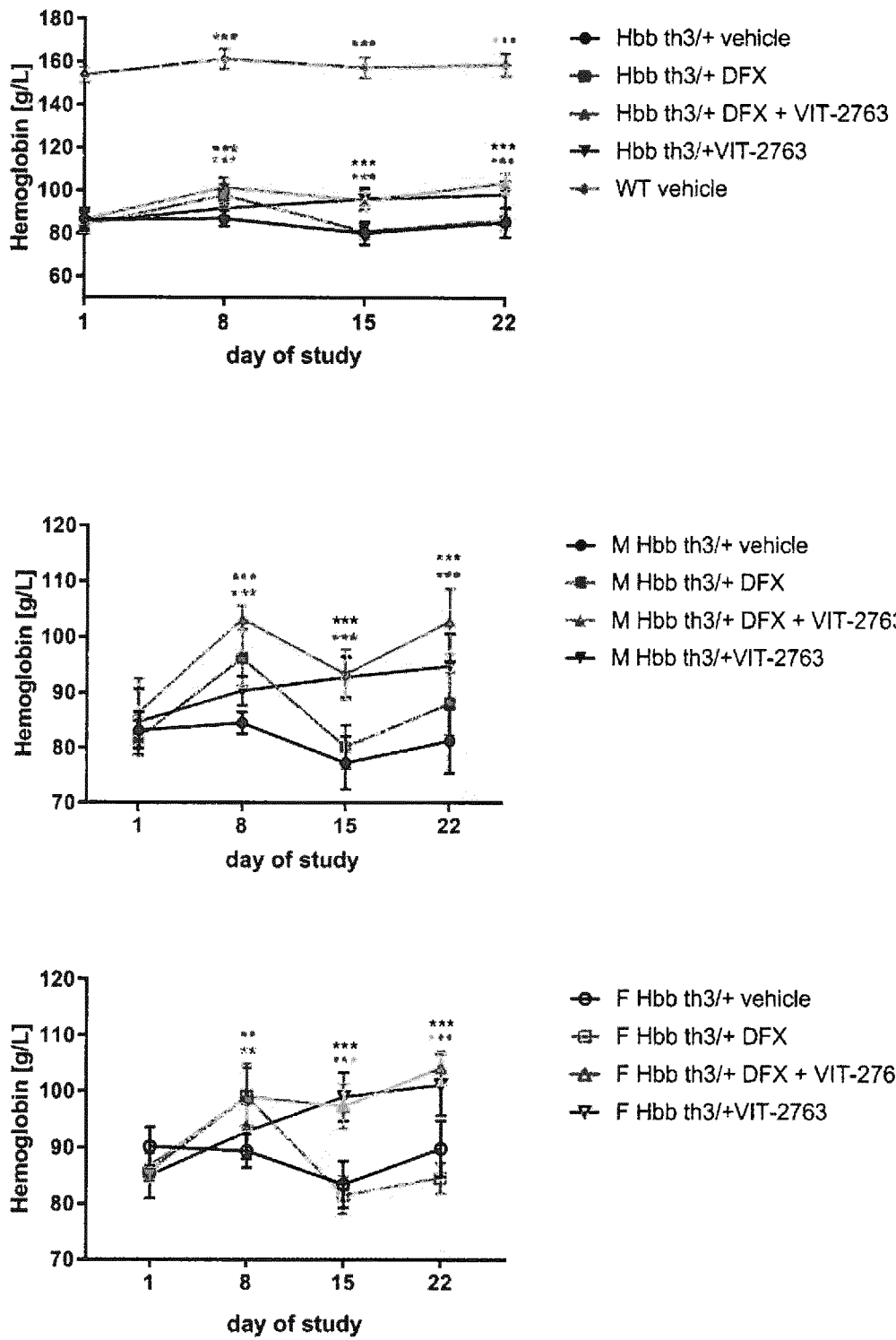
FIG. 6: Development of Hb levels in treatment groups. Hb in all animals (top left), male (M; bottom left), and female (F; bottom right) $Hbb^{th3/+}$ mice from day 1 to the end of the study. Data are presented as mean±SD. Significant differences compared to vehicle treated Hbbth3/+ group are indicated:  $p<0.01$, * $p<0.001$ (Two-way ANOVA Dunnett's multiple comparison test).

Hb concentrations were measured in whole blood before dosing on day 1 and then weekly (day 8, 15, 22). Blood samples were taken before the first dose of the day. Hbbth3/+ animals showed significantly reduced levels of Hb compared to WT animals before dosing (day 1) (FIG. 6, Table 8): 83±3 g/L (th3/+ vehicle males); 90±3 g/L (th3/+ vehicle females); 82±3 g/L (th3/+ DFX males); 86±2 g/L (th3/+ DFX females); 86±6 g/L (th3/+ DFX+ Fpn127 males); 87±3 g/L (th3/+ DFX+ Fpn127 females); 85±6 g/L (th3/+ Fpn127 males); 85±4 g/L (th3/+ Fpn127 females); 153±3 g/L (WT vehicle males); and 154±5 g/L (WT vehicle females). During the study duration Hb levels increased with time in Hbbth3/+ animals treated with Fpn127 alone or in combination with DFX (FIG. 6). DFX alone led to a transient increase in Hb levels on day 8 only. There was no significant gender difference observed.

Hematology and Erythropoiesis

Figure 7:
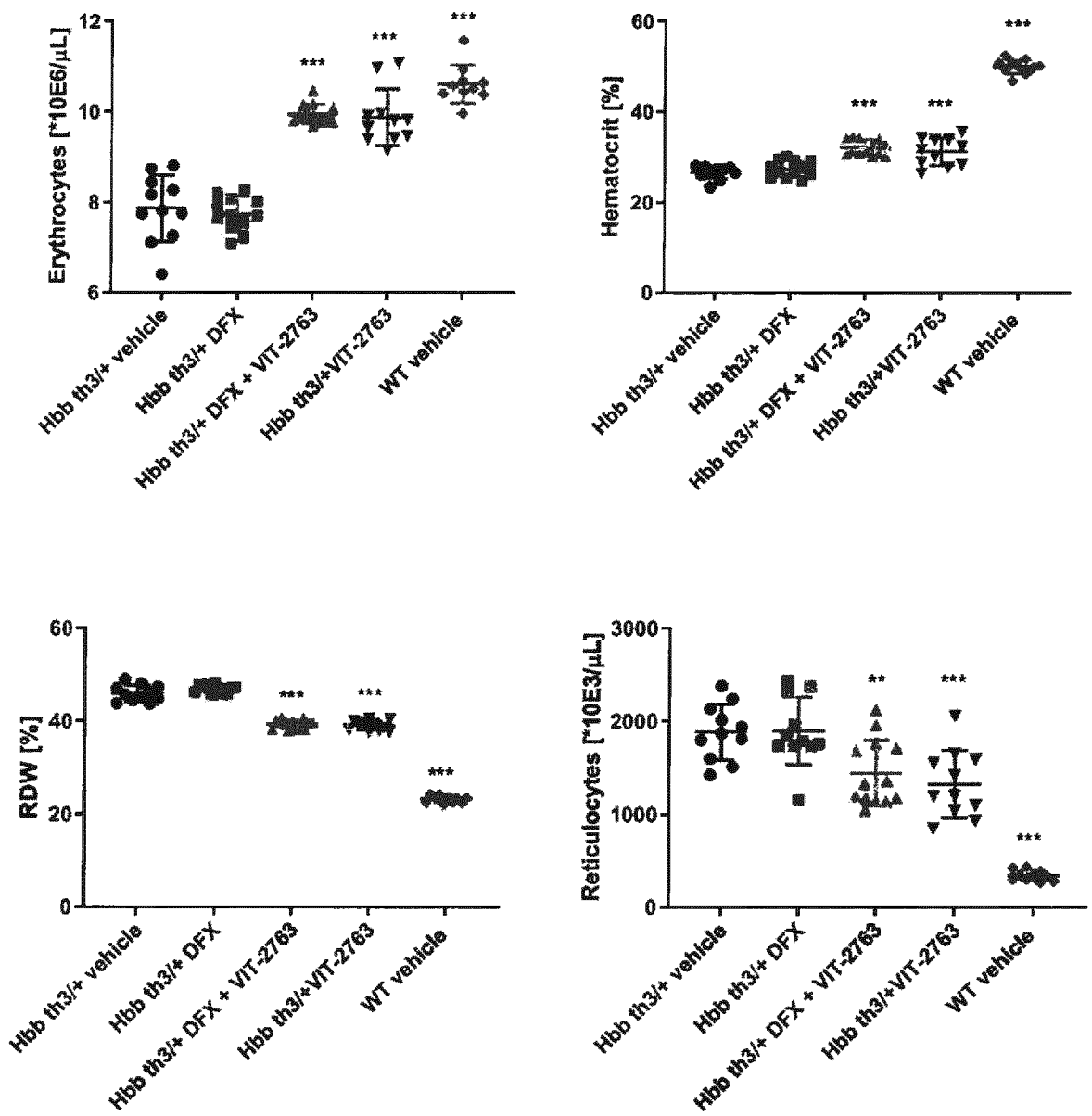
FIG. 7: Selected hematological parameters from male and female $Hbb^{th3/+}$ and WT mice at day 23. Individual values are shown with mean. Significant differences compared to vehicle treated Hbbth3/+ group are indicated:  $p<0.01$, * $p<0.001$ (One-way ANOVA with Dunnett's multiple comparison test).

Hematological parameters were determined in whole blood samples taken on the last day of the study (day 23). Hbbth3/+ mice differed significantly from WT mice in all tested hematological parameters (Table 9). DFX alone failed to improve RBC indices such as RBC counts, hematocrit, RDW, and reticulocyte counts. All these parameters were significantly improved in Hbbth3/+ mice treated with Fpn127 alone or in combination with DFX reflecting improved erythropoietic efficiency. (Table 9, FIG. 7).

Figure 8:
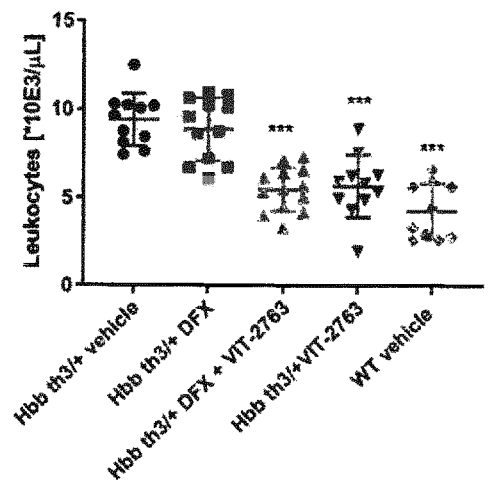
FIG. 8: Leukocyte, neutrophil, and lymphocyte counts in blood from male and female $Hbb^{th3/+}$ and WT mice at day 23. Individual values are shown with mean. Significant differences compared to vehicle treated Hbbth3/+ group are indicated: * $p<0.05$,  $p<0.01$, * $p<0.001$ (One-way ANOVA with Dunnett's multiple comparison test).
Figure 8:
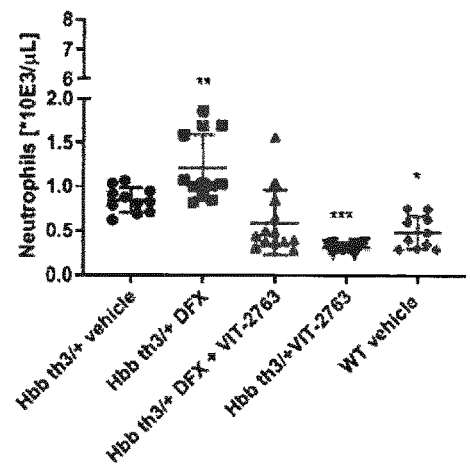
Figure 8:
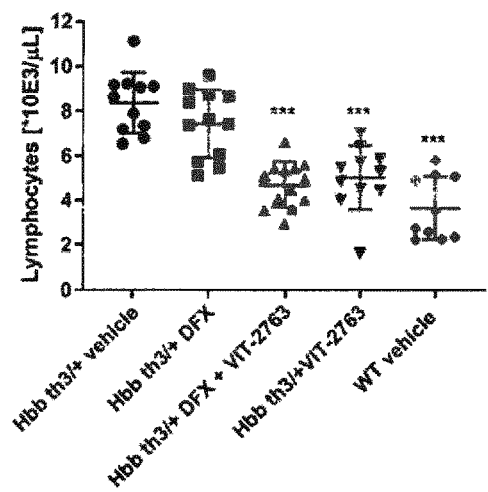

Leukocyte, neutrophil and lymphocyte counts in Hbb$^{th3/+}$ mice treated with Fpn127 alone or in combination with DFX were reduced to levels similar to WT. However, DFX alone did not change significantly the total leukocyte and lymphocyte counts in Hbb$^{th3/+}$ mice (Table 9, FIG. 8). Interestingly, treatment of Hbb$^{th3/+}$ mice with DFX alone resulted in significantly increased neutrophil counts indicating a potential inflammatory response. Numbers of monocytes were not affected by any treatment (data not shown).

Figure 9:
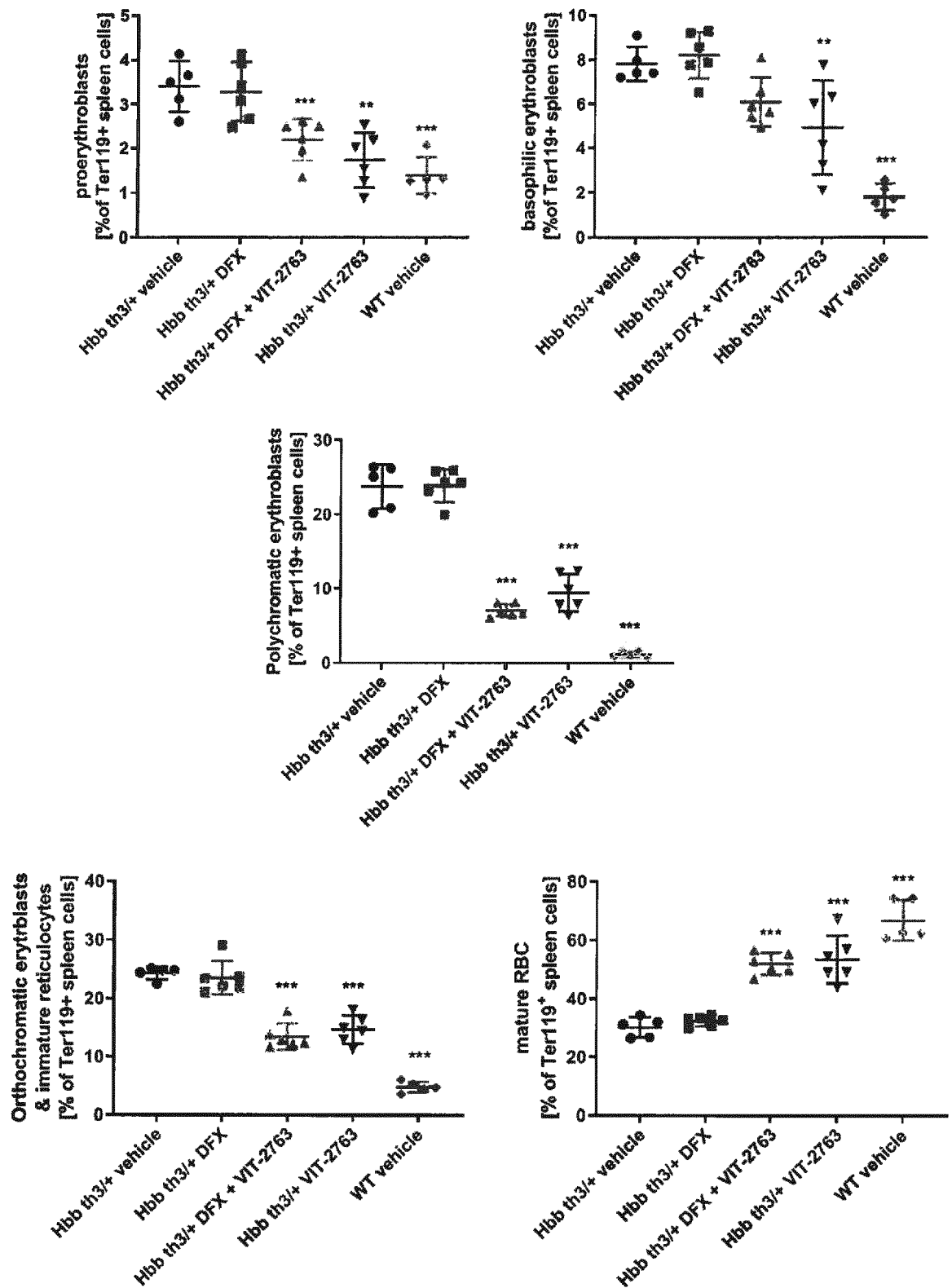
FIG. 9: Flow cytometry analysis of spleen cells at different stages of erythroid differentiation. Erythroid cells were identified by staining with antibodies against Ter119 and CD44. The different developmental stages of erythroid cells are shown as percent of parent Ter119+ spleen cells. Individual values with mean±SD are shown. Significant differences compared to vehicle treated Hbbth3/+ group are indicated:  $p<0.01$, * $p<0.001$ (One-way ANOVA with Dunnett's multiple comparison test).

In β-thalassemia, limited differentiation and increased apoptosis of erythroid precursors lead to extramedullary erythropoiesis and erythroid expansion in bone marrow and spleen. It has previously been shown that Fpn127 reduced the proportions of immature erythroid cells while increasing mature RBCs in BM and spleen of Hbbth3/+ mice. Accordingly, Hbbth3/+ mice had higher percentages of erythroid progenitors and a lower percentage of mature RBCs in spleens (FIG. 9, Table 10). DFX alone was not able to revert this phenotype. In contrast, in Hbbth3/+ mice treated with Fpn127 alone or in combination with DFX the percentage of immature erythroid cells was markedly reduced while the RBC percentage was increased (FIG. 9, Table 10), indicating reduced ineffective erythropoiesis and increased differentiation.

In summary, iron chelation alone failed to improve hematological parameters in Hbbth3/+ mice, while Fpn127, in presence or absence of DFX improved erythropoiesis.

TABLE 8

Hb concentration [g/L] of treatment groups during the whole study. Data are represented as mean ± SD of indicated number of animals per treatment group. Mean values are shown for all animals, and males and females separately. Statistically significant difference to th3/+ vehicle group are indicated by values in bold.

| day | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| all animals | | | | | | | | | | | | | | | |
| 1 | 86 | 5 | 11 | 84 | 3 | 12 | 86 | 5 | 13 | 85 | 5 | 12 | 154 | 4 | 10 |
| 8 | 87 | 3 | 11 | 98 | 5 | 12 | 101 | 5 | 13 | 92 | 4 | 12 | 161 | 5 | 10 |
| 15 | 80 | 5 | 11 | 81 | 4 | 12 | 95 | 5 | 13 | 96 | 5 | 12 | 157 | 5 | 10 |
| 22 | 85 | 7 | 11 | 86 | 5 | 12 | 103 | 5 | 13 | 98 | 6 | 12 | 159 | 5 | 10 |
| males | | | | | | | | | | | | | | | |
| 1 | 83 | 3 | 6 | 82 | 3 | 6 | 86 | 6 | 7 | 85 | 6 | 6 | 153 | 3 | 5 |
| 8 | 85 | 2 | 6 | 96 | 5 | 6 | 103 | 2 | 7 | 90 | 3 | 6 | 158 | 5 | 5 |
| 15 | 77 | 5 | 6 | 80 | 4 | 6 | 93 | 4 | 7 | 93 | 4 | 6 | 157 | 5 | 5 |
| 22 | 81 | 6 | 6 | 88 | 6 | 6 | 103 | 6 | 7 | 95 | 6 | 6 | 159 | 5 | 5 |
| females | | | | | | | | | | | | | | | |
| 1 | 90 | 3 | 5 | 86 | 2 | 6 | 87 | 3 | 6 | 85 | 4 | 6 | 154 | 5 | 5 |
| 8 | 89 | 3 | 5 | 99 | 5 | 6 | 99 | 6 | 6 | 93 | 5 | 6 | 164 | 2 | 5 |
| 15 | 83 | 4 | 5 | 82 | 3 | 6 | 97 | 4 | 6 | 99 | 4 | 6 | 158 | 5 | 5 |
| 22 | 90 | 5 | 5 | 85 | 3 | 6 | 104 | 3 | 6 | 101 | 5 | 6 | 158 | 6 | 5 |

TABLE 9

Selected blood parameters of all mice from each treatment group at the end of the study. Data are represented as mean ± SD of indicated number of animals per treatment group. Males and females are not shown separately as no gender differences were observed in blood parameters. Statistically significant difference to th3/+ vehicle group are indicated by values in bold.

| all animals | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| HCT [%] | 26.6 | 1.4 | 11 | 27.4 | 1.8 | 12 | 32.1 | 1.7 | 13 | 31.2 | 3.0 | 11 | 49.9 | 1.6 | 10 |
| RBC [10E6/μL] | 7.9 | 0.7 | 11 | 7.7 | 0.4 | 12 | 9.9 | 0.2 | 13 | 9.9 | 0.6 | 11 | 10.6 | 0.4 | 10 |
| RDW [%] | 46.0 | 1.7 | 11 | 47.0 | 0.9 | 12 | 39.3 | 1.0 | 13 | 39.1 | 1.0 | 11 | 23.3 | 0.9 | 10 |

TABLE 9-continued

Selected blood parameters of all mice from each treatment group at the end of the study. Data are represented as mean ± SD of indicated number of animals per treatment group. Males and females are not shown separately as no gender differences were observed in blood parameters. Statistically significant difference to th3/+ vehicle group are indicated by values in bold.

| all animals | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| MCH [pg] | 10.3 | 0.2 | 11 | 10.4 | 0.1 | 12 | 10.0 | 0.1 | 13 | 9.9 | 0.3 | 11 | 14.0 | 0.1 | 10 |
| MCHC [g/dL] | 26.1 | 0.9 | 11 | 25.4 | 1.2 | 12 | 26.8 | 1.0 | 13 | 27.4 | 1.02 | 11 | 28.1 | 0.5 | 10 |
| MCV [fL] | 39.4 | 1.5 | 11 | 41.1 | 2.2 | 12 | 37.1 | 1.5 | 13 | 36.4 | 2.1 | 11 | 50.0 | 0.8 | 10 |
| RET [10E3/μL] | 1887 | 299 | 11 | 1760 | 587 | 12 | 1449 | 355 | 13 | 1332 | 362 | 11 | 344 | 61 | 10 |
| Ret-He [pg] | 12.5 | 0.2 | 11 | 12.8 | 0.4 | 12 | 11.9 | 0.1 | 13 | 11.8 | 0.5 | 11 | 16.3 | 0.3 | 10 |
| Leukocytes [10E3/μL] | 9.4 | 1.5 | 11 | 8.9 | 1.8 | 12 | 5.5 | 1.2 | 13 | 5.7 | 1.8 | 11 | 4.3 | 1.6 | 10 |
| Neutrophils [10E3/μL] | 0.8 | 0.1 | 11 | 1.2 | 0.4 | 12 | 0.6 | 0.4 | 13 | 0.3 | 0.1 | 10 | 0.5 | 0.2 | 10 |
| Lymphocytes [10E3/μL] | 8.4 | 1.4 | 11 | 7.4 | 1.5 | 12 | 4.7 | 1.0 | 13 | 5.0 | 1.4 | 11 | 3.7 | 1.4 | 10 |

TABLE 10

Erythroid cell populations in spleen of Hbb$^{th3/+}$ and WT mice measured by flow cytometry at the end of the study. Data are represented as mean ± SD of indicated number of animals per treatment group. Statistically significant difference to th3/+ vehicle group are indicated by values in bold.

| frequency of parent [%] | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| pro-erythroblasts | 3.40 | 0.58 | 5 | 3.29 | 0.67 | 6 | 2.19 | 0.47 | 5 | 1.74 | 0.62 | 6 | 1.39 | 0.41 | 5 |
| basophilic erythroblasts | 7.82 | 0.77 | 5 | 8.21 | 1.04 | 6 | 6.09 | 1.12 | 6 | 4.94 | 2.13 | 6 | 1.80 | 0.59 | 5 |
| polychromatic erythroblasts | 23.76 | 2.98 | 5 | 23.90 | 2.21 | 6 | 7.05 | 0.86 | 6 | 9.44 | 2.49 | 6 | 1.15 | 0.43 | 5 |
| orthochromatic erythroblasts | 24.32 | 1.05 | 5 | 23.48 | 2.88 | 6 | 13.42 | 2.27 | 6 | 14.65 | 2.40 | 6 | 4.74 | 0.89 | 5 |
| mature erythrocytes | 30.22 | 3.45 | 5 | 32.35 | 1.77 | 6 | 52.00 | 3.69 | 6 | 53.52 | 8.09 | 6 | 66.78 | 6.86 | 5 |

Serum Parameters

The study was terminated 1 hour after dosing of DFX (no Fpn127 was dosed on the last day) on day 23 and serum and plasma was collected for analysis of serum iron, Tf, calculated TSAT, EPO, and compound plasma exposure.

Compared to vehicle treated th3/+ animals and WT animals, serum iron was significantly reduced in Hbbth3/+ animals dosed with Fpn127 (last dose given 20 h before) alone or in combination with DFX while no changes were observed in mice treated with DFX alone: (FIG. 10 left, Table 11): 28.7±5.8 μM (th3/+ vehicle); 30.8±5.9 μM (th3/+ DFX); 23.1±3.5 μM (th3/+ DFX+ Fpn127); 19.9±3.3 μM (th3/+ Fpn127); and 29.9±2.8 μM (WT vehicle). The reduction of serum iron in Hbbth3/+ mice at approx. 20 h after the last dose of Fpn127 was unexpected, as in a previous study, serum iron was restored to the baseline levels in C57BL/6 WT mice dosed with 120 mg/kg Fpn127 for 20 h. One possibility is that plasma exposure of Fpn127 in Hbbth/3+ mice differs at 20 h compared to WT mice. PKPD studies using Hbbth3/+ and WT mice are needed to address this question. No gender differences were observed.

Figure 10:
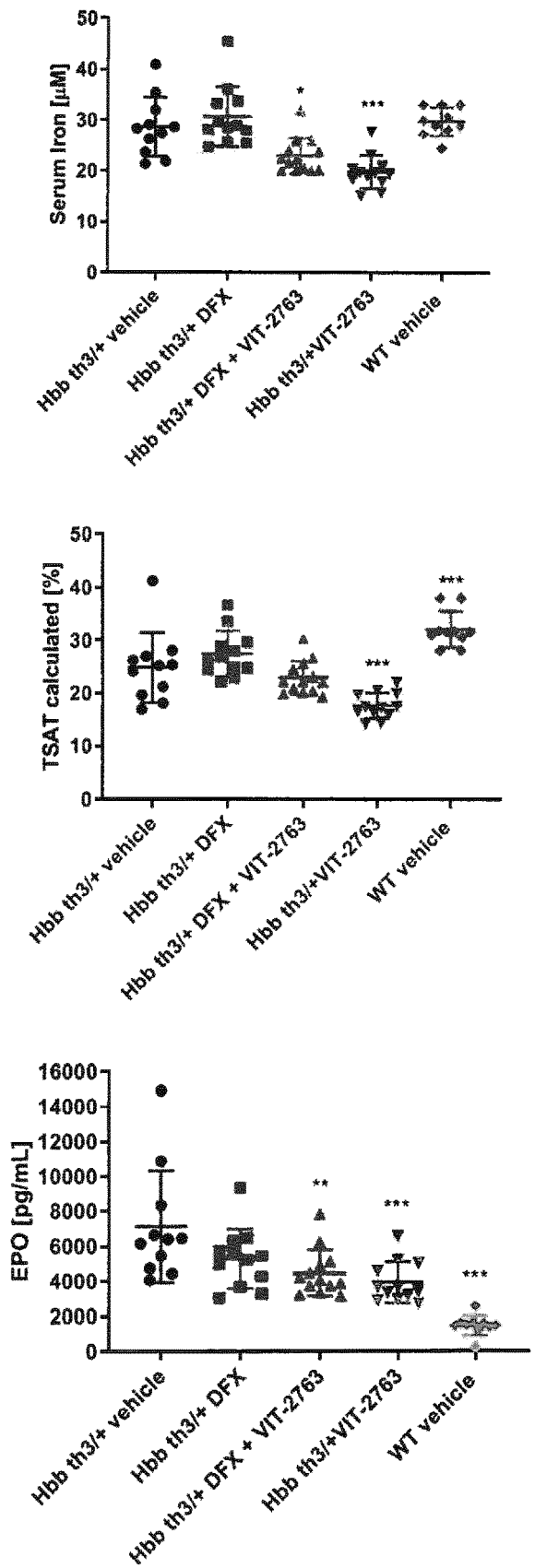
FIG. 10: Serum iron, TSAT, and EPO were determined in serum samples from male and female $Hbb^{th3/+}$ and WT mice taken 1 hour after the last dose of DFX on day 23. Individual values with mean are shown. Significant differences compared to vehicle treated Hbbth3/+ group are indicated: * $p<0.05$,  $p<0.01$, * $p<0.001$ (One-way ANOVA Dunnett's multiple comparison test).

TSAT was significantly lower in vehicle treated Hbbth3/+ animals than WT animals. TSAT levels mostly mirrored serum iron levels and were significantly decreased in Hbbth3/+ mice treated with Fpn127 alone and showing a trend in combination with DFX (FIG. 10 middle, Table 11). In line with no change in serum iron, DFX alone did not affect TSAT.

Serum EPO values were highly variable in all Hbb$^{th3/+}$ groups compared to EPO values in the WT group. As previously shown, EPO levels were significantly elevated in vehicle-treated Hbb$^{th3/+}$ animals (7144±3216 pg/mL) compared to WT animals (1470±566 pg/mL). Treatment with Fpn127 alone or in combination with DFX reduced EPO levels in Hbbth3/+ animals, whereas DFX alone did not reach statistical significance (Table 11; FIG. 10, bottom): 7144±3216 pg/mL (th3/+ vehicle); 5277±1710 pg/mL (th3/+ DFX); 4460±1330 pg/mL (th3/+ DFX+ Fpn127), 3938±1167 pg/mL (th3/+ Fpn127); and 1470±566 pg/mL (WT vehicle).

Figure 11:
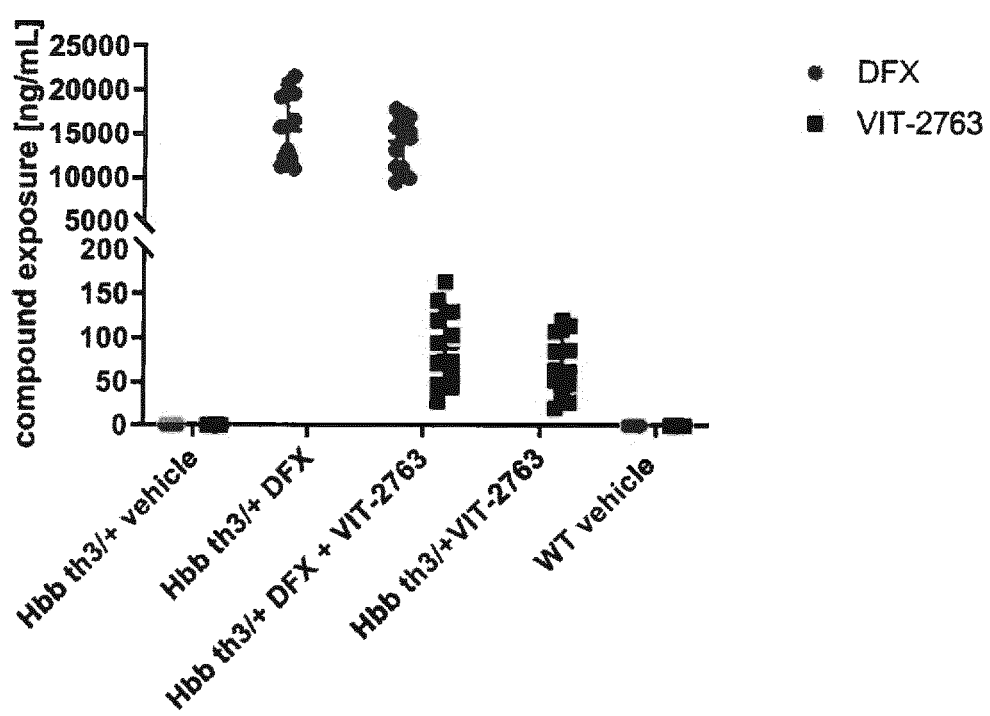
FIG. 11: Concentration of DFX and Fpn127 in plasma of all treatment groups sampled 1 hour after the last dose of DFX on day 23. Individual values are shown with mean.

Plasma was collected 1 hour after dosing of DFX on day 23 for determination of compound concentration by LC-MS/MS. Plasma exposure of DFX was similar in animals dosed with DFX alone or in combination with Fpn127 (FIG. 11, Table 12). Similarly, plasma exposure of Fpn127 was comparable in presence or absence of DFX. As expected, plasma levels of Fpn127 were low as plasma was sampled approximately 20 h after the last dose of Fpn127.

TABLE 11

Serum iron, TSAT, and EPO levels of treatment groups at the end of the study. Data are represented as mean ± SD of indicated number of animals per treatment group. Statistically significant difference to th3/+ vehicle group are indicated by values in bold.

| all animals | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| serum iron [uM] | 28.7 | 5.8 | 11 | 30.8 | 5.9 | 12 | 23.1 | 3.5 | 13 | 19.9 | 3.3 | 12 | 29.9 | 2.8 | 10 |
| TSAT [%] | 24.9 | 6.6 | 11 | 27.5 | 4.3 | 12 | 22.9 | 3.2 | 13 | 17.7 | 2.4 | 12 | 32.1 | 3.4 | 10 |
| EPO [pg/mL] | 7144 | 3216 | 11 | 5277 | 1710 | 12 | 4460 | 1330 | 13 | 3938 | 1167 | 12 | 1470 | 566 | 10 |

TABLE 12

Plasma exposure of DFX and Fpn127 at the end of the study. Data are represented as mean and SD of indicated number (n) of animals per treatment group.

| all animals | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| DFX [ng/mL] | 0 | 0 | 5 | 15413 | 4008 | 12 | 14166 | 2923 | 13 | n.d. | n.d. | n.d. | 0 | 0 | 5 |
| Fpn127 [ng/mL] | 0 | 0 | 6 | n.d. | n.d. | n.d. | 88 | 41 | 13 | 68 | 34 | 12 | 0 | 0 | 5 | n.d. values were not determined.

Flow Cytometric Analysis of Intracellular ROS, PS Exposure, and Mitochondria

In β-thalassemia, the imbalanced synthesis of α- and β-globin chains of Hb leads to formation of hemichromes, insoluble α-globin aggregates containing free heme and iron, causing reactive oxygen species (ROS) formation and apoptosis of RBC. Flow cytometric analysis of ROS in blood using the fluorescent indicator CM-H2DCFDA showed that Fpn127 alone or in combination with DFX significantly decreased the proportion of ROS-producing RBC compared to Hbbth3/+ mice treated with vehicle or DFX alone (Table 13, FIG. 12 top).

The plasma membrane of RBC from patients and mice with thalassemia have damaged phospholipids and protein organization resulting in exposure of PS to the outer membrane which leads to apoptosis. Treatment with Fpn127 alone significantly decreased the proportion of PS-positive RBC, as shown by annexin V staining (Table 13, FIG. 12 middle). DFX alone had no effect on PS exposure while DFX in combination with Fpn127 showed a non-significant trend towards reduced PS exposure.

RBC produce energy by glycolysis and upon maturation reticulocytes of healthy individuals clear mitochondria by mitophagy (Zhang J., Autophagy, 2009). However, in thalassemia mitophagy is incomplete and mature RBC contain mitochondria generating ROS as a result of oxidative phosphorylation. Hbbth3/+ mice treated with Fpn127 alone or in combination with DFX had less RBC containing mitochondria compared to vehicle-treated and DFX-treated Hbbth3/+ mice (Table 13, FIG. 12 bottom), suggesting only Fpn127 results in improved maturation of RBC.

In summary, DFX failed to improve RBC function with regard to oxidative stress, apoptosis and maturation while treatment with Fpn127, alone or in combination with DFX, resulted in improved RBC quality.

TABLE 13

Percentage of marker-positive mature RBCs in whole blood at the end of study (pre-terminally d22). Data are represented as mean ± SD of indicated number of animals per treatment group. Statistically significant difference to th3/+ vehicle group are indicated by values in bold.

| all animals | th3/+ vehicle | | | th3/+ DFX | | | th3/+ DFX + Fpn127 | | | th3/+ Fpn127 | | | WT vehicle | | |
|---|---|---|---|---|---|---|---|---|---|---|---|---|---|---|---|
| | mean | SD | n | mean | SD | n | mean | SD | n | mean | SD | n | mean | SD | n |
| % ROS-positive RBCs | 40.25 | 5.16 | 11 | 41.56 | 3.83 | 12 | 27.80 | 3.80 | 13 | 32.82 | 4.01 | 12 | 1.96 | 1.20 | 10 |
| % Annexin V-positive RBCs | 0.44 | 0.06 | 11 | 0.47 | 0.14 | 12 | 0.36 | 0.05 | 13 | 0.29 | 0.07 | 12 | 0.39 | 0.13 | 10 |
| % Mito Tracker-positive RBCs | 0.50 | 0.14 | 11 | 0.56 | 0.17 | 12 | 0.19 | 0.13 | 13 | 0.19 | 0.06 | 12 | 0.14 | 0.07 | 10 |

XI.9 Conclusions

Dosing of DFX (30 mg/kg), Fpn127 (120 mg/kg), and combination of both compounds for 17 days had no significant effect on BW of male and female Hbbth3/+ mice and was well tolerated.

Thalassemic mice absorb excessive amounts of iron as a consequence of inadequately low hepcidin levels relative to the high iron content in liver, spleen and kidney and increased Fpn expression in duodenum (Gardenghi S, et al, Blood, 2007). Total iron content in organs of Hbb$^{th3/+}$ mice treated with either vehicle, DFX, Fpn127, or the combination of both were analyzed by inductively coupled plasma optical emission spectrometry (ICP-OES).

Total iron concentrations in livers of Hbb$^{th3/+}$ mice dosed with DFX alone or in combination with Fpn127 were significantly reduced compared to those of vehicle-treated mice. As previously shown, Fpn127 alone was not able to reduce liver iron concentration.

Total iron concentrations in kidneys of Hbb$^{th3/+}$ mice were significantly reduced in all compound-treated mice compared to vehicle-treated mice. Unexpectedly, the combination of Fpn127 and DFX was more potent in reducing kidney iron concentrations than either treatment alone. These data clearly demonstrate that Fpn127 does not interfere with chelation treatment and that the combination therapy of Fpn127 and DFX has a surprising synergistic effect by reducing kidney iron concentration to a lower level than by either treatment alone.

Even though administration of DFX alone successfully reduced organ iron concentrations it failed to improve parameters of erythropoiesis such as spleen weight (FIG. 4), Hb (FIG. 6), RBC and reticulocyte counts, hematocrit (FIG. 7), and serum EPO (FIG. 10). All these parameters were significantly improved in Hbbth3/+ mice treated with Fpn127 alone or combined with DFX demonstrating improved erythropoietic efficiency. In line with these results, expansion of erythroid precursors was significantly reduced in spleens of all groups receiving Fpn127 (FIG. 9) whereas DFX alone had no effect.

In particular, Fpn127 alone or in combination with DFX increased Hb levels in Hbb$^{th3/+}$ mice significantly compared to vehicle-treated mice. The change of Hb levels in mice dosed with Fpn127 or the combination reached 13 g/L and 18 g/L by the study end, respectively, compared to vehicle-treated mice. Treating Hbb$^{th3/+}$ mice with Fpn127 alone or in combination with DFX increased RBC counts, hematocrit (HOT) and decreased reticulocyte numbers and RBC distribution width (RDW), reflecting improved erythropoiesis. Treatment with DFX alone failed to improve erythropoiesis. In addition, Fpn127 alone or in combination with DFX corrected leukocyte counts in blood of Hbb$^{th3/+}$ mice to the normal level of WT mice, while DFX alone showed no effect.

The extramedullary erythropoiesis in Hbb$^{th3/+}$ mice causes excessive proliferation of erythroid precursors in spleen leading to splenomegaly. Treatment of Hbb$^{th3/+}$ mice with Fpn127 alone or in combination with DFX resulted in a significant reduction of spleen weight while DFX alone showed no effect. Erythropoiesis was also studied by analyzing the percentage of differentiating erythroid precursors in spleen, as identified by Ter119/CD44 markers and analyzed by flow cytometry. Fpn127 in presence and absence of DFX significantly reduced the percentages of the early erythroid precursors proerythroblasts, basophilic, polychromatic, and orthochromatic erythroblasts in spleens of Hbb$^{th3/+}$ mice and increased the percentages of mature RBCs compared to vehicle-treated Hbb$^{th3/+}$ mice treated with Fpn127 alone or in combination with DFX were significantly lower compared to the vehicle group. Treatment with DFX alone also showed a trend to reduced serum EPO levels but did not reach statistical significance.

In addition, only in the presence of Fpn127 elevated leukocyte counts in the peripheral blood of Hbbth3/+ mice were significantly reduced indicating the potential of Fpn127 to decrease inflammation in β-thalassemia.

The imbalanced synthesis of α- and β-globin chains of Hb leads to formation of insoluble α-globin aggregates containing free heme and iron, causing ROS formation and apoptosis of the late stage erythroid progenitors. As consistently shown in previous studies, Fpn127 significantly decreased the percentage of ROS-positive RBCs, reduced the proportion of mature RBCs containing mitochondria and reduced the apoptotic signal (phosphatidylserine, PS) on RBCs.

Figure 12:
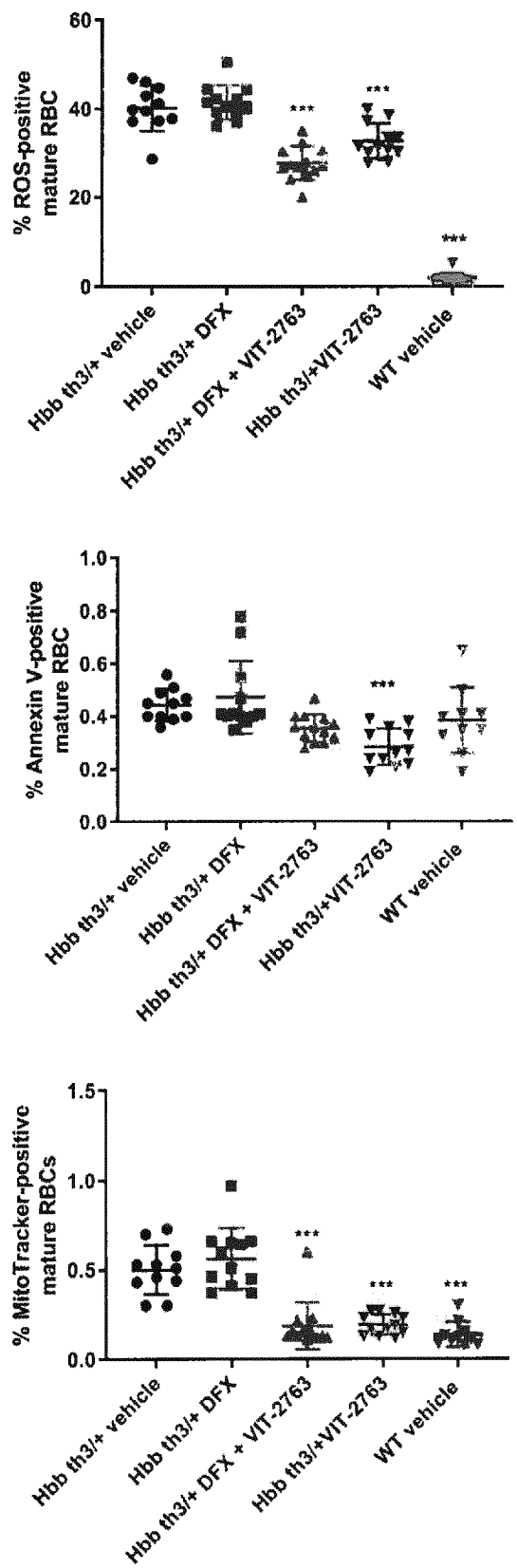
FIG. 12: Flow cytometric analysis of intracellular ROS, PS exposure (annexin V-binding), and retention of mitochondria in whole blood of Hbb$^{th3/+}$ and WT mice. The percentage of ROS-positive (left), annexin V-positive (middle), and MitoTracker-positive (right) mature RBCs is shown as individual values with mean±SD. Significant differences compared to vehicle treated Hbbth3/+ group are indicated: * p<0.05,  p<0.01, * p<0.001 (One-way ANOVA with Dunnett's multiple comparison test).

Treatment with Fpn127 alone or in combination also improved the quality of mature RBCs, namely it decreased intracellular ROS production, decreased PS exposure and reduced retention of mitochondria (FIG. 12). DFX did not improve RBC quality in any aspect.

The combination treatment with DFX did not interfere with the beneficial effect of Fpn127 on RBC phenotype, while DFX alone had no effect.

Taken together, this study shows that DFX-induced iron excretion from the liver can be accomplished despite Fpn inhibition by Fpn127. Furthermore, Fpn127 administered either alone or together with DFX showed similar efficacy in improving anemia, erythropoiesis and decreasing spleen size of th3/+ mice.

Therewith, the results clearly show that (i) Fpn127 does not interfere with iron chelation and (ii) the positive effects of Fpn127 on erythropoiesis are not affected by iron chelation therapy. Thus, co-administration of the oral ferroportin inhibitor Fpn127 and the iron chelator DFX is feasible and might offer the advantage of reversing established iron overload and improving erythropoiesis in β-thalassemia. The combination of iron chelation with Fpn127 offers the advantage of reversing established iron overload with improving erythropoiesis in the Hbb$^{th3/+}$ model of β-thalassemia.

These data support the efficacy of a combination therapy with the ferroportin inhibitors of the present invention with conventional iron chelation therapy, e.g. deferasirox in the treatment of β-thalassemia, such as in particular in severe forms thereof, such as in TDT.

The invention claimed is:
1. A method of treatment of transfusion-dependent β-thalassemia comprising administering to a patient in need thereof a compound selected from a compound having the following formula

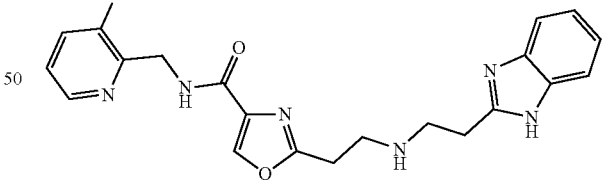

pharmaceutically acceptable salts thereof, and solvates, hydrates and polymorphs of any of the foregoing,
wherein the patient is suffering from severe haemoglobin E β-thalassemia requiring regular blood transfusion and exhibits one or more selected from:
(a) a hemoglobin (Hb) level below 7 g/dL,
(b) a mean cell volume (MCV) of red blood cells between 50 and 70 fL, and
(c) a mean cell hemoglobin content (MCH) of red blood cells between 12 and 20 pg,
wherein the method is effective to improve one or more patient parameters selected from MCV and MCH.

2. The method of claim 1, wherein the patient exhibits one or more selected from:
   (a) a genotype selected from the group consisting of β°/β°, B+/B+, B°/B+, and β°/HbE, and
   (b) a genotype comprising coinheritance of two severe hemoglobin beta chain mutations.

3. The method of claim 1, wherein the patient further exhibits detectable non-transferrin bound iron (NTBI) levels.

4. The method of claim 1, wherein the transfusions administered to the patient include at least one selected from the group consisting of:
   (a) repeated blood transfusions of equal red blood cell (RBC) units in varying subsequent time intervals,
   (b) repeated blood transfusions of equal RBC units in equal subsequent time intervals,
   (c) repeated blood transfusions of varying RBC units in equal subsequent time intervals, and
   (d) repeated blood transfusions of varying RBC units in varying subsequent time intervals.

5. The method of claim 1, wherein the transfusions administered to the patient are administered at a rate of greater than five transfusions per 24 weeks.

6. The method of claim 1, comprising oral administration of the compound to the patient.

7. The method of claim 1, wherein the compound is administered in a dose selected from 0.5 mg to 500 mg or 0.001 mg/kg to 35 mg/kg body weight of the patient.

8. The method of claim 1, wherein the treatment comprises administering to the patient once or twice daily a dose of the compound selected from 5 mg, 15 mg, 60 mg, 120 mg, and 240 mg.

9. The method of claim 1, wherein the treatment comprises administering to the patient once or twice daily a dose of 120 mg for a patient with >50 kg body weight or a dose of 60 mg for a patient with <50 kg body weight.

10. The method of claim 1, wherein the compound is selected from compounds in the form of a pharmaceutically acceptable salt with at least one acid selected from the group consisting of benzoic acid, citric acid, fumaric acid, hydrochloric acid, lactic acid, malic acid, maleic acid, methanesulfonic acid, phosphoric acid, succinic acid, sulfuric acid, tartaric acid and toluenesulfonic acid, and solvates, hydrates and polymorphs of any of the foregoing.

11. The method of claim 1, wherein the compound is administered in the form of a salt selected from the group consisting of:

a 1:1 sulfate having the formula

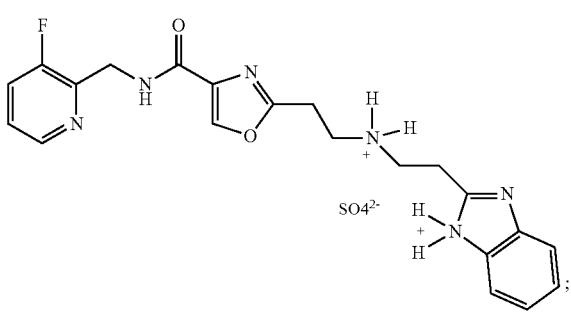

a 1:1 phosphate salt having the formula

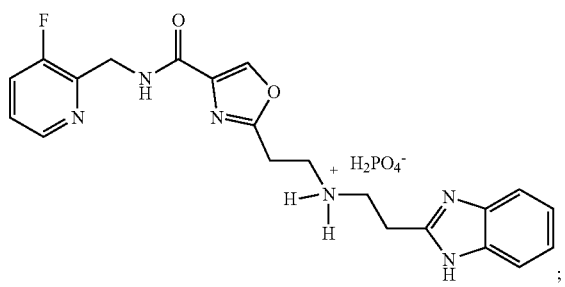

a 1:3 HCl salt having the formula

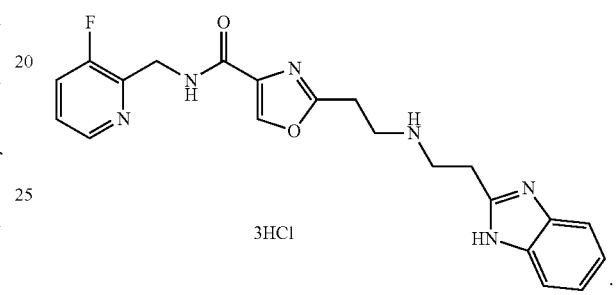

and solvates, hydrates, and polymorphs of any of the foregoing.

12. The method of claim 1, wherein the compound is administered in a medicament, the medicament further comprising one or more selected from pharmaceutical carriers, auxiliaries, and solvents.

13. The method of claim 1, wherein the method forms part of a combination therapy further comprising to the patient, one or more additional pharmaceutically active compounds,
   wherein the combination therapy is administered as a fixed dose combination therapy by co-administration of the compound together with the at least one additional pharmaceutically active compound in a fixed-dose formulation, or
   wherein the combination therapy administered as a free dose combination therapy by co-administration of the compound together with the at least one additional pharmaceutically active compound in free doses of the respective compounds, by simultaneous or sequential administration.

14. The method of claim 13, wherein the compound is

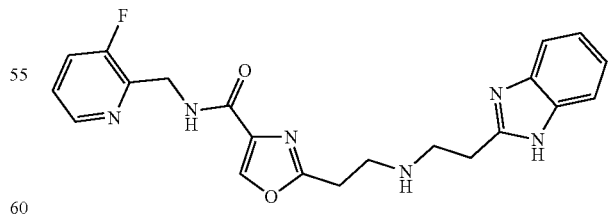

and the at least one additional pharmaceutically active compound is deferasirox.

15. The method of claim 1, wherein the compound is administered in a medicament, the medicament further comprising one or more additional pharmaceutically active compounds.

16. The method of claim 1, wherein the compound is administered in a dose of 1 mg to 300 mg.

17. The method of claim 1, wherein the compound is administered in a dose of 1 mg to 250 mg.

18. The method of claim 1, wherein the patient exhibits hereditary persistence of fetal hemoglobin.

* * * * *